(12) United States Patent
Lewis et al.

(10) Patent No.: US 12,522,871 B2
(45) Date of Patent: Jan. 13, 2026

(54) EXPRESSION-BASED DIAGNOSIS, PROGNOSIS AND TREATMENT OF COMPLEX DISEASES

(71) Applicant: The Regents of the University of California, Oakland, CA (US)

(72) Inventors: Nathan Lewis, La Jolla, CA (US);
Tiziano Pramparo, La Jolla, CA (US);
Eric Courchesne, La Jolla, CA (US);
Vahid Hajihoseini Gazestani, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1331 days.

(21) Appl. No.: 17/257,806

(22) PCT Filed: Jul. 12, 2019

(86) PCT No.: PCT/US2019/041618
§ 371 (c)(1),
(2) Date: Jan. 4, 2021

(87) PCT Pub. No.: WO2020/014620
PCT Pub. Date: Jan. 16, 2020

(65) Prior Publication Data
US 2021/0277476 A1    Sep. 9, 2021

Related U.S. Application Data

(60) Provisional application No. 62/697,049, filed on Jul. 12, 2018.

(51) Int. Cl.
*C12Q 1/6883* (2018.01)

(52) U.S. Cl.
CPC ..... *C12Q 1/6883* (2013.01); *C12Q 2600/158* (2013.01)

(58) Field of Classification Search
CPC .. C12Q 1/68; C12Q 1/6883; C12Q 2600/158; C07H 21/00
See application file for complete search history.

(56) References Cited

U.S. PATENT DOCUMENTS

| | | | | |
|---|---|---|---|---|
| 2009/0117562 A1* | 5/2009 | Hu | ...... | G16B 25/00 435/6.12 |
| 2009/0197253 A1* | 8/2009 | Sommer | ...... | C12Q 1/6883 435/6.16 |
| 2010/0125042 A1* | 5/2010 | Geschwind | ...... | C12Q 1/6883 435/325 |
| 2010/0210471 A1 | 8/2010 | Leppert et al. | | |
| 2011/0294693 A1* | 12/2011 | Hu | ...... | G06F 16/21 435/7.1 |
| 2012/0015838 A1* | 1/2012 | Hu | ...... | C12Q 1/6883 435/6.12 |
| 2012/0207726 A1* | 8/2012 | Lipkin | ...... | A61P 29/00 424/93.46 |
| 2013/0012403 A1* | 1/2013 | Hu | ...... | C12Q 1/6883 506/9 |
| 2013/0123124 A1* | 5/2013 | Kunkel | ...... | C12Q 1/6813 506/9 |
| 2013/0123203 A1* | 5/2013 | Talalay | ...... | A61K 31/19 514/588 |
| 2014/0194310 A1* | 7/2014 | Geschwind | ...... | C12Q 1/6883 435/6.12 |
| 2014/0213469 A1* | 7/2014 | Hu | ...... | C12Q 1/6881 506/9 |
| 2014/0303031 A1* | 10/2014 | Kunkel | ...... | G01N 33/543 506/17 |
| 2015/0024947 A1* | 1/2015 | Letovsky | ...... | C12Q 1/6886 506/9 |
| 2015/0227681 A1* | 8/2015 | Courchesne | ...... | G16H 50/20 702/19 |
| 2016/0245828 A1 | 8/2016 | Roberts et al. | | |
| 2019/0112660 A1* | 4/2019 | Krigsman | ...... | C12Q 1/6883 |
| 2021/0163886 A1* | 6/2021 | Anand | ...... | A61P 19/00 |

(Continued)

FOREIGN PATENT DOCUMENTS

WO    WO-2008144371 A1 * 11/2008 .......... C12Q 1/6883

OTHER PUBLICATIONS

Tiihonen et al., JAMA Phychiatry 74(7) :686-693 (Year: 2017).*
Chen et al., Dysregulation of the IGF-I/PI3K/AKT/mTOR signaling pathway in autism spectrum disorders. International Journal of Developmental Neuroscience 35 :35-41 (Year: 2014).*
Morales et al. The PI3K signaling pathway as a pharmacological target in Autism related disorders and Schizophrenia. Molecular and Cellular Therapies 4:2 (Year: 2016).*
Gregg et al. Gene expression changes in children with autism. Genomics 91:22-29 (Year: 2008).*
Hu et al., Developing a Predictive Gene Classifier for Autism Spectrum Disorders Based upon Differential Gene Expression Profiles of Phenotypic Subgroups. NAm J Med Sci. 6:3 18 pages (Year: 2013).*

(Continued)

*Primary Examiner* — Ethan C Whisenant
(74) *Attorney, Agent, or Firm* — Eversheds-Sutherland (US) LLP

(57) ABSTRACT

The invention provides for the detection of a perturbed gene network, which includes highly expressed genes during fetal brain development, which is dysregulated in neuron models of autism spectrum disorder (ASD). High-confidence ASD risk genes are upstream regulators of the network modulating RAS/ERK, PI3K/AKT, and WNT//β-catenin signaling pathways. The invention demonstrates how the heterogeneous genetics of ASD can dysregulate a core network to influence brain development at prenatal and very early postnatal ages and, thereby, the severity of later ASD symptoms. The invention provides a model for diagnosis, prognosis determination, and optionally treatment and monitoring, for any disease by comparing molecular marker patterns in non-affected tissues in a subject with healthy controls to determine a dysregulated network in the subject based on a co-expression pattern of interacting genes.

17 Claims, 17 Drawing Sheets

(56) References Cited

U.S. PATENT DOCUMENTS

2021/0180130 A1* 6/2021 Yao .................. C12Q 1/6883

OTHER PUBLICATIONS

Kalman H.O., Potential opposite roles of the extracellular signal-regulated kinase (ERK) pathway in autism spectrum and bipolar disorders. Neuroscience and Biobehavioral Reviews 36 : 2206-2213 (Year: 2012).*

Khosravi et al., Inferring interaction type in gene regulatory networks using co-expression data. Algorithms for Molecular Biology 10:23 (Year: 2015).*

Kwan et al., Wnt signaling networks in autism spectrum disorder and intellectual disability. J. of Neurodevelopmental Disorders 8:45 (Year: 2016).*

Yasuda et al., Gene expression analysis in lymphoblasts derived from patients with autism spectrum disorder. Molecular Autism 2:9 (Year: 2011).*

Bates, S. The Role of gene expression profiling in drug discovery. Current Opinion in Pharmacology 11:549-556 (Year: 2011).*

Benger et al., Autism spectrum disorder :prospects for treatment using gene therapy. Molecular Autism 9:39 (Jun. 2018) (Year: 2018).*

Bates, S. The role of gene expressio profiling in drug discovery. Current Opinion in Pharmacology 11:549-556 (Year: 2011).*

PCT International Search Report and Written Opinion for PCT Application No. PCT/US2019/041618 mailed Sep. 27, 2019 (10 pages).

* cited by examiner

EXPRESSION-BASED DIAGNOSIS, PROGNOSIS AND TREATMENT OF COMPLEX DISEASES

CROSS REFERENCE TO RELATED APPLICATIONS

This application claims the priority benefit of PCT/US2019/041618 filed on Jul. 12, 2019 which claims the priority benefit to U.S. Provisional Patent Application No. 62/697,049, filed Jul. 12, 2018, the entire contents of which are incorporated herein by reference.

GOVERNMENT SPONSORSHIP

This invention was made with government support under Grant No. MH110558 awarded by the National Institutes of Mental Health. The government has certain rights in the invention.

FIELD OF THE INVENTION

The present disclosure relates to expression-based diagnosis, prognosis and treatment of complex diseases.

BACKGROUND OF THE INVENTION

Autism spectrum disorder (ASD) is a neurodevelopmental disorder with prenatal and early postnatal biological onset[1-3]. Genetic factors contribute to the predisposition and development of ASD with estimated heritability rates of 50-83% [4,5]. Large-scale genetic studies have implicated several hundred risk (rASD) genes that appear to be associated with many different pathways, cell processes, and neurodevelopmental stages[6-8]. This highly heterogeneous genetic landscape has raised challenges in elucidating the biological mechanisms involved in the disorder. While rigorous proof remains lacking, current evidence suggests that rASD genes fall into networks and biological processes[6,7,9-13] that modulate one or more critical stages of prenatal and early postnatal brain development, including neuronal proliferation, migration, neurite growth, synapse formation and function[3,8]. However, these insights are mostly gained from focused studies on single rASD genes (see Courchesne et al. [3] for a recent review) or based on transcriptome data of non-ASD brains[9-11], leaving an incomplete picture of rASD-induced molecular changes at the individual level and relationships with early-age clinical heterogeneity.

To further complicate efforts to discern the molecular bases of ASD, the implicated rASD genes are largely identified through de novo loss-of-function mutations in their coding sequence. Such events account for less than 5% of the ASD population, and most of heritability is estimated to reside in common variants also seen in the typically developing population[5,14-16]. Currently, there is a paucity of data on whether ASD cases with known rASD gene mutations manifest as special subtypes of ASD with distinct molecular etiology, or whether they share mechanisms with the general ASD population.

To address these fundamental questions, it is important to understand what molecular processes are perturbed in prenatal and early postnatal life in ASD individuals, assess how they vary among subjects, and evaluate how these perturbations relate to rASD genes and early-age ASD clinical symptoms. It is expected that the genetic changes in ASD alter gene expression and signaling in the early-age developing brain[3,7,11,17]. Therefore, capturing dysregulated gene expression at prenatal and early postnatal ages may help unravel the underlying molecular organization of ASD. Unfortunately, doing so is particularly challenging as ASD brain tissue cannot be obtained at these early stages, and all available postmortem ASD brains are from much older ages, well beyond the ages when rASD genes are at peak expression and the disorder begins. However, in contrast to living neurons that have a limited time window for proliferation and maturation, other cell types constantly regenerate, such as blood cells. Given the strong genetic basis of ASD, some dysregulated developmental signals may continually reoccur in blood cells and thus be studied postnatally[18-20].

Reinforcing this notion, it was demonstrated that genes that are broadly expressed across many tissues are major contributors to the overall heritability of complex traits[21], and it was postulated that this could be relevant to ASD. Lending credence to this, previous studies have reported the enrichment of differentially expressed genes in ASD blood for the regulatory targets of CHD8[19] and FMR1[22] genes, two well-known rASD genes. Similarly, lymphoblastoid cells of ASD cases and iPS-derived models of fragile-X syndrome show over-expression of mir-181 with a potential role in the disorder[23] Likewise, leukocytes from ASD toddlers show perturbations in biological processes, such as cell proliferation, differentiation, and microtubules[24-28], and these coincide with dysregulated processes seen in neural progenitor cells (NPCs) and neurons, derived from iPS cells from ASD subjects[29,30]. Ultimately, establishing the signatures of ASD in other tissues will be important to facilitate the study of the molecular basis of the disorder in living ASD subjects in the first years of life.

SUMMARY OF THE INVENTION

In an embodiment, transcriptomic data from leukocytes, stems cell models, and the developing brain are leveraged to study the underlying architecture of transcriptional dysregulation in ASD, its connection to rASD genes, and its association with prenatal development and clinical outcomes of ASD toddlers. Specifically, a conserved dysregulated gene network was discovered by analyzing leukocyte transcriptomic data from 1-4 years old ASD and typically developing (TD) toddlers. The dysregulated network is enriched for pathways known to be perturbed in ASD neurons, impacts highly expressed processes in prenatal brain development, and is dysregulated in iPS cell-derived neurons from ASD cases. Consistent with the omnigenic model of complex traits[21], this disclosure shows that rASD genes across diverse functional groups converge upon and regulate this core network. Importantly, this core network is disrupted to different levels of severity across ASD individuals, and is correlated with clinical severity in individual ASD toddlers. Thus, these results demonstrate how the heterogeneous genetic basis of ASD converges on a biologically relevant core network, capturing the underlying possible molecular etiology of ASD.

The invention is about the network activity and its diagnostic and prognostic power, which can then also be combined with effective conventional treatment therapies. The network can be constructed by different methods. However, the network activity in this invention has a specific meaning which is different than previously discussed network activity in the art. In this disclosure, the network activity is measured by the co-expression activity of the interacting genes. However, in the prior art, the overall fold change pattern of genes in the network is used as the measure of activity. Here, the approach of the disclosure is applied on ASD and shows that the network co-expression activity is predictive of ASD symptom severity. However, this approach is not limited to ASD and can be used to compare any two biological conditions, including other diseases. There are some prior art that the network activity is highest prior to a disease status and is gone when the disease is established. In that prior art view, the network activity is an indicator that a disease status is about to occur and does not have diagnostic or prognostic power. The present invention provides that the network activity has diagnostic and prognostic capacity. Moreover, the network activity in the prior art is based on the transcriptome measurements of impacted tissues. However, in the present invention, network activity is measured in a surrogate tissue which is not diseases. This is of critical importance to brain-related disorders, as direct access to the impacted tissue is not feasible.

This invention relates to systems approaches for distinguishing two or more conditions, such as individuals with neurodevelopmental disorders from typically developing control subjects. Specifically, it provides methods to identify and evaluate the co-expression activity of a network of biomolecules (such as genes mRNA or proteins) that indicates and/or correlates with the underlying pathobiology of a complex disease and/or disorder. In further embodiments, the invention demonstrates that the network activity has prognostic value and correlates with the severity of a complex disease or disorder. In further embodiments, the invention demonstrates that the network activity in a surrogate tissue, such as blood, is informative about the diagnosis status of disorders related to brain, for which direct access to impacted tissue is not feasible. In yet another embodiment, the invention shows that the network co-expression activity relates to the genetic basis of a complex disease and/or disorder.

This disclosure includes methods to measure the activity of a network of biomolecules (such as genes) based on the co-expression levels. The biomolecules involved in the network could be prioritized based on the comparison of two or more conditions. In certain aspects, this disclosure uses a selected transcriptome to build the model. The transcripts can be prioritized by differential expression analysis.

In embodiments, a network of selected biomolecules is constructed. This network demonstrates how the biomolecules interact with one another. This disclosure demonstrates that the approach is flexible on the type of the constructed network. Specifically, this disclosure shows that the method works with networks that are constructed based on prior existing knowledge or are purely data driven, or a combination of thereof. The activity of the constructed network from the biomolecules can be measured based on the co-expression strength of interactions present in the network. Specifically, first the co-expression strength will be measured for interaction present in the network. Next, the distribution of co-expression strengths will be compared to a distribution that is expected by chance. Accordingly, a significance level can be assigned to the co-expression strength of the constructed network. This disclosure provides a computer-implemented program that measures the network activity. This disclosure demonstrates that co-expression can be measured by either correlation or mutual information-based approaches. This disclosure demonstrates that the network activity can be measured at both the group level (e.g., disorder vs control) and the sample-based level. This disclosure shows that the network activity can be an indicator of disease state in samples from both impacted tissue as well as a surrogate tissue.

The network activity can be linked to the genetic basis of a complex disease or disorder. This disclosure shows that the devised network activity measure can be related to the underlying genetic basis of a complex disease/disorder and as such provides insights on the functionality of gene mutations. The network activity can be linked to the pathobiology of a complex disease/disorder. This disclosure shows that identified network activity in surrogate tissues such as blood can be linked to the underlying pathobiology of disease/disorder and as such can: 1) provide mechanistic insights about the disease/disorder; 2) highlights the molecular pathways that are directly associated to the disease/disorder (e.g., brain in the neurodevelopmental disorders) in individuals with the disease/disorder. This information can be leveraged to select known drugs for administration to treat the disease/disorder of impacted individuals. The network activity can have prognostic values and stratify the population of individuals with a complex disease/disorder. Since the network activity is related to the underlying pathobiology of the disease, this information can inform on the treatment options. The invention shows that the disease severity is correlated with the network activity.

BRIEF DESCRIPTION OF THE DRAWINGS

FIG. 2a shows an overview of this study. Transcriptome analysis of 226 toddlers with ASD or typical development identified 1236 DE genes. This disclosure used a comprehensive "static" network of DE genes from high confidence physical and regulatory interactions from the Pathway Commons, BioGrid, and Reactome databases. To identify transcriptional programs that are active in each diagnosis group, this disclosure retained pairs of interacting genes in the static network that are highly co-expressed in each diagnosis group. This yielded context specific DE-ASD and DE-TD networks, allowing to compare the activity of transcriptional programs between ASD and TD conditions. To connect the DE-ASD network to ASD risk genes, an XP-ASD network was built using DE and ASD risk (rASD) genes. The DE-ASD and XP-ASD networks were analyzed in the context of neural differentiation, ASD neuron models, and ASD symptom severity. To ensure results were robust to variations in the interaction networks, this disclosure reproduced the results by replacing the high confidence static network (the first step in pipeline) with a functional and a full co-expression network (Methods).

FIG. 2b shows an interacting DE genes are considerably more strongly co-expressed in the ASD toddlers compared to TD toddlers, suggesting pathways in the DE-ASD network are being modulated in ASD. For an unbiased analysis, the union of genes and interactions from DE-ASD and DE-TD networks was considered for this analysis (n=119

ASD and 107 TD toddlers; see also FIGS. 11a-11d). b) Genes in the DE-ASD network are highly expressed in the brain between 8 post conception weeks (pcw) to 1 year-old. For each gene, samples strongly expressing the gene (RPKM>5) were counted, based on BrainSpan normalized RNA-Seq data[34]. The background genes included all protein coding genes expressed in our microarray experiment and present in BrainSpan (n=187 neocortex samples; see also FIGS. 13a-13f). The plot illustrates the distribution of co-expression strength for the union of interactions that were significant and present in at least one of DE-ASD or DE-TD networks. DE networks are composed of high confidence physical and regulatory interactions.

Figures 2A, 2B, 2C, 2D, 2E, 2F:
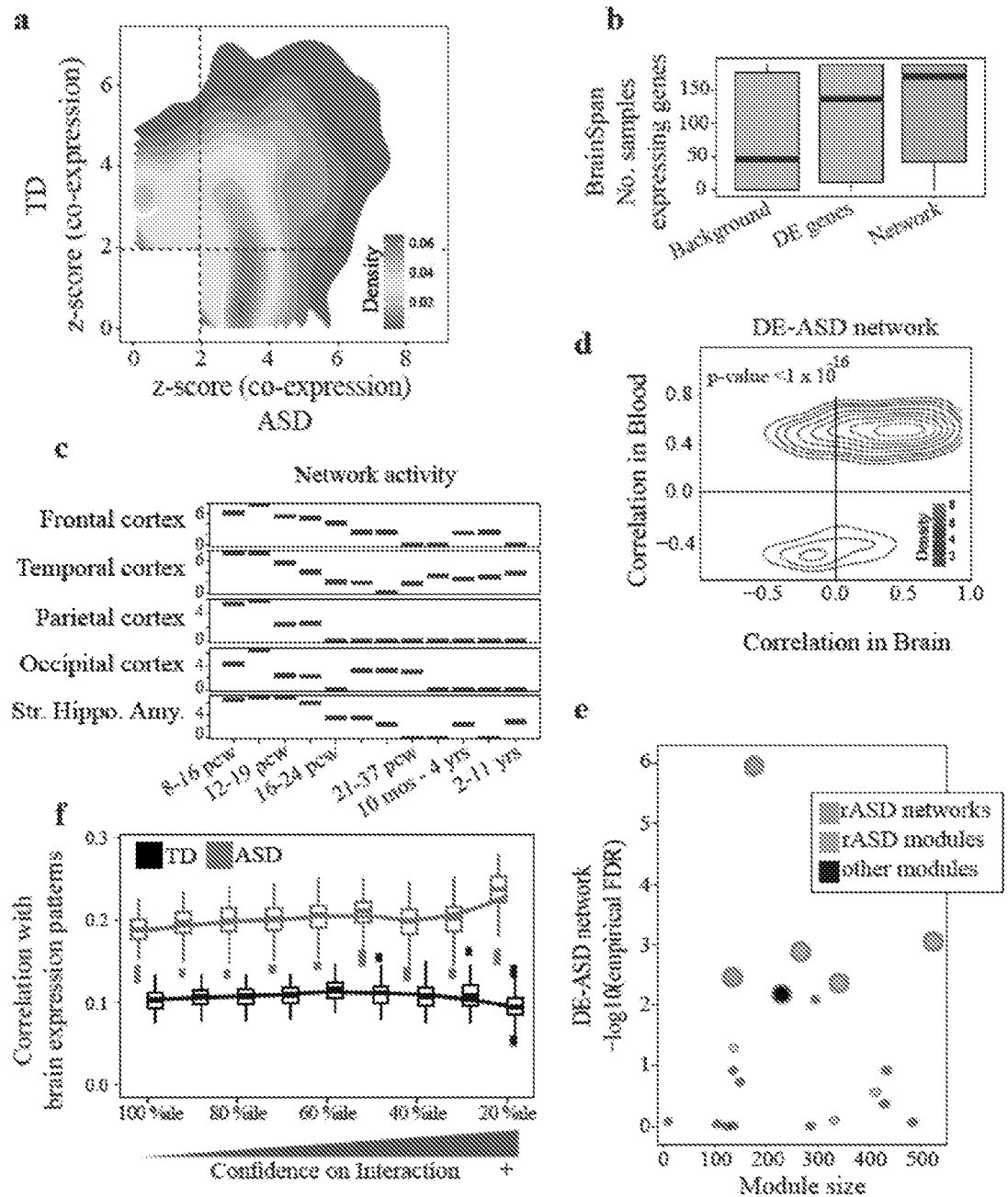
FIGS. 2a-2f show the elevated co-expression activity of the DE-ASD network in ASD leukocytes and its preservation in prenatal brain.

FIG. 2c shows genes in the DE-ASD network are highly expressed in the brain between 8 post conception weeks to 1 year old. For each gene, the number of samples strongly expressing the gene (RPKM>5) was counted based on BrainSpan normalized RPKM data[34]. The background genes were composed of all protein coding genes that were probed in a microarray experiment and were present in BrainSpan RNA-Seq dataset.

Figures 14A, 14B:
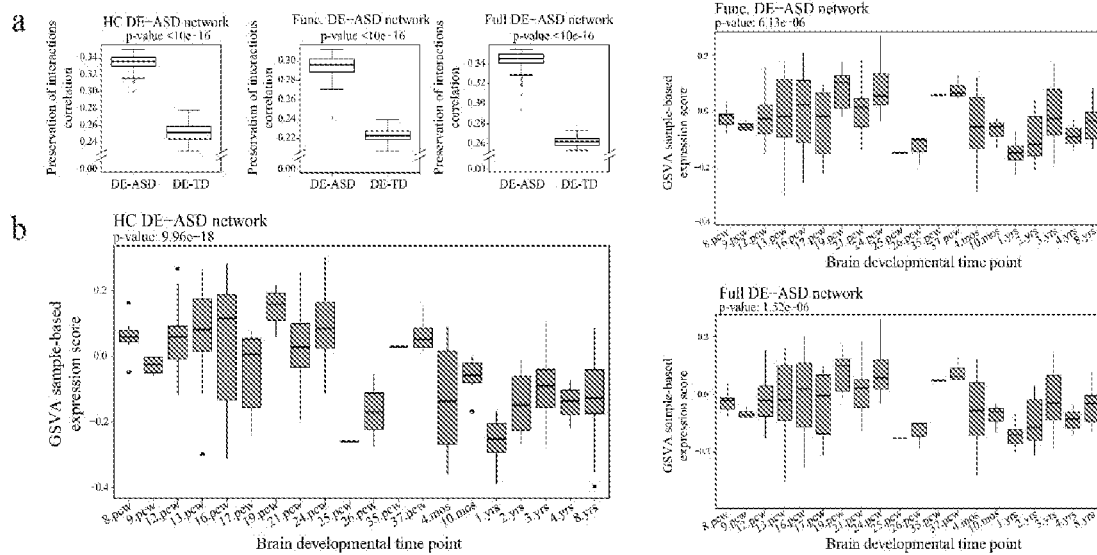

FIG. 2d shows the activity pattern of the DE-ASD network across brain regions during neurodevelopment. At each time window, the distribution of co-expression magnitudes of interacting gene pairs in the DE-ASD network was measured using unsigned Pearson's correlation coefficient (n=121 frontal, 73 temporal, 42 parietal, 27 occipital cortices, and 72 striatum, hippocampus, and amygdala samples across time points). The co-expression values were next compared to a background distribution using a Wilcoxon-Mann-Whitney test (Methods). The y-axis shows z-transformed p-values of this comparison. d) Leukocyte gene co-expression in the DE-ASD network is conserved in the prenatal and early postnatal neocortex transcriptome. The Pearson's correlation coefficient of interacting gene pairs in the DE-ASD network was calculated from the neocortex transcriptome (n=187 neocortex samples; 8 pcw until 1 year-old). The correlations were next paired with those in ASD group (n=119 subjects). A p-value was estimated by comparing the observed preservation of DE-ASD with that of DE-TD using a re-sampling method (FIGS. 14a-14b).

FIG. 2e shows a blood gene co-expression pattern of interactions in DE-ASD network is conserved in prenatal and early postnatal neocortex transcriptome data. The correlation of interacting gene pairs in the DE-ASD network were calculated based on neocortex transcriptome data from 8 post conception weeks until the postnatal age of 1 year old. The correlation patterns were next paired with those observed in ASD leukocytes.

FIG. 2f shows of the DE-ASD network with brain developmental modules and networks. Modules and networks enriched for rASD genes significantly overlap with the DE-ASD network (FDR<0.1; permutation test; Table S5). rASD networks: networks constructed around high confidence rASD genes[7,9]; rASD modules: co-expression modules enriched for rASD genes[11]; other modules: modules that are not enriched for rASD genes[11].

FIG. 2g shows similarity of interactions of a brain co-expression network around rASD genes[9] with ASD and TD samples as measured by Pearson's correlation coefficient. Boxplots represent the similarity based on 100 random sub-samplings (n=75 ASD and 75 TD). The x-axis represents the top percentile of positive and negative interactions based on the brain transcriptome interaction correlation value. Brain co-expression is based on transcriptome data from 10-19 pcw (see also FIGS. 13a-13f).

Figures 3A, 3B, 3C:
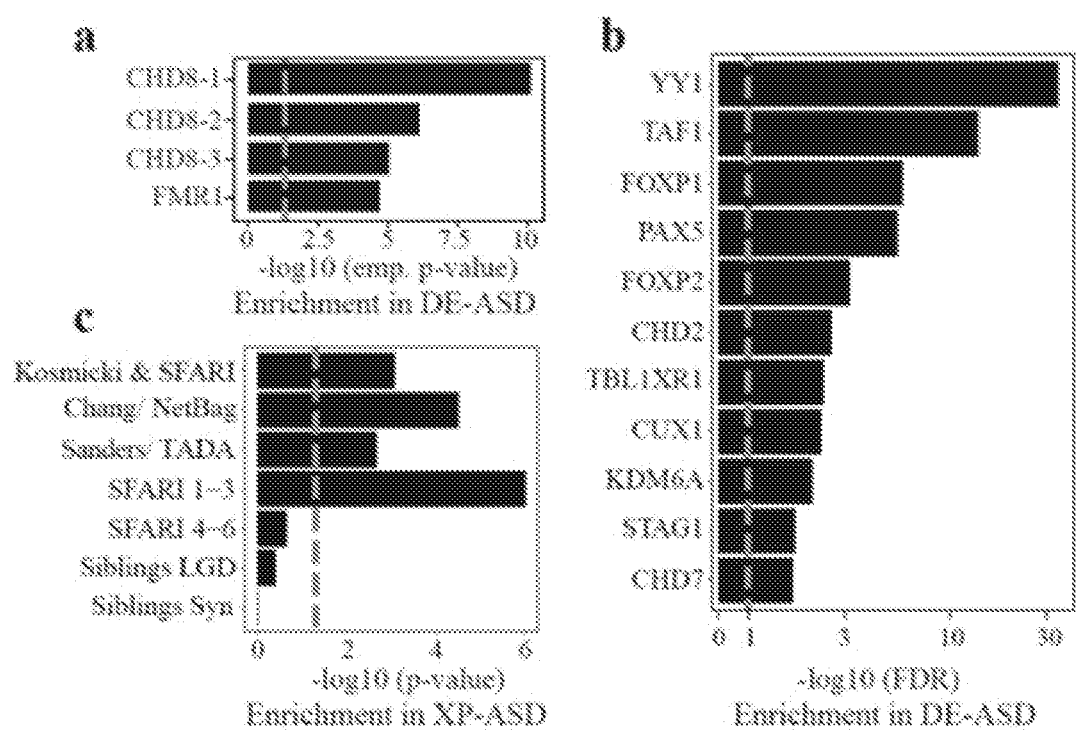

FIGS. 3a-3c show rASD genes are enriched for the regulators of the DE-ASD network. Interactions between DE and rASD genes are enriched for negative Pearson's correlation coefficients in the ASD leukocyte transcriptome (n=119 subjects; see FIGS. 15a-15f for more details). FIG. 3(a) shows The DE-ASD network is significantly enriched for genes that are up-regulated following the knock-down of CHD8 (empirical tests). Data were extracted from three studies: Sugathan et al.[36] (CHD8 k/d_1), Gompers et al.[38] (CHD8 k/d_2), and Cotney et al.[37] (CHD8 k/d_3). See also FIG. 16. FIG. 3(b) shows several rASD genes have their regulatory targets significantly enriched among the DE-ASD network based on the ENCODE data[38]. Here, each cell represents one experiment on the corresponding factor. The DE-ASD network significantly overlaps with the regulatory targets of rASD genes based on the ENCODE and Chea2016 repositories (FDR<0.1; hypergeometric test); dashed line shows p-value 0.05. See Table S6 for more details. The significance of overlap with DE-ASD was measured by hypergeometric test and FDR <0.1 was considered as significant. FIG. 3(c) shows high confidence genes are significantly enriched in the XP-ASD network (hypergeometric test). The lists of high confidence rASD genes were extracted from SFARI database[42], Kosmicki et al.[14], Chang et al.[7], and Sanders et al.[15]. List of likely gene damaging (LGD) and synonymous (Syn) mutations in siblings of ASD subjects were extracted from Iossifov et al.[13] Dashed line indicates FDR of 0.1. Expression patterns of DE-ASD genes were negatively correlated with rASD genes during in vitro differentiation of human primary neural precursor cells[43] (n=77 samples across time points; 3 fetal brain donors). In each panel, black circles represent the median expression of associated genes in a sample. Expression levels of each gene were normalized to have mean of zero and standard deviation of one across samples. While genes in the DE-ASD network are significantly down-regulated during neuron differentiation (p-value=$4.4 \times 10^{-6}$; Wilcoxon-Mann-Whitney test), XP specific genes are significantly up-regulated (p-value=$1.2 \times 10^{-3}$; Wilcoxon-Mann-Whitney test). The expression levels of CACNA1E, PRSS12, and CARTPT were considered as the markers of upper layer neurons (late stage of neural differentiation). See FIGS. 15a-15f for related details.

Figures 4A, 4B, 4C:
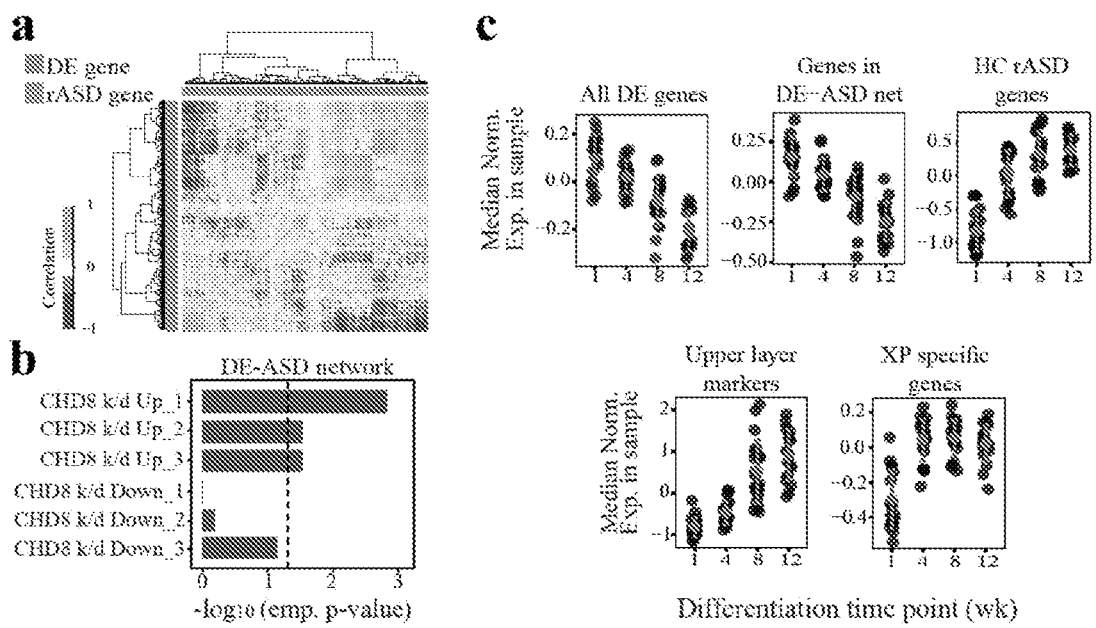

FIGS. 4a-4c show rASD genes potentially suppress the DE genes. FIG. 4a shows the expression of rASD genes is negatively correlated with the DE genes in leukocyte transcriptome data. See FIGS. 13a-13f for more details. FIG. 4b shows the DE-ASD network is significantly enriched for genes that are up-regulated in response to the knock-down of CHD8 rASD gene. Data were extracted from two studies of Sugathan et al[35] (CHD8 k/d_1) and Cotney et al 36 (CHD8 k/d_2). FIG. 4(c) shows expression patterns of DE genes are negatively correlated with those of rASD genes based on in vitro differentiation of human primary neural precursor cells 75. While genes in the DE-ASD network are significantly down-regulated during the neuron differentiation process (p-value=0.007), rASD genes show a significant up-regulation pattern (p-value=$1.12 \times 10^{-5}$). The expression levels of three genes of CACNA1E, PRSS12, and CARTPT were considered as the markers of upper layer neurons. See also FIGS. 13a-13f.

Figures 5A, 5B, 5C, 5D:
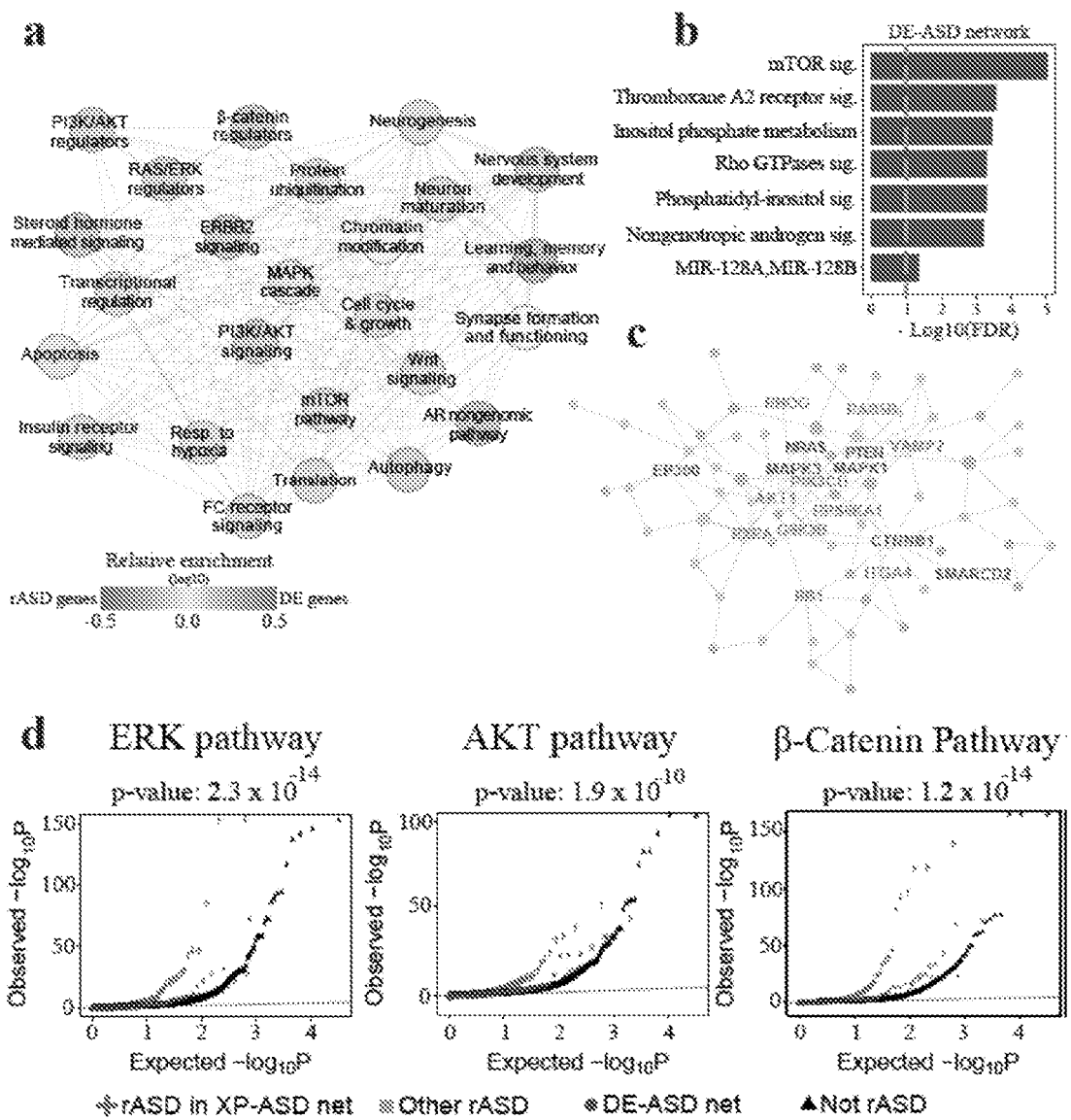

FIGS. 5a-5d shows the architecture of the XP-ASD network. FIG. 5a shows the summary of enriched biological processes in the XP-ASD network. Each node represents a biological process that is significantly enriched in the XP-ASD network (two-sided Fisher's exact test). Nodes that preferentially include rASD and DE genes are represented by purple and green greyscales, respectively. The interactions among terms represent the connection patterns of their cognate genes in the XP-ASD network with thicker interactions indicating more significant connections (hypergeometric test). Only connections with p-value <0.05 are shown. This illustration covers 86% of genes involved in the XP-ASD network. FIG. 5b shows all processes that are significantly enriched in the DE-ASD network (Benjamini-Hochberg corrected FDR <0.1; hypergeometric test). These processes are also up-regulated in ASD leukocytes based on GSEA (n=119 ASD and 107 TD). FIG. 5c shows the connected graph of hubs in the XP-ASD network. Green nodes represent hub genes in both XP-ASD and DE-ASD networks, while XP-ASD network-only hub genes are in purple. See FIG. 17 for the network with all gene labels. FIG. 5d shows significant enrichment of rASD genes in the XP-ASD network for the regulators of RAS/ERK, PI3K/AKT, WNT/β-catenin pathways. The x-axis indicates the p-value that gene mutations would dysregulate the corresponding signaling pathways. The background is composed of all genes that were assayed in Brockmann et al.[47], excluding rASD and DE genes. The significance of enrichment of rASD genes in XP-ASD network for the regulators of signaling pathways were examined using Wilcoxon-Mann-Whitney test with background genes (illustrated in black) as control.

Figures 6A, 6B, 6C, 6D:
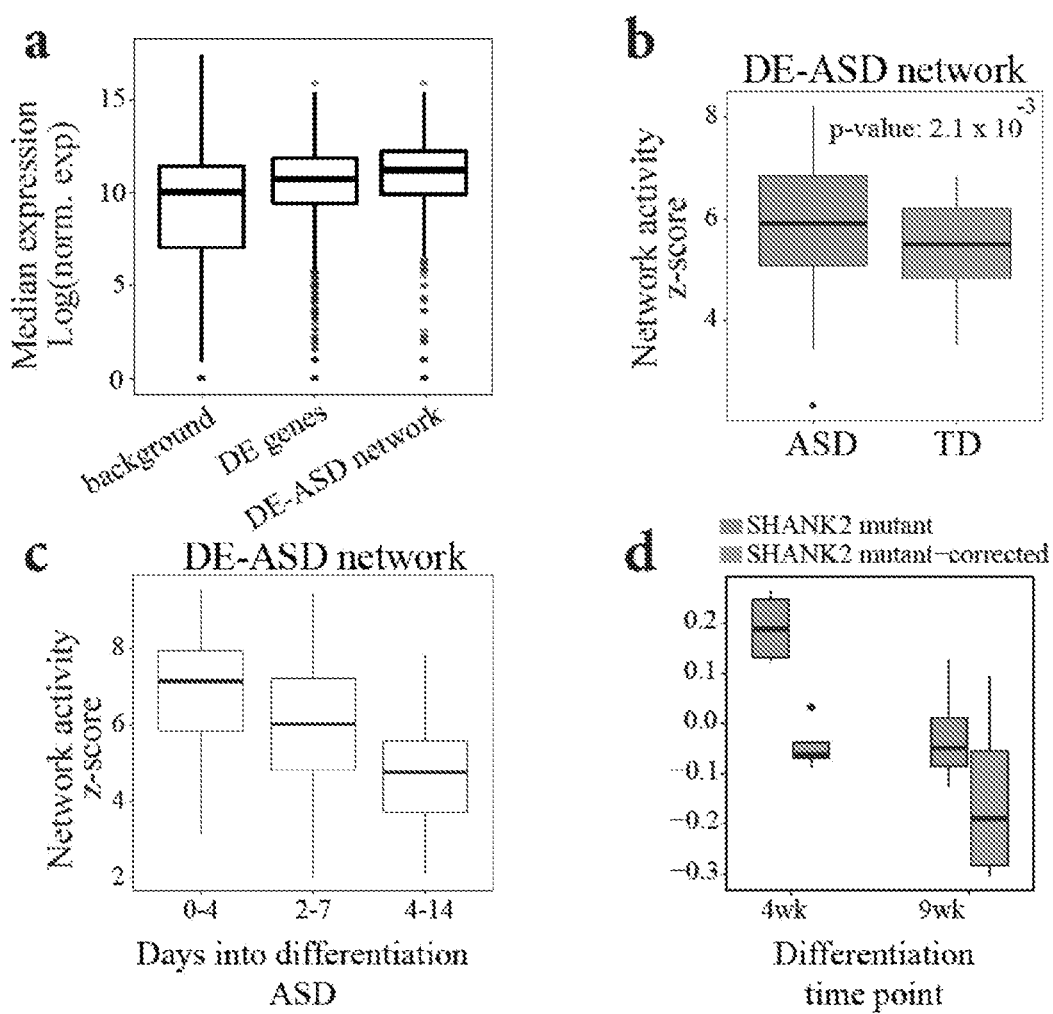

FIGS. 6a-6d show the DE-ASD network is over-active in differentiating neurons of ASD cases. FIG. 6a shows the DE-ASD network is more highly expressed during neural differentiation of iPSCs from ASD and TD cases[48] (p-value $<9 \times 10^{-30}$; two-sided Wilcoxon-Mann-Whitney test). For each gene, its median expression at hiPSC, neural progenitor and neuron stages was considered (n=65 samples from 13 donors). Similar patterns were observed when analyzing each stage independently. FIG. 6b shows the DE-ASD network shows higher co-expression activity in ASD derived neural progenitors and neurons. To estimate the co-expression strength of interacting gene pairs in DE-ASD network in neural progenitor and neurons (D0, D2, D4, D7, D14) of ASD and TD cases, we sub-sampled the dataset (progenitor and neuron samples from 4 individual within ASD and TD diagnosis groups) 100 times and measured the activity level at each iteration (Methods). The boxplots represent the distribution of z-transformed p-values of co-expression strength as measured by a two-sided Wilcoxon-Mann-Whitney test. FIG. 6c shows temporal activity of DE-ASD network in hiPSC-derived neural progenitor and neuron models of subjects with ASD. Consistent with the results on the fetal brain development (FIG. 4c), DE-ASD network shows peak activity at Day 0 to Day 4 into differentiation. See also FIG. 18. FIG. 6d shows DE-ASD network is highly active in hiPSC-derived neuron models of SHANK2 high confidence rASD gene. The panel compares the activity of DE-ASD network between a hiPSC-derived neurons of SHANK2 mutation and the CRISPR corrected cell lines with the same genetic background.

Figures 7A, 7B:
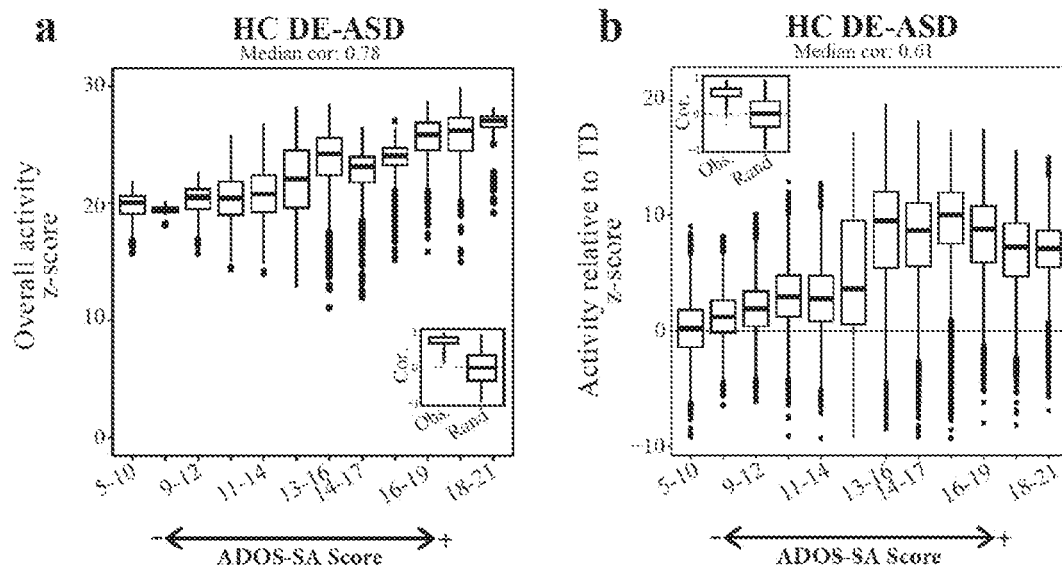

FIGS. 7a-7b shows the activity level of DE-ASD networks are correlated with ASD severity. FIG. 7a shows ASD toddlers were sorted by their ADOS social affect scores (ADOS-SA) with higher scores representing more severe cases. The network activity was measured in a running window on ADOS-SA scores. The overall activity of the DE-ASD network in a set of samples was measured by comparing the co-expression magnitude of interactions in the network with the background derived from the same set of samples (Methods). To ensure robustness of the results, the co-expression activity of the DE-ASD network at each severity group was measured by randomly selecting n=20 subjects with ASD from that severity level, iterating 1000 times. The left inset panel illustrates the distribution of observed correlation values of DE-ASD network with the ADOS-SA severity, and compares it with permuted data from 10,000 random shuffling of ADOS-SA scores of subjects with ASD (two-sided p-value <106; permutation test; see FIGS. 19a-19c). FIG. 7b The relative co-expression magnitude of the DE-ASD networks compared to TD cases. FIG. 7b shows the relative activity of DE-ASD networks compared to TD cases. The relative activity level was estimated by comparing the co-expression strength of interactions in the DE-ASD network between ASD and TD toddlers. For each severity group, n=20 ASD samples in that ADOS-SA range were randomly selected and compared to n=20 random TD samples, iterating 1000 times. Significance of the trend was evaluated by 10,000 permutations of the ADOS-SA scores in toddlers with ASD (two-sided p-value $<10^{-6}$; permutation test; see FIGS. 19a-19c).

Figures 8A, 8B:
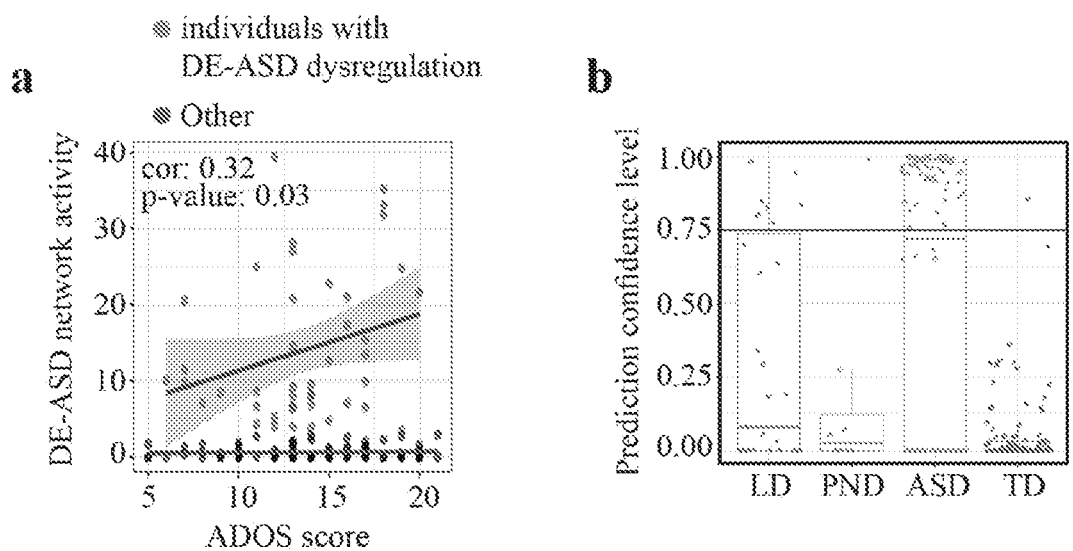

FIG. 8 shows a sample-based analysis of DE-ASD network dysregulation identifies two subtypes of ASD. Subjects with ASD were scored based on the extent of DE-ASD dysregulation. This analysis identified two distinct subtypes of subjects with ASD (i.e., red and gray circles). The DE-ASD network was dysregulated in the first subtype and its dysregulation level was correlated with the symptom severity these individuals. However, the DE-ASD network did not exhibit any significant dysregulation in the second subtype. A random forest classifier was trained on measured dysregulation level of DE-ASD network. Other measures were also included as features, where the other measures were related to the gene expression pattern of DE genes (total of 6 features and 286 samples). Fivefold cross-validation was employed in which 80% of samples were used for the model training and the remaining 20% were used for the model testing. Iterating on all 5 folds, this disclosure calculated the confidence level on the classification of each subject when included in the test fold. As illustrated, the classifier reached to high performance in separating about 50% of individuals with ASD. However, for those ASD individuals that DE-ASD network was not distrupted, the classifier could not distinguish them from TD and contrast groups.

Figures 9A, 9B, 9C, 9D, 9E, 9F, 9G, 9H, 9I:
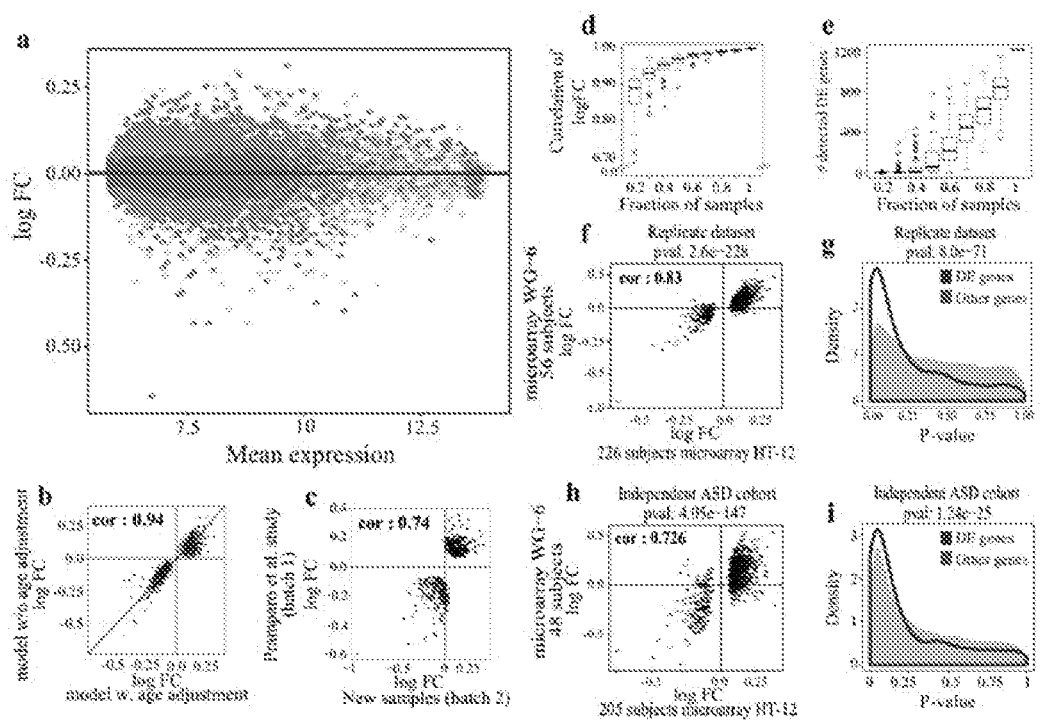

FIGS. 9a-9c illustrate robustness analysis of observed DE patterns.

FIGS. 10a-10e illustrate the presence of confounding factors in the gene expression data.

FIGS. 11a-11d illustrate robustness analysis related to transcriptional over-activity of DE network in ASD samples.

Figures 12A, 12B, 12C:
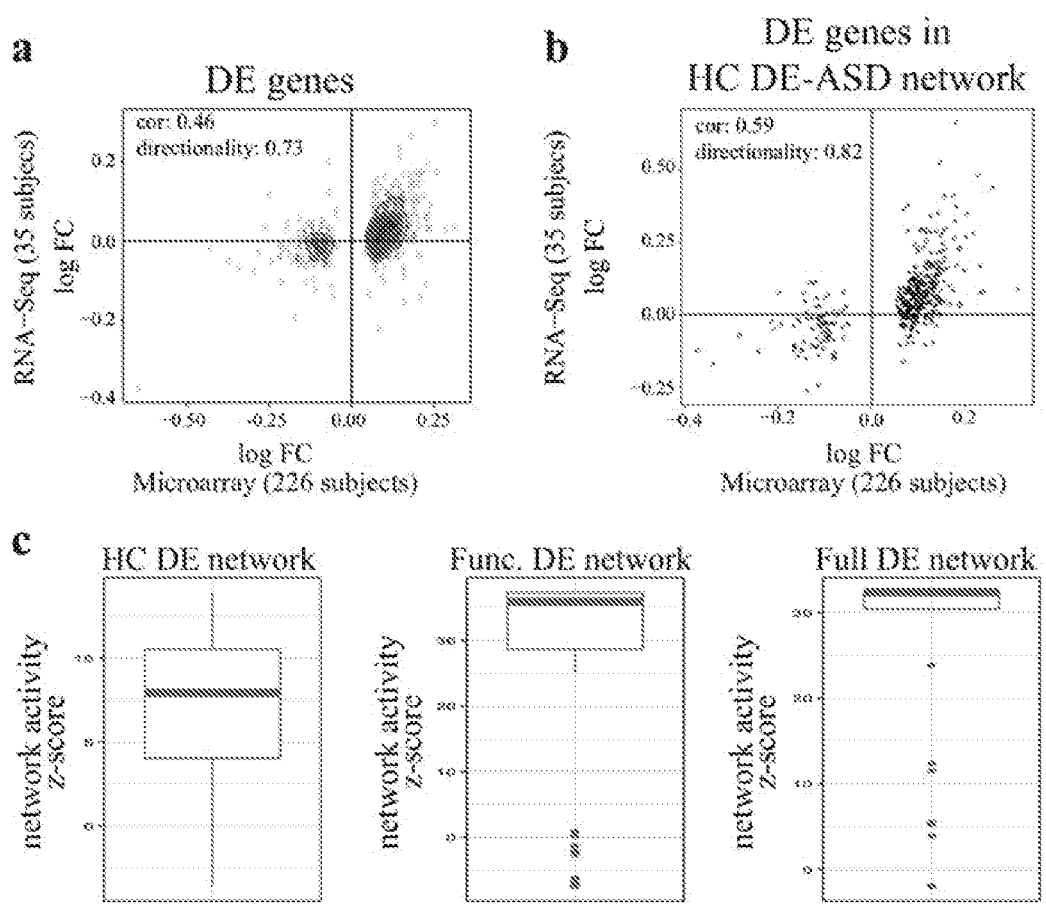

FIGS. 12a-12c illustrate reproducibility of the signature in an independent cohort as measured by RNA-Seq.

FIGS. 13a-13f illustrate DE genes that are involved in networks that are preserved between blood and brain tissues.

FIGS. 14a-14b illustrate DE-ASD network that is transcriptionally active at prenatal brain.

FIGS. 15a-15g illustrate robustness analysis of observed association of rASD genes with DE-ASD networks.

Figures 16A, 16B, 16C:
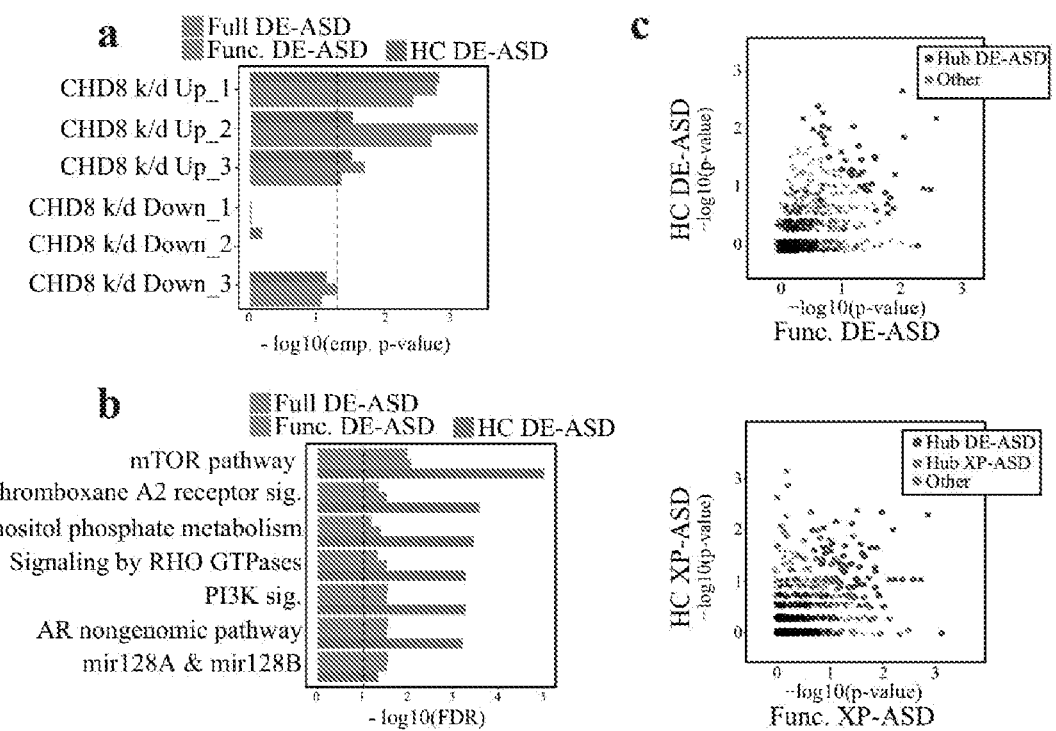

FIGS. 16a-16c illustrate biological process enrichment analysis of the DE-ASD and XP-ASD networks.

Figure 17:
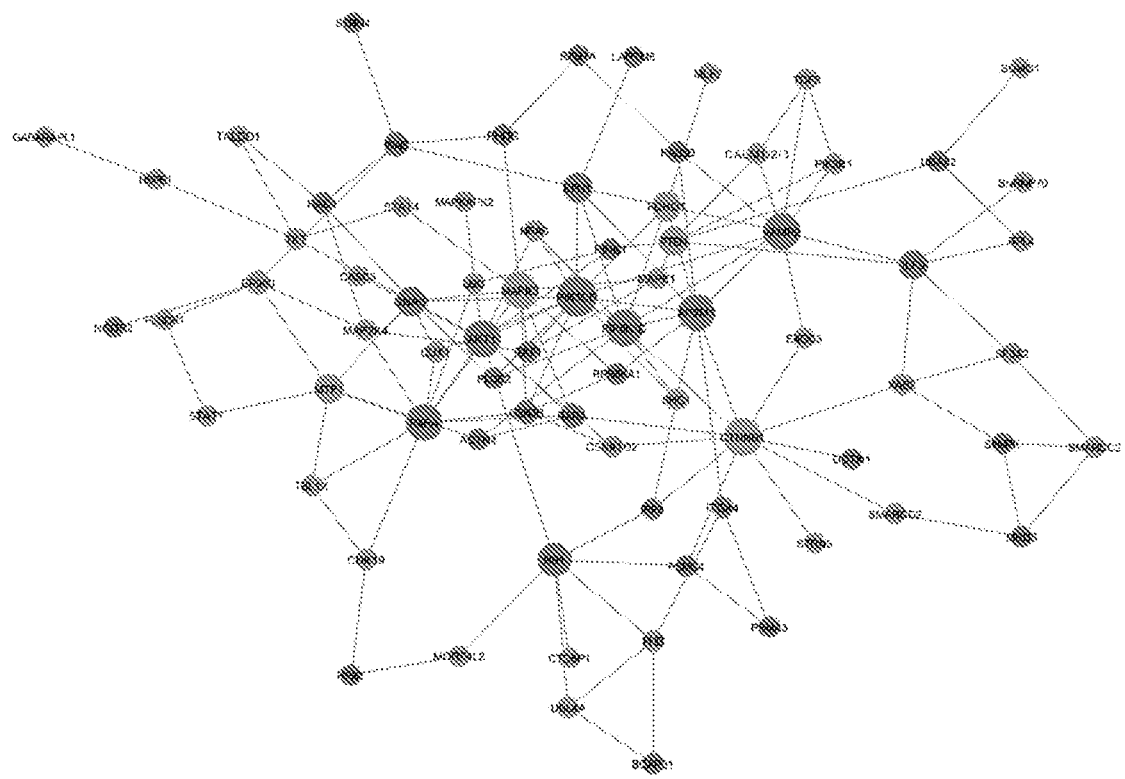

FIG. 17 illustrates a network of hub genes in the DE-ASD and XP-ASD networks.

Figures 18A, 18B, 18C:
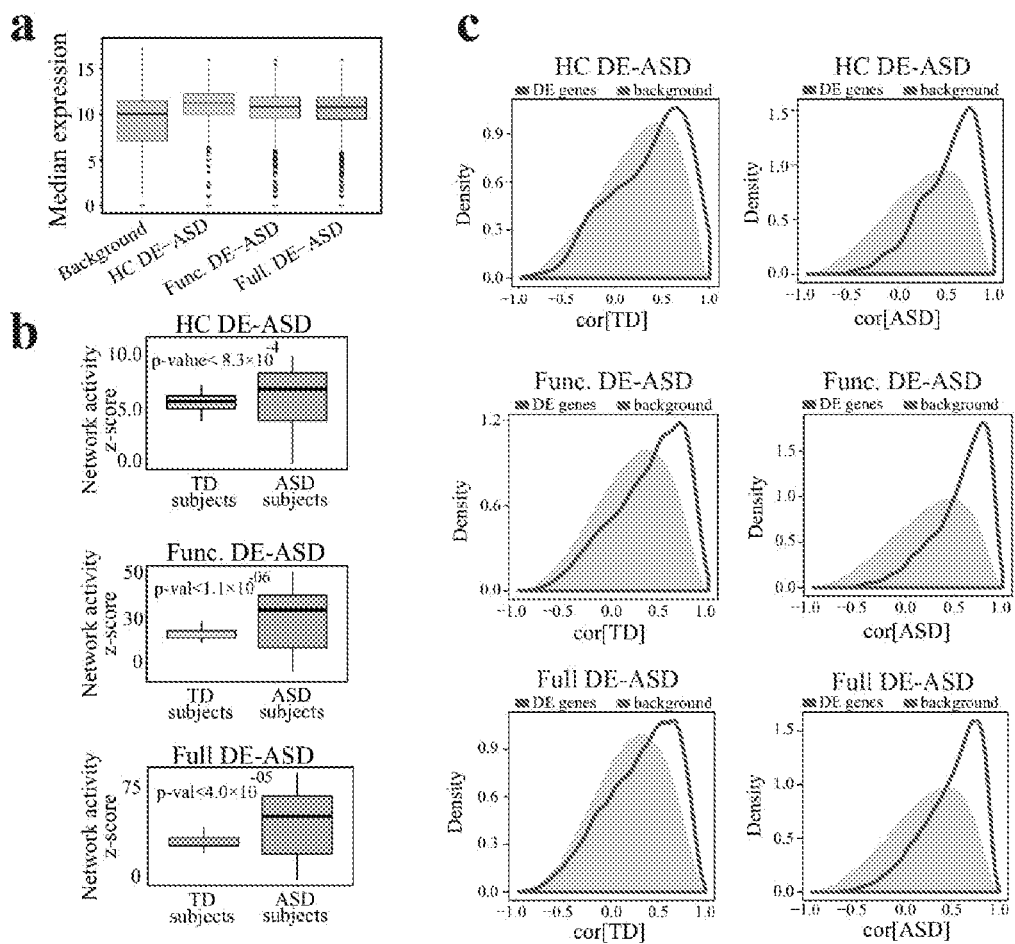

FIGS. 18a-18c illustrate elevated co-expression of the DE-ASD networks in ASD neuron models.

Figures 19A, 19B, 19C:
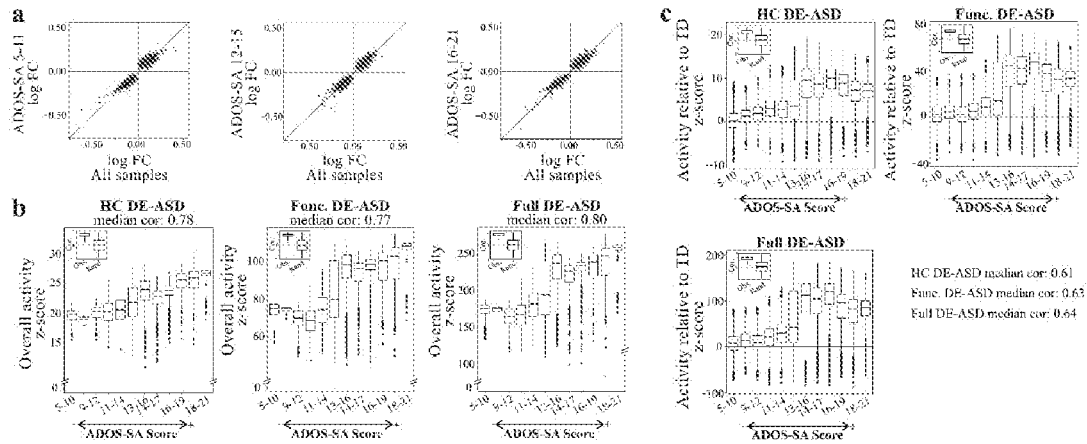

FIGS. 19a-19c illustrate DE-ASD network transcriptional activity is correlated with ADOS-SA deficit scores.

Figures 20A, 20B, 20C:
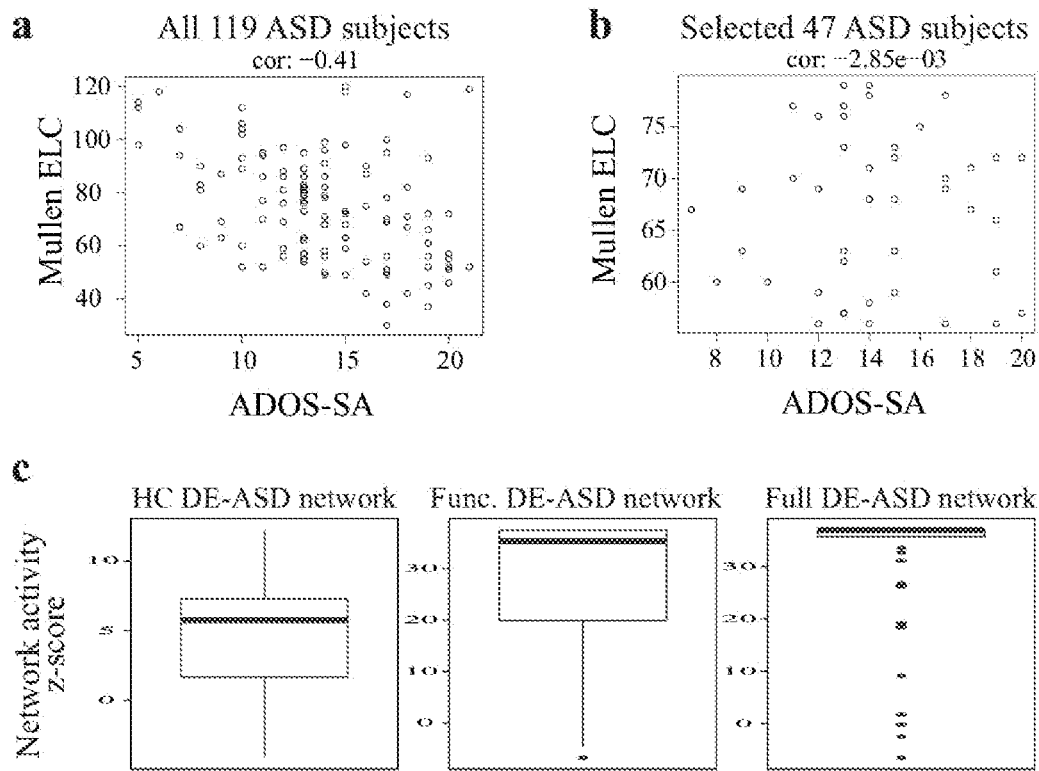

FIGS. 20a-20c illustrate isolating the effect of ADOS-SA scores on the co-transcriptional activity of DE-ASD networks.

FIGS. 21a-21d illustrate batch effects could be effectively handled by linear regression models.

Figures 22A, 22P:
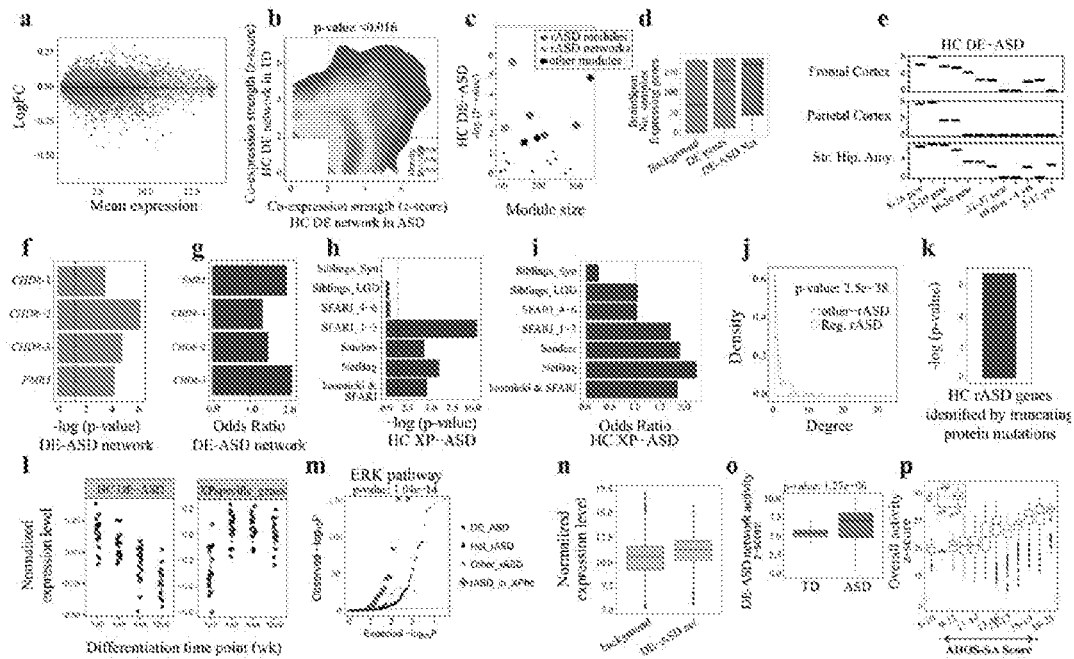

FIGS. 22a-22p illustrate reproducibility of results under a different analysis setting.

DETAILED DESCRIPTION OF THE INVENTION

The present invention provides in embodiments a method of diagnosing, prognosing and treating a disease in a subject comprising: (a) obtaining a biological sample of the subject; (b) measuring expression patterns of more than two molecular markers in the blood sample; (c) comparing the molecular marker patterns with healthy controls for gene regulatory mechanisms, signaling pathways and protein interactions to determine a dysregulated network in the subject based on a co-expression pattern of interacting genes in the network; and optionally (d) administering an effective disease therapy to the subject.

The present invention provides a method wherein the molecular marker is selected from DNA, RNA, protein, metabolites, glycans, and lipids. The present invention provides a method wherein the biological sample is blood. The present invention provides a method wherein the disease is autism. The present invention provides a method wherein the disease is ASD and the markers are genes selected from RAS/ERK, PI3K/AKT and WNT/β-catenin pathway genes. The present invention provides a method wherein the biological sample is a non-neurologic tissue sample, and wherein the disease is a neurologic disease.

The present invention provides a method further comprising: determining a change in co-expression strength or a correlation between any two molecular markers in the blood sample; and diagnosing a disease of disorder using the change or the correlation.

The present invention provides a method further comprising: evaluating co-expression or correlation of molecules or markers in the blood sample, where the molecules are RNA, protein, metabolites, glycans, lipids, or DNA markers, and wherein the markers can be obtained from tissue or fluids.

The present invention provides a method further comprising: building a network from markers that change between two different conditions.

The present invention provides a method further comprising: determining co-expression magnitudes using either correlation and information theory based metrics.

The present invention provides a method further comprising: determining a correlation between the magnitude of co-expression with a disease severity or prognosis.

The present invention provides a method further comprising: determining differences in magnitude of co-expression or correlation or changes in co-expression or correlation associated with another metric; and determining a distinct subtype of a disorder using the differences.

The present invention provides a method of diagnosing, prognosing, and treating a disease in a subject comprising: (a) obtaining a biological sample of the subject; (b) measuring expression patterns of more than two molecular markers in the blood sample; (c) comparing the molecular marker patterns with healthy controls for gene regulatory mechanisms, signaling pathways and protein interactions to determine a dysregulated network in the subject based on a co-expression pattern of interacting genes in the network; (d) administering an effective disease therapy to the subject; and (e) determining an effect of the therapy on a co-expression/correlation activity of the network.

The present invention provides a method of diagnosing, prognosing, and treating a disease in a subject wherein the molecular marker is selected from DNA, RNA, protein, metabolites, glycans, and lipids.

The present invention provides a method of diagnosing, prognosing, and treating a disease in a subject wherein the effective disease therapy is a first treatment is connected to subjects in a first subgroup of the disorder, and a second treatment connected to subjects in a second subgroup of the disorder.

The present invention provides a method of diagnosing, prognosing, and treating a disease in a subject wherein the biological sample is blood.

The present invention provides a method of diagnosing, prognosing, and treating a disease in a subject wherein the disease is autism.

The present invention provides a method of diagnosing, prognosing, and treating a disease in a subject wherein the disease is ASD and the markers are genes selected from RAS/ERK, PI3K/AKT and WNT/β-catenin pathway genes.

The present invention provides a method of diagnosing, prognosing, and treating a disease in a subject wherein the biological sample is a non-neurologic tissue sample, and wherein the disease is a neurologic disease.

The present invention provides a method of diagnosing, prognosing, and treating a disease in a subject further comprising: determining a change in co-expression strength or a correlation between any two molecular markers in the blood sample; and diagnosing a disease of disorder using the change or the correlation.

In many disease conditions, transcriptional programs in cells deviate from normal states due to dysregulations in signaling pathways, transcription factors and epigenetic marks. Therefore, this disclosure employs a systems approach to decipher network-level transcriptional perturbations in leukocyte transcriptome data. This disclosure provides that perturbations to disease-associated molecular pathways are reflected in the co-expression patterns between genes. To identify such disease-relevant dysregulations, context specific networks were built by integrating gene expression data from each condition with available knowledge on the gene interaction data. The magnitude of co-expressions between the context-specific networks was compared using a novel approach. In an exemplary embodiment, this disclosure applies this framework on Autism Spectrum Disorder (ASD), and shows that this approach can identify network-level dysregulations in ASD. This disclosure finds that this network is applicable to the underlying pathobiology of the ASD and predicts ASD symptom severity.

While ASD demonstrates a strong genetic basis, it heretofore remains elusive how implicated genes are connected to the molecular dysregulations that underlie the disorder at prenatal and early postnatal ages. Towards this, this disclosure includes an exemplary systems biology framework that integrates transcriptomic dysregulations in living ASD toddlers with current knowledge on ASD risk genes to explain ASD associated fetal-stage brain transcriptomic changes and clinical outcomes. Specifically, a dysregulated transcriptional network was found that shows elevated gene co-expression activity in ASD toddlers. This core network was robustly associated with rASD genes with likely deleterious mutations in ASD subjects. Such rASD genes have potentially large effect size on the etiology but occur in a small percentage of the ASD population[48,49]. This disclosure shows that many rASD genes exert their regulatory effect on this DE-ASD core network through the inter-connected RAS/ERK, PI3K/AKT, and WNT/β-catenin signaling pathways. The connection of the DE-ASD network (that is constructed based on data drawn from the general ASD pediatric population) with high confidence rASD genes provides empirical evidence of shared mechanisms underlying ASD in both those with high penetrant rASD genes and those of other etiologies (e.g., common variants, environmental factors) in the wider ASD population.

The key aspect of our signature is that it is constructed based on transcriptomic data from young living ASD toddlers. This allows correlation of variations with the core clinical features of the same ASD toddlers. Indeed, the dysregulation degree of DE-ASD network correlated with the toddlers' ADOS social and communication deficits. Social and behavioral deficits are also suggested to be correlated with the genetic variations in ASD subjects 50.51; and previous studies have established the effect of the PI3K/AKT signaling pathway (central to the DE-ASD core network and significantly altered in ASD leukocytes) on social behaviors of mouse models 42.43. Together, these observations indicate that etiological roots of ASD converge on gene networks that correlate with the symptom severity in ASD individuals. Moreover, the results described in this disclosure show that stronger dysregulation of the same core network could lead to higher severity in the ASD cases. The DE-ASD core network is enriched for pathways implicated in ASD, strongly associated with high confidence rASD genes, and correlate with ASD severity. The network co-expression activity measure of this disclosure is a summary score from the strongest signal in the dataset (i.e., differentially expressed genes) at a group level (i.e., severity level).

The emerging architecture of complex traits suggests that gene mutations often propagate their effects through regulatory networks and converge on core pathways relevant to the trait[21,52]. This disclosure's findings support the existence of an analogous architecture for ASD, wherein rASD genes with diverse biological roles overlap in their down-stream function. Although not significantly overlapping with rASD genes, this disclosure finds that the DE-ASD network is significantly co-expressed with rASD genes in both blood and brain tissues. This disclosure also illustrates that the DE-ASD network could be controlled by rASD genes through direct transcriptional regulation or highly interconnected signaling pathways. This disclosure provides that the DE-ASD network is a primary convergence point of ASD etiologies, including its genetic basis as elaborated for rASD genes, in a large portion of the ASD population. This predicts that the spectrum of autism in such cases is correlated with the degree and mechanism of the perturbation of the DE-ASD network. A detailed analysis of iPS cell-derived ASD neurons demonstrated the dysregulation of the leukocyte-based DE-ASD network in ASD neurons, supporting the neural-level relevance of the findings to ASD etiology and its prevalence in the ASD population. Furthermore, direct clinical-level relevance is demonstrated by the high correlation found between degree of dysregulation in the DE-ASD core network and ASD symptom severity in the ASD toddlers.

The currently recognized rASD genes are not fully penetrant to the disorder, except for a handful of syndromic genes[48,49,53,54]. The analysis of the XP-ASD network provides some insights on how the effects of rASD genes can combine to result in ASD. Although some rASD genes could directly modulate the DE-ASD network at the transcriptional level, this disclosure's results indicate that the regulatory consequence of many rASD genes on the DE-ASD network is canalized through the PI3K/AKT, RAS/ERK, WNT and β-catenin signaling pathways. The structural and functional interrogation of the DE-ASD network localized the PI3K/AKT pathway to its epicenter and demonstrated enrichments for processes down-stream of this pathway. Moreover, this disclosure finds that high confidence rASD genes are better connected to the DE-ASD core network, suggesting that the closeness and influence of genes on these signaling pathways is correlated with their effect size on the disorder. These results articulate that perturbation of the PI3K/AKT, RAS/ERK, WNT and β-catenin signaling pathways through gene regulatory networks is an important etiological route for ASD that is associated with the disorder severity level in a relatively large fraction of the ASD population. Congruent with this hypothesis, cell and animal models of ASD have demonstrated the enrichment of high confidence rASD genes for the regulators of the RAS/ERK, PI3K/AKT, WNT and β-catenin signaling pathways[3,8,11,17,42,43,46] These signaling pathways are highly conserved and pleiotropic, impacting multiple prenatal and early postnatal neural development stages from proliferation/differentiation to synaptic and neural circuit development[3]. Such multi-functionalities may be the underlying reason for the detection of the signal in ASD leukocytes.

This disclosure presents the largest transcriptome analysis on early-age ASD cases thus far from such settings. The analysis was focused on the strongest signal that best differentiates ASD cases from TD individuals (i.e., differentially expressed genes). Here this disclosure illustrates that the captured signal is informative about the transcriptional organization of ASD and shows how to bridge the gap between genetic and clinical outcomes. The presented framework provides methods to systematically diagnose, classify and prognostically stratify ASD cases at early postnatal ages based on the underlying molecular mechanisms. The concept of precision molecular medicine for ASD can be actualized via approaches that illuminate the early-age living biology of ASD[3,17,20]. ASD toddler-derived iPS cell studies show ASD is a progressive prenatal and early postnatal disorder that involves a cascade of diverse and varying molecular and cellular changes such as those resulting from dysregulation of the pathways and networks highlighted herein[3,29,30]. As such, dynamic, individual-based molecular assays in infants and toddlers will be essential to develop. The presented framework provides for the development of quantitative, molecular-based measures for the ASD diagnosis and prognosis by identifying specific molecular dysregulations that are observable in leukocytes of a large fraction of living ASD toddlers at young ages.

Hundreds of genes are implicated as risk factors for autism spectrum disorder (ASD). However, the mechanisms through which these genes exert their effects at early ages in ASD remain unclear. To identify such mechanisms, transcriptomics from ASD toddlers were analyzed to discover a core gene network with dysregulated gene co-expression. The identified network includes highly expressed processes in fetal-stage brain development and is dysregulated in neuron models of ASD. This disclosure identifies ASD risk genes across diverse functions are upstream and regulate this core network. In particular, many risk genes impact the core network through the RAS/ERK, PI3K/AKT, and WNT/β-catenin signaling pathways. Finally, the dysregulation degree of this core network positively correlates with early-age ASD clinical severity. Thus, these results provide insights into how the heterogeneous genetic basis of ASD could converge on a core network with consequence on the postnatal outcome of toddlers with ASD.

This disclosure includes a systems biology framework to identify ASD-related perturbed molecular processes in the leukocyte surrogate tissue. Specifically, this framework was exploited to delineate the architecture of transcriptional dysregulation in ASD, its connection to rASD genes, and its association with prenatal brain development and postnatal socialization symptom severity in ASD. A dysregulated gene network was discovered by analyzing leukocyte transcriptomic data from 1-4 year-old toddlers with ASD and typical development (TD). This perturbed network is highly expressed, conserved and active in fetal brains. The dysregulated network is enriched for pathways known to be perturbed in ASD neurons, and is dysregulated in hiPSC-derived neurons of SHANK2 high confidence rASD gene as well as hiPSCs from subjects with ASD and brain enlargement. Consistent with the postulated structure of complex traits[21,30], this disclosure shows that rASD genes in diverse functional groups converge upon and regulate this core network. Importantly, the dysregulation extent of this core network predicts the severity of socialization deficits in toddlers with ASD. Thus, the framework presented here facilitates the development of quantitative, molecular-based measures for diagnosis and prognosis of brain disorders and diseases including ASD, by identifying specific molecular dysregulations that we show are observable in leukocytes of a large fraction of toddlers with ASD.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

It is understood that aspects and embodiments of the invention described herein include "consisting" and/or "consisting essentially of" aspects and embodiments.

Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The invention provides for the practice of the described methods herein in certain embodiments with the selection of at least 5, 10, 20, 30, 40, 50, 60, 70, 80, 90, 100, 150, 200, 250, 300, 400, or 500 of the biomarkers (e.g., expressed genes) listed in Tables 1-4.

Pharmaceutically active: The term "pharmaceutically active" as used herein refers to the beneficial biological activity of a substance on living matter and, in particular, on cells and tissues of the human body. A "pharmaceutically active agent" or "drug" is a substance that is pharmaceutically active and a "pharmaceutically active ingredient" (API) is the pharmaceutically active substance in a drug. As used herein, pharmaceutically active agents include synthetic or naturally occurring small molecule drugs and more complex biological molecules.

Pharmaceutically acceptable: The term "pharmaceutically acceptable" as used herein means approved by a regulatory agency of the Federal or a state government or listed in the U.S. Pharmacopoeia, other generally recognized pharmacopoeia in addition to other formulations that are safe for use in animals, and more particularly in humans and/or non-human mammals.

As used herein, "preventative" treatment is meant to indicate a postponement of development of a disease, a symptom of a disease, or medical condition, suppressing symptoms that may appear, or reducing the risk of developing or recurrence of a disease or symptom. "Curative" treatment includes reducing the severity of or suppressing the worsening of an existing disease, symptom, or condition.

As used herein, the term "therapeutically effective amount" refers to those amounts that, when administered to a particular subject in view of the nature and severity of that subject's disease or condition, will have a desired therapeutic effect, e.g., an amount which will cure, prevent, inhibit, or at least partially arrest or partially prevent a target disease or condition. More specific embodiments are included in the sections below. In some embodiments, the term "therapeutically effective amount" or "effective amount" refers to an amount of a therapeutic agent that when administered alone or in combination with an additional therapeutic agent to a cell, tissue, or subject is effective to prevent or ameliorate the disease or condition such as an infection or the progression of the disease or condition. A therapeutically effective dose further refers to that amount of the therapeutic agent sufficient to result in amelioration of symptoms, e.g., treatment, healing, prevention or amelioration of the relevant medical condition, or an increase in rate of treatment, healing, prevention or amelioration of such conditions. When applied to an individual active ingredient administered alone, a therapeutically effective dose refers to that ingredient alone. When applied to a combination, a therapeutically effective dose refers to combined amounts of the active ingredients that result in the therapeutic effect, whether administered in combination, serially or simultaneously.

"Treating" or "treatment" or "alleviation" refers to therapeutic treatment wherein the object is to slow down (lessen) if not cure the targeted pathologic condition or disorder or prevent recurrence of the condition. A subject is successfully "treated" if, after receiving a therapeutic amount of a therapeutic agent, the subject shows observable and/or measurable reduction in or absence of one or more signs and symptoms of the particular disease. Reduction of the signs or symptoms of a disease may also be felt by the patient. A patient is also considered treated if the patient experiences stable disease. In some embodiments, treatment with a therapeutic agent is effective to result in the patients being disease-free 3 months after treatment, preferably 6 months, more preferably one year, even more preferably 2 or more years post treatment. In many embodiments, an effective treatment of the disease or condition, such as autism, may be other physical, visual or auditory therapies, rather than drug administration, such as are known or later recommended. These parameters for assessing successful treatment and improvement in the disease are readily measurable by routine procedures familiar to a physician of appropriate skill in the art.

As used herein, a subject in need refers to an animal, a non-human mammal or a human including a human fetus, neonate, toddler, or adult. As used herein, "animals" include a pet, a farm animal, an economic animal, a sport animal and an experimental animal, such as a cat, a dog, a horse, a cow, an ox, a pig, a donkey, a sheep, a lamb, a goat, a mouse, a rabbit, a chicken, a duck, a goose, a primate, including a monkey and a chimpanzee.

Although specific advantages have been enumerated above, various embodiments may include some, none, or all of the enumerated advantages. Other technical advantages may become readily apparent to one of ordinary skill in the art after review of the figures and description. It should be understood at the outset that, although exemplary embodiments are illustrated in the figures and specification, the principles of the present disclosure may be implemented using any number of techniques, whether currently known or not. The present claims should in no way be limited to the exemplary implementations and techniques illustrated in the figures and specification. The complete disclosures of the citations herein are hereby incorporated by reference in their entireties.

EXAMPLES

Leukocytes Display Increased Transcriptional Activity in ASD

Leukocyte gene expression profiles obtained from 226 male toddlers (119 ASD and 107 TD) were analyzed. Robust linear regression modeling of the data identified 1236 differentially expressed (DE) genes (437 downregulated and 799 upregulated; FDR <0.05; Table 1). Jack-knife resampling demonstrated that the expression pattern of DE genes was not driven by a small number of cases, but rather shared between the vast majority of subjects with ASD (FIGS. 9a-9i). Further validation of the expression patterns in additional replicate and independent cohorts was completed (FIGS. 9a-13f).

Figure 1:
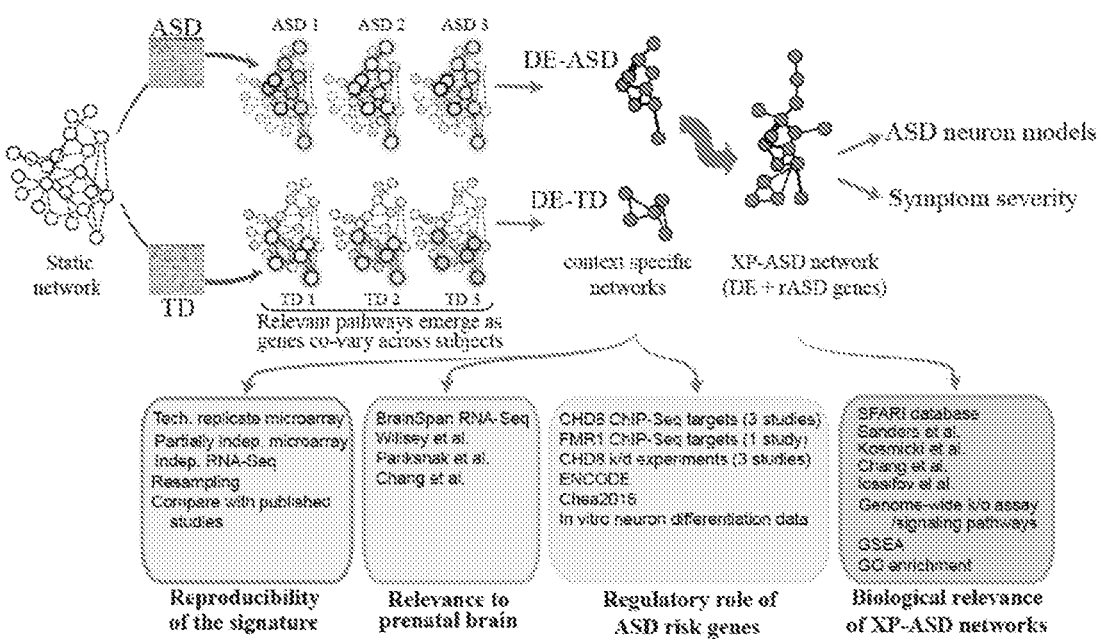
FIG 1, shows a systems approach to decipher network-level Figure transcriptional perturbations in leukocyte transcriptome data. This disclosure reasons that perturbations to disease-associated molecular pathways would be reflected in the co-expression patterns between genes. To identify such disease-relevant dysregulations, context specific networks may be built by integrating gene expression data from each condition with available knowledge on the gene interaction data. Next, the magnitude of co-expressions between the context-specific networks may be compared using a novel approach. This framework is applied on Autism Spectrum disorder (ASD), and shows that this approach can identify network-level dysregulations in ASD.

In many disease conditions, transcriptional programs in cells deviate from normal states due to dysregulations in signaling pathways, transcription factors and epigenetic marks. Therefore, we developed a systems approach to decipher network-level transcriptional perturbations in leukocytes of toddlers with ASD (FIG. 1). Perturbations to ASD-associated molecular pathways could be reflected in the co-expression patterns between DE genes. To identify such ASD-relevant dysregulations, a static gene network (that is, the network is indifferent to the cell context) composed of all known physical and regulatory interactions among the DE genes was first extracted. Next, pruning of the static network using our leukocyte transcriptome data was completed to obtain context-specific networks of each diagnosis group separately (that is, the networks differ in genes and their interactions, based on their associated gene expression data). Specifically, context-specific networks were built for each of ASD and TD groups by only retaining those interactions from the static network that were significantly co-expressed (FDR<0.05) within the group. Both context-specific networks, called DE-ASD and DE-TD, were constructed based on the same static network from the same set of genes (i.e., genes that are expressed in leukocytes and show differential expression). However, following removal of interactions lacking co-expression, a proportion of genes become unconnected and these were consequently removed from the DE-ASD and DE-TD networks. Therefore, DE-ASD and DE-TD exhibited 63% overlap in their gene composition, with differences mostly related to genes that were loosely connected in the starting static network. To establish that the framework is not sensitive to the characteristics of chosen static network, all presented results were replicated on two other static networks with different interaction densities that resulted in a different number of overlapping genes between corresponding context-specific networks. These demonstrated that different static networks from diverse sources can be used in the framework including the networks listed in Table 2.

To test if transcriptional programs were being modulated in ASD, merged the genes and interactions in the DE-ASD and DE-TD networks were merged, and compared the 'co-expression magnitude' of interactions in the merged network between ASD and TD samples[31-33]. This proxy for the transcriptional activity of gene networks[9] demonstrated that co-expression magnitude was higher in the ASD than the TD samples (FIG. 2a; p-value <0.01; paired Wilcoxon-Mann-Whitney test). The stronger co-expression in the DE-ASD network suggests a higher level of concerted activation or suppression of pathways involving DE genes among the subjects with ASD. Further analysis confirmed that the changes in the co-expression magnitude, rather than the gene composition, is the primary driver of the elevated network transcriptional activity. DE networks are primarily constructed for genes that are differentially expressed (DE) between ASD and TD samples. In total, there are 936 protein coding genes that are differentially expressed between ASD and TD samples. As illustrated, the overlap of DE-ASD and DE-TD networks in gene composition depends on the sparsity of the networks. In the sparse high confidence network, rearrangement of interactions has a greater impact on the overlap of the two networks in terms of gene composition. Since we replicated our results across all three networks, this suggests that the rearrangement of the interactions rather than the gene composition is the primary contributing factor in the observed increased transcriptional activity of the networks in ASD. HC network: High confidence network—Each interaction represent a pair of genes with strong evidence of physical and/or regulatory interactions that are significantly co-expressed with one another based on leukocyte transcriptome data within the diagnosis groups. Func. network: Functional network—Each interaction represent a pair of genes that are functionally related and are significantly co-expressed with one another based on the leukocyte transcriptome data within diagnosis groups. Full co-expression network: Full co-expression network—Each interaction represent a pair of genes that are significantly co-expressed with one another based on the leukocyte transcriptome data within diagnosis groups. This higher level of concerted co-regulation of the network was also reproducible in two additional ASD transcriptomic datasets (FIGS. 9a-12c). Further analysis also confirmed that different methods can be used to measure the magnitude of co-expression in our framework including but not limited to Pearson's correlation coefficient and mutual information (FIGS. 9a-12o).

In summary, the leukocyte transcriptional networks of the DE genes show higher than normal co-expression activity in ASD. Moreover, the dysregulation pattern is present in a large percentage of toddlers with ASD, as evidenced by the resampling analyses and the other two ASD datasets.

the Leukocyte-Based Gene Network Captures Transcriptional Programs of Brain Development The potential involvement of the leukocyte-based network to gene expression patterns during brain development was assessed. By overlaying the neurodevelopmental RNA-Seq data from BrainSpan[34,35] on the DE-ASD network, this disclosure identified that the DE-ASD network was enriched for highly expressed genes in the neocortex at prenatal and early postnatal periods (p-value $<4.3 \times 10^{-30}$; FIG. 2b).

To investigate the spatiotemporal activity of the DE-ASD network during brain development, the magnitude of gene co-expression within the DE-ASD network was measured at different neurodevelopmental time windows across brain regions. The highest levels of co-expression of the DE-ASD network temporally coincided with peak neural proliferation in brain development (10-19 post conception weeks[3,8]), after which co-expression activity gradually decreased (FIG. 2c). Expression levels of genes in the DE-ASD network followed a similar pattern (FIGS. 14a-14b). Further supporting the transcriptional activity of the leukocyte-derived DE-ASD network in prenatal brain, evidence that the network is mostly preserved at the co-expression level between ASD leukocytes and prenatal brain was identified. Specifically, the direction of correlations (i.e., positive or negative) in the leukocyte transcriptome of subjects with ASD is mostly preserved in prenatal and early postnatal brain (FIG. 2d). Importantly, this preservation of co-expression was significantly higher in the DE-ASD network than in the DE-TD network (p-value <10-16; FIGS. 14a-14b).

RASD Genes are Associated with the DE-ASD Network

The DE-ASD network was analyzed in the context of other studies to test the relevance of the DE-ASD network to ASD. Parikshak et al. previously reported gene co-expression modules associated with cortical laminae development during prenatal and early postnatal ages[11]. A subset of these modules show enrichment in rASD genes[11]. The overlap of the leukocyte-derived network with all modules from Parikshak et al[11] was examined. The DE-ASD network preferentially overlapped with rASD gene-enriched modules from that study (FIG. 2e). This suggests that the DE-ASD network is functionally related to rASD genes during neocortical development. The DE-ASD network also overlapped with the networks of rASD genes reported in other studies[7,9], indicating the robustness of the results (FIG. 2e). Intriguingly, the prenatal brain co-expression network of high-confidence rASD genes was more similar to that of ASD leukocytes than TD leukocytes (FIG. 2f), suggesting that neurodevelopmental transcriptional programs related to rASD genes might be more active in the leukocyte transcriptome of toddlers with ASD than in that of TD toddlers.

With the observed overlap patterns, a test for enrichment of rASD genes in the DE-ASD network was performed. For this analysis, different rASD gene lists of different size and varying confidence levels (Methods) were considered. Surprisingly, this analysis demonstrated that rASD genes are not enriched in the DE-ASD network (p-value >0.19).

the DE-ASD Network is Enriched for the Regulatory Targets of RASD Genes

Many high confidence rASD genes have regulatory functions[3,7,10]. Although the perturbed DE-ASD network is not enriched for rASD genes, it overlaps with brain co-expression modules and networks containing known rASD genes. At the mechanistic level, the observed co-expression of rASD and DE genes in the prenatal brain could be due to the regulatory influence of rASD genes on the DE-ASD network, and thereby genetic alterations in rASD genes could cause the transcriptional perturbation and the increase in gene co-expression within the DE-ASD network.

To elucidate if rASD genes could regulate the DE-ASD network, this disclosure examined if the regulatory targets of rASD genes are enriched in the DE-ASD network. Indeed, it was observed that the DE-ASD network is enriched for genes regulated by two high-confidence rASD genes, CHD8[36-38] and FMR1[39] (FIG. 3a). To more systematically identify regulators of the network, an evaluation of the overlap of the DE-ASD network with the regulatory targets of rASD transcription factors from the ENCODE project[40] and Chea2016 resource[41] was completed. Strikingly, the DE-ASD network is significantly enriched for the regulatory targets of 11 out of 20 high-confidence, strong-candidate and suggestive-evidence rASD genes (SFARI categories 1-3) (OR: 2.54; p-value: 0.05; FIG. 3b, Table 3).

the DE-ASD Network is Preferentially Linked to High Confidence RASD Genes rASD genes were often not differentially expressed in ASD leukocytes, and the DE-ASD network was therefore not enriched in rASD genes. To explore if rASD genes may nevertheless regulate the DE-ASD network, the DE-ASD network was expanded by including rASD genes. Thus, an expanded-ASD (XP-ASD) network was obtained. To construct the XP-ASD network, a similar approach to that used for the DE-ASD network was used. Briefly, a high-confidence static network of DE and 965 candidate rASD genes was built. The context-specific XP-ASD network was next inferred by retaining only the significantly co-expressed interacting pairs in ASD samples. This pruning step removed genes from the static network that were not significantly co-expressed with their known physically interacting partners or regulatory targets in ASD leukocytes. Accordingly, the XP-ASD network included a total of 316 out of 965 (36%) likely rASD genes (Table 4).

The 965 rASD genes included both high-confidence rASD genes (e.g., recurrently mutated in individuals with ASD) and low-confidence rASD genes (some even found in siblings of individuals with ASD, who developed normally). If the XP-ASD network is truly relevant to the prenatal etiology of ASD, high-confidence rASD genes would be preferentially incorporated into the XP-ASD network. By following different analytical methods, other researchers have independently categorized rASD genes into high- and low-confidence[7,14,42]. Importantly, a reproducible enrichment of high-confidence rASD genes in the XP-ASD network (FIG. 3c) were found. A significant enrichment for strong-candidate rASD genes with de novo protein truncating variants in the XP-ASD network (hypergeometric p-value $<3.6 \times 10^{-6}$) was observed. Further corroborating a possible regulatory role of rASD genes on the DE-ASD network, rASD genes in the XP-ASD network were significantly enriched for DNA-binding activity, compared to the remaining rASD genes (OR: 3.1; p-value $<2.1 \times 10^{-12}$; Fisher's exact test). Furthermore, the XP-ASD network was not enriched for rASD genes classified as low-confidence (p-value >0.24; SFARI categories 4-6). As negative controls, two other networks were constructed by including genes with likely deleterious and synonymous mutations in siblings of individuals with ASD, who developed normally[13]. Consistent with a possible role of the XP-ASD network in ASD, these negative control genes were not significantly associated with the DE genes (p-values >0.41; FIG. 3c). The preferential addition of high-confidence and regulatory rASD genes supports the relevance of the XP-ASD network for the pathobiology of ASD, and the likelihood that the high-confidence rASD genes are regulating the DE-ASD network.

RASD Genes Tend to be Repressors of Genes in the DE-ASD Network

To explore how rASD genes may regulate DE genes, their interaction types were analyzed (i.e., positive or negative correlations, alluding to activator or repressor activity). Comparative analysis of interactions between DE and rASD genes in the XP-ASD network indicated a significant enrichment of negative correlations between rASD and DE genes (OR: 1.79; p-value $<3.1 \times 10^{-4}$; Fisher's exact test), suggesting a predominantly inhibitory role of rASD genes on the DE genes (FIG. 4a).

In line with a role of rASD genes as repressors, the DE-ASD network was enriched for genes that were up-regulated by the knock-down of CHD8 in neural progenitor and stem cells, but not for genes that were down-regulated[36-38] (FIG. 4b). Consistent with this, we observed in our dataset an overall up-regulation of genes that are also up-regulated in knock-down experiments of the transcriptional repressor CHD8 (p-value <0.039 across three different studies[36]-38; GSEA), but not for those that are down-regulated. There was a similar trend towards up-regulation for the binding targets of the FMR1 rASD gene in the ASD transcriptome[39] (p-value: 0.078; GSEA).

To further test if rASD genes were predominantly repressors of genes in the DE-ASD network, an independent transcriptome dataset from the differentiation of primary human neural progenitor cells obtained from fetal brains of three donors[43] was analyzed. Expression of genes in the DE-ASD network exhibit a gradual down-regulation during neural progenitor differentiation (p-value $4.4 \times 10^{-6}$; FIG. 4c). However, the genes unique to the XP-ASD network (i.e., rASD genes present in the XP-ASD network, but not DE-ASD network) showed an anti-correlated expression pattern with DE-ASD genes with peak expression at 12 weeks into differentiation (p-value $1.2 \times 10^{-3}$; FIG. 4c). The results of this independent dataset provide further evidence of a potential inhibitory role of rASD genes on DE-ASD networks during human neuron differentiation.

Signaling Pathways are Central to the Leukocyte-Based Networks

This disclosure identifies key pathways involved in the XP-ASD and DE-ASD networks. Biological process enrichment analysis of the XP-ASD network demonstrated it is highly enriched for signaling pathways (FIG. 5a). Moreover, the DE-ASD network was highly enriched for PI3K/AKT, mTOR, and related pathways (FIG. 5b). To delineate mechanisms by which rASD genes could dysregulate DE genes, enriched biological processes were compared between DE and rASD genes in the XP-ASD network. DE genes were more enriched for cell proliferation-related processes, particularly PI3K/AKT and its downstream pathways such as mTOR, autophagy, viral translation, and FC receptor signaling (FIGS. 5a-b). However, the rASD genes were more enriched for processes involved in neuron differentiation and maturation, including neurogenesis, dendrite development and synapse assembly (FIG. 5a).

These results suggest elevated co-expression activity of PI3K/AKT and its down-stream pathways in ASD leukocytes (FIG. 5a-b). These processes are involved in brain development and growth during prenatal and early postnatal ages[3,45,46] and focused studies on rASD genes have implicated them in ASD[3,10,44-46]. Further supporting the increased co-expression activity of the PI3K/AKT and its downstream pathways in our cohort of toddlers with ASD, gene set enrichment analysis demonstrated that the PI3K/AKT pathway and two of its main downstream processes (mTOR pathway and the targets of the FOXO1 transcriptional repressor) are also dysregulated in ASD leukocytes in directions that are consistent with the increased activity of the PI3K/AKT pathway.

The DE-ASD and XP-ASD networks were further investigated using an integrated hub analysis approach (Methods). In the DE-ASD network, hub genes included the key members of the PI3K/AKT pathway including PIK3CD, AKT1 and GSK3B (FIG. 5c). Genes that were only hubs in the XP-ASD network included regulators of neuronal proliferation and maturation, including regulatory members of the RAS/ERK (e.g., NRAS, ERK2, ERK1, SHC1), PI3K/AKT (e.g., PTEN, PIK3R1, EP300), and WNT/β-catenin (e.g., CTNNB1, SMARCC2, CSNK1G2) signaling pathways (FIG. 5c). While PI3K/AKT (a hub in DE-ASD and XP-ASD networks) promotes proliferation and survival, many of the genes that are only hub in the XP-ASD network, including NRAS, ERK 1/2, and PTEN, can trigger differentiation of neural progenitor cells by mediating PI3K/AKT and its downstream pathways[3,44]. We next scored the genes and interactions in the DE-ASD network based on their perceived importance on the observed increased co-expression level of the DE-ASD network (Methods). This analysis further confirmed the central role of PI3K/AKT pathway in the increased co-expression magnitude of the DE-ASD networks (Table 4).

RASD Genes Regulate DE-ASD Genes Through Specific Signaling Pathways

This disclosure explored if perturbation to the rASD genes lead to the perturbation of the DE-ASD network through changes in the RAS/ERK, PI3K/AKT, and WNT/β-catenin pathways. The activity of these three pathways is chiefly mediated through changes in phosphorylation of ERK, AKT, and β-catenin proteins. Therefore, to assess the regulatory influence of rASD genes on these signaling pathways, available genome-wide mutational screening data were leveraged, wherein gene mutations were scored based on their effects on the phosphorylation state of ERK, AKT, and β-catenin proteins[47]. Consistent with the functional enrichment and hub analysis results, rASD genes in the XP-ASD network were significantly enriched for regulators of the RAS/ERK, PI3K/AKT, and WNT/β-catenin pathways (FIG. 5d; p-value $<1.9 \times 10^{-10}$). Specifically, regulators of these pathways (FDR<0.1) accounted for inclusion of 39% of rASD genes in the XP-ASD network. No significant enrichment for regulators of the RAS/ERK, PI3K/AKT, and WNT/β-catenin pathways was observed among rASD genes that were not included in the XP-ASD network (FIG. 5d). These results support the notion that rASD genes regulate the DE-ASD network through perturbation of the RAS/ERK, PI3K/AKT, and WNT/β-catenin pathways.

In summary, the XP-ASD network decomposition results described herein suggest a modular regulatory structure for the XP-ASD network in which diverse rASD genes converge upon and dysregulate activity of the DE genes (FIG. 5a). Importantly, for a large percentage of rASD genes, the dysregulation flow to the DE genes is channeled through highly inter-connected signaling pathways including RAS/ERK, PI3K/AKT, and WNT/β-catenin.

The DE-ASD Network is Over-Active in Neuron Models of Subjects with ASD and Brain Enlargement These results demonstrate increased gene co-expression in the DE-ASD network in leukocytes of toddlers with ASD selected from the general population. Furthermore, the results implicate the DE-ASD network in the prenatal etiology of ASD by demonstrating its higher co-expression during fetal brain development, and its connection with high-confidence rASD genes. Also, the results suggest that the increased co-expression in the network is present in a large percentage of our ASD toddlers and is associated with the processes related to the neural proliferation and maturation.

To further validate these results, it was examined if the DE-ASD network shows increased co-expression in hiPSC-derived neural progenitors and neurons from toddlers with ASD. Thus, the previously published hiPSCs transcriptome data from 13 individuals with ASD and TD[28,48] was reanalyzed, which were differentiated into neural progenitor and neuron stages. The included subjects with ASD capture macrocephaly which is an important phenotype common in many subjects with ASD. Importantly, the analysis demonstrated that the DE-ASD network is more active in these neuron models of subjects with ASD (FIG. 6). Furthermore, corroborating a potential role of DE-ASD network in neural proliferation and differentiation, the peak activity of the DE-ASD network was found to coincide with Day 0-to-4 into differentiation in these ASD neuron models and then gradually decreased in its activity.

To further explore the potential dysregulation of DE-ASD network in hiPSC-derived neuron models of ASD and its connection with rASD genes, the transcriptional activity of DE-ASD network was analyzed in hiPSC-derived neuron models of SHANK2 high confidence rASD gene[48]. Importantly, this analysis indicated the high transcriptional activity of DE-ASD network in these neuron models compared with CRISPR SHANK2-corrected cell lines from the same individuals.

Collectively, these results suggest the functional relevance of identified leukocyte molecular signatures to the abnormal brain development in ASD, and the regulatory influence of high confidence rASD genes on this core network.

Network Dysregulation is Associated with ASD Severity

The potential role of the DE-ASD network activity on the development of the core clinical symptom of socialization deficits in toddlers with ASD was evaluated. To this end, it was tested if the same pattern of gene co-expression dysregulation exists across individuals at different levels of ASD severity as measured by Autism Diagnostic Observation Schedule (ADOS) social affect severity score. It was observed that the fold change patterns of DE genes are almost identical across different ASD severity levels (FIGS. 19a-19c). The implicated RAS/ERK, PI3K/AKT, WNT/β-catenin pathways in our model are well known to have pleotropic roles during brain development, from neural proliferation and neurogenesis to neural migration and maturation. These signaling pathways and the associated developmental stages have been implicated in ASD[3], suggesting the DE-ASD network is involved in various neurodevelopmental processes. At the mechanistic level, this suggests that the spectrum of autism could reflect the varying extent of dysregulation of the DE-ASD network, as it is composed of high-confidence physical and regulatory interactions. Hence, it was examined whether the magnitude of the co-expression activity of the DE-ASD network correlated with clinical severity in toddlers with ASD. Indeed, it was found that the extent of gene co-expression activity within the DE-ASD network was correlated with ADOS social affect deficit scores of toddlers with ASD (FIGS. 7a-7b). To assess the significance of observed correlation patterns, we repeated the analysis with 10,000 permutations of the ADOS social affect scores in individuals with ASD. This analysis confirmed the significance of the observed correlations (inset boxplots in FIGS. 7a-7b). These results suggest the perturbation of the same network at different extents can potentially result in a spectrum of postnatal clinical severity levels in toddlers with ASD.

Individual-Based Analysis of De-ASD Network Identifies Two Distinct Subtypes of ASD These analyses have demonstrated the association of DE-ASD network with ASD-relevant pathobiological dysregulation in fetal brain. It also suggested that the dysregulation extent of the DE-ASD network could predict ASD symptom severity. However, the network level perturbations have been based on measurements of co-expression in a group of samples (e.g., a group of TD subjects, a group of ASD subjects with ADOS SA score range of 13 to 16). To more directly measure the potential diagnosis power of DE-ASD network, it was next developed a new metric to measure the dysregulations of DE-ASD network in each individual sample (Methods). This analysis demonstrated existence of two distinct subtypes of ASD (FIG. 8). In one subtype the dysregulation extent of DE-ASD network correlated with the socialization symptom severity, while in the second subtype the DE-ASD network was not dysregulated (FIG. 8).

To further explore the differences between the two ASD subtypes, we conducted differential expression analysis of each subtype versus TD diagnosis group. This analysis indicated that existence of 2834 DE genes at FDR <0.05 in the leukocyte transcriptome of first ASD subtype. However, no DE gene was identified in the second ASD subtype. This observation suggests that the dysregulation mechanisms are shared at some extent between leukocyte and brain development in the first subtype, while the ASD-relevant pathobiology for the second subtype is not reflected in the leukocyte transcriptome. These analyses have shown that the activity of DE-ASD network could be mediated by rASD genes including CHD8, FMR1, and SHANK2. It is also known that both genetics and environmental factors contribute to the development of ASD. Therefore, the results from the sample-based analysis could suggest existence of genetic etiology in the first subtype. Such genetic factors would allow the dysregulation to reoccur again and again during blood cell proliferations. However, in toddlers that environmental factors are the main driver in the development of ASD, the insult has occurred at fetal and very early postnatal ages. Such environmental insult had impacted the process of typical brain development, but the insult is not present at later time points anymore and hence there is no opportunity to identify its impact postnatally in the leukocyte transcriptome of toddlers.

DISCUSSION

While ASD has a strong genetic basis, it remains elusive how rASD genes are connected to the molecular changes underlying the disorder at prenatal and early postnatal ages. This disclosure includes a systems-biology framework to identify perturbed transcriptional programs in leukocytes, and connect them with the rASD genes and early-age symptom severity. Specifically, a dysregulated gene network was found that shows elevated gene co-expression activity in leukocytes from toddlers with ASD. This core network was robustly associated with high-confidence rASD genes. Although recurrent, high confidence rASD gene mutations occur in a small percentage of the ASD population[5,14]. The connection of the DE-ASD network (constructed with data from the general ASD pediatric population) with high-confidence rASD genes provides evidence of shared mechanisms underlying ASD in both individuals with highly penetrant rASD gene mutations and those with other etiologies (e.g., common variants). This disclosure further shows that many rASD genes may regulate the DE-ASD core network through the RAS/ERK, PI3K/AKT, and WNT/β-catenin signaling pathways. This study confirms and substantially expands results from previous reports on blood transcriptome of subjects with ASD.

A key aspect of the signature is that it allows one to investigate the relationship of molecular perturbations with early-age ASD symptom severity. Indeed, it was found that the magnitude of dysregulation of the DE-ASD network is correlated with deficits in ADOS social affect scores in male toddlers of 1-4 years old. Social and behavioral deficits are also suggested to be linked with the genetic variations in subjects with ASD[49,50]; and previous studies have established the effect of the PI3K/AKT signaling pathway (central to the DE-ASD core network) on social behaviors in mouse models[45,46]. Together, these observations suggest that the etiology of ASD converges on gene networks that correlate with ASD symptom severity. Moreover, the results reinforce the hypothesis that stronger dysregulation of this core network could lead to a higher ASD severity. The DE-ASD core network is enriched for pathways implicated in ASD, strongly associated with high-confidence rASD genes, and correlate with the ASD symptom severity. However, a direct causal relationship between the co-expression activity of the network and ASD remains to be established. Moreover, the co-expression activity measure is a summary score from the strongest signal in our dataset (i.e., differentially expressed genes) at a group level (i.e., severity level). Therefore, by design, it may not comprehensively capture the heterogeneity that could exist within ASD. Future work is needed to explore the causal relationship of the pathways in the DE-ASD network to ASD development, symptoms, and the potential existence of other dysregulation mechanisms in individuals with ASD.

Emerging models of complex traits suggest that gene mutations and epigenetic changes often propagate their effects through regulatory networks and converge on core pathways relevant to the trait[21,30]. Our findings support the existence of an analogous architecture for ASD, wherein rASD genes with diverse biological roles converge and regulate core down-stream pathways. Although the DE-ASD network did not significantly overlap with rASD genes, we found that it was significantly co-expressed with rASD genes in both leukocyte and brain. This disclosure also shows that the DE-ASD network genes are regulated by many rASD genes through direct transcriptional regulation or by modulating highly interconnected signaling pathways. This disclosure postulates that the DE-ASD network is a primary convergence point of ASD etiologies. This predicts that the spectrum of autism in such cases reflects degree and mechanism of the perturbation of the DE-ASD network. A detailed analysis of hiPSC-derived neurons from subjects with ASD and brain enlargement demonstrated the dysregulation of the DE-ASD network in these neuron models of ASD. Furthermore, clinical relevance is demonstrated by the high correlation we found between magnitude of dysregulation in the DE-ASD core network and ASD symptom severity in the toddlers.

The vast majority of rASD genes are not fully penetrant to the disorder[3,8,14,51]. The analysis of the XP-ASD network sheds light on how rASD genes could potentially combine to result in ASD. Although some rASD genes could directly modulate the DE-ASD network at the transcriptional level, the results suggest that the regulatory consequence of many rASD genes on the DE-ASD network are channeled through the PI3K/AKT, RAS/ERK, WNT/β-catenin signaling pathways. The structural and functional interrogation of the XP-ASD network localized these pathways to its epicenter and demonstrated enrichment for processes down-stream of these pathways among DE genes. Moreover, it was found that high-confidence rASD genes are better connected to the DE-ASD core network, suggesting that the closeness and influence of genes on these signaling pathways is correlated with their effect size on the disorder. These results articulate that perturbation of the PI3K/AKT, RAS/ERK, WNT/β-catenin signaling pathways through gene regulatory networks may be an important etiological route for ASD that could be associated with the disorder severity level in a large fraction of the ASD population. Congruent with this hypothesis, cellular and animal models of ASD have demonstrated that high-confidence rASD genes are enriched in regulators of the RAS/ERK, PI3K/AKT, WNT/β-catenin signaling pathways[3,10]. These signaling pathways are highly conserved and pleiotropic, impacting multiple prenatal and early postnatal neural development stages from proliferation/differentiation to synaptic and neural circuit development[3]. Such multi-functionalities could be the reason that for detection of the signal in leukocytes of individuals with ASD.

Data availability: Leukocyte transcriptome data can be accessed from the NCBI Gene Expression Omnibus (GEO) database under the accession codes of GSE42133 and GSE111175. Microarray transcriptome data on the differentiation of primary human neural progenitor cells to neural cells were downloaded from the NCBI GEO accession GSE57595. Transcriptome data on hiPSC-derived neuron models of ASD and TD were downloaded NCBI GEO accession E-MTAB-6018. Human brain developmental transcriptome data were downloaded from BrainSpan.org.

Accession codes: Gene Expression Omnibus database (GSE42133; GSE111175; GSE57595; E-MTAB-6018).

Code availability: The R code for reproducing the analyses reported in this article is available as a supplementary software file as well as at: gitlab.com/LewisLabUCSD/ASD_Transcriptional_Organization.

Materials, Methods, and Experimental Results

Participant Recruitment and Clinical Evaluation

The primary aim of this study was to associate the transcriptome dysregulations present in ASD leukocytes with the ASD risk genes. However, the currently available genetic information is mostly based on males, and less is known about the genetic basis of ASD females. Therefore, we focused on male toddlers for the transcriptome analysis; specifically, 264 male toddlers with the age range of 1 to 4 years. This included previously published transcriptome data (153 individuals)[19] and new samples using a similar methodology for participant recruitment and sample collection (111 new cases). Research procedures were approved by the Institutional Review Board of the University of California, San Diego. Parents of subjects underwent Informed Consent Procedures with a psychologist or study coordinator at the time of their child's enrollment.

About 70% of toddlers were recruited from the general population as young as 12 months using an early detection strategy called the 1-Year Well-Baby Check-Up Approach[52]. Using this approach, toddlers who failed a broadband screen, the CSBS IT Checklist[53], at well-baby visits in the general pediatric community settings were referred to our Center for a comprehensive evaluation. The remaining subjects were obtained by general community referrals. All toddlers received a battery of standardized psychometric tests by highly experienced Ph.D. level psychologists including the Autism Diagnostic Observation Schedule (ADOS; Module T, 1 or 2), the Mullen Scales of Early Learning and the Vineland Adaptive Behavior Scales. Testing sessions routinely lasted 4 hours and occurred across 2 separate days. Toddlers younger than 36 months in age at the time of initial clinical evaluation were followed longitudinally approximately every 9 months until a final diagnosis was determined at age 2-4 years. For analysis purposes, toddlers (median age, 27 months) were categorized into two groups based on their final diagnosis assessment: 1) ASD:

subjects with the diagnosis of ASD or ASD features; 2) TD: toddlers with typical developments (TD).

ADOS scores at each toddler's final visit were used for correlation analyses with DE-ASD network co-expression activity scores. All but 4 toddlers were tracked and diagnosed using the appropriate module of the ADOS (i.e., ADOS Module-Toddler, Module-1, or Module-2) between the ages of 24-49 months, an age where the diagnosis of ASD is relatively stable[16]; the remaining 4 toddlers had their final diagnostic evaluation between the ages of 18 to 24 months.

Blood Sample Collection and Gene Expression Analysis

Blood samples were usually taken at the end of the clinical evaluation sessions. To monitor health status, the temperature of each toddler was monitored using an ear digital thermometer immediately preceding the blood draw. The blood draw was scheduled for a different day when the temperature was higher than 99 Fahrenheit. Moreover, blood draw was not taken if a toddler had some illness (e.g., cold or flu), as observed by us or stated by parents. We collected four to six milliliters of blood into ethylenediaminetetraacetic-coated tubes from all toddlers. Blood leukocytes were captured and stabilized by LeukoLOCK filters (Ambion) and were immediately placed in a −20° C. freezer. Total RNA was extracted following standard procedures and manufacturer's instructions (Ambion).

RNA labeling, hybridization, and scanning was conducted at Scripps Genomic Medicine center, (CA, USA) using Illumina BeadChip technology. All arrays were scanned with the Illumina BeadArray Reader and read into Illumina GenomeStudio software (version 1.1.1). Raw Illumina probe intensities were converted to expression values using the lumi package[61].

Data Processing and Differential Gene Expression Analysis of the Primary Dataset We subdivided our samples into three datasets to assess the reproducibility of the results. The primary discovery dataset composed of 275 samples from 240 male toddlers with the diagnosis of ASD and TD from the general population. Gene expressions were assayed using Illumina HT-12 platform. All arrays were scanned with the Illumina BeadArray Reader and read into Illumina GenomeStudio software (version 1.1.1). Raw Illumina probe intensities were converted to expression values using the lumi package[54]. We employed a three-step procedure to filter for probes with reliable expression levels. First, we only retained probes that met the detection p-value <0.05 cut-off threshold in at least 3 samples. Second, we required the probes to have expression levels above 95th percentile of negative probes in at least 50% of samples. The probes with detection p-value >0.1 across all samples were selected as negative probes and their expression levels were pooled together to estimate the 95th percentile expression level. Third, for genes represented by multiple probes, we considered the probe with highest mean expression level across our dataset, after quantile normalization of the data. These criteria led to the selection of 14,854 protein coding genes as expressed in our leukocyte transcriptome data, which is similar to the previously reported estimate of 14,555 protein coding genes (chosen based on unique Entrez IDs) for whole blood by GTEx consortium[55]. To ensure results are not affected by the variations in the procedure of selecting expressed genes, we replicated all of our analyses (redoing DE analysis and re-constructing HC DE and XP networks) by choosing 13,032 protein coding genes as expressed (FIGS. 22a-22p).

Quality control analysis was performed on normalized gene expression data to identify and remove 22 outlier samples from the dataset. Samples were marked as outlier if they showed low signal intensity in the microarray (average signal of two standard deviations lower than the overall mean), deviant pairwise correlations, deviant cumulative distributions, deviant multi-dimensional scaling plots, or poor hierarchical clustering, as described elsewhere[18]. After removing low quality samples, the primary dataset had 253 samples from 226 male toddlers including 27 technical replicates. High reproducibility was observed across technical replicates (mean Spearman correlation of 0.917 and median of 0.925). We randomly removed one of each of two technical replicates from the dataset.

The limma package[56] was then applied on quantile normalized data for differential expression analysis in which moderated t-statistics was calculate by robust empirical Bayes methods[57]. Sample batch was used as a categorical covariate (total of two batches; both Illumina HT-12 platforms). Exploration graphs indicated that linear modeling of batch covariate was effective at removing its influence on expression values (FIGS. 21a-21d). MA-plots of the primary dataset did not show existence of bias in the fold change estimates (FIGS. 9a-9i). DE analysis identified 1236 differentially expressed genes with Benjamini-Hochberg FDR <0.05.

Reproducibility Assessment Using Additional Microarray and RNA-Seq Datasets

Additional transcriptome analyses confirmed that results are replicable at technical and biological levels. We performed transcriptome analysis on a second dataset composed of 56 randomly selected male toddlers from the primary dataset (35 ASD and 21 TD). We also analyzed a third microarray dataset composed of 48 male toddlers with 24 independent, non-overlapping toddlers with ASD, while 21 out of 24 TD cases overlapped with the primary dataset. These two datasets were assayed concurrently, but at a different time than the primary dataset. Moreover, in contrast to the primary dataset, the second and third datasets were assayed by Illumina WG-6 Chips. The pre-processing and downstream analysis of the second and third microarray datasets were conducted separately using the same approaches as the primary dataset.

To further assess the reproducibility of the results across experimental platforms, we performed RNA-Seq experiments on 56 samples from an independent cohort of 12 (19 samples) TD and 23 (37 samples) male toddlers with ASD. None of these subjects overlapped with those in the microarray datasets. This allowed us to ensure our results are not subject nor platform (i.e., microarray vs. RNA-Seq) specific. RNA-Seq libraries were sequenced at the UCSD IGM genomics core on a HiSeq 4000. We processed the raw RNA-Seq data with our pipeline that starts with quality control with FastQC[58]. Low quality bases and adapters were removed using trimmomatic[59]. Reads were aligned to the genome using STAR[60]. STAR results were processed using Samtools[61], and transcript quantification is done with HTseq-count[62]. Subsequently, low expressed genes were removed and data were log count per million (cpm) normalized (with prior read count of 1) using limma[56]. We performed SVA analysis[63] on the normalized expression data and included the first surrogate variable as covariate to account for potential hidden confounding variables. Differential expression analysis was performed using the limma package with subjects modeled as random effects.

Additional analysis was performed on the four transcriptome datasets (one discovery and three replicates) to ensure results are: (1) robust to alterations in the analysis pipeline, (2) are not affected by the batches or potential hidden covariates, (3) are present in the vast majority of samples, and (4) are not driven by changes in the blood cell type composition between ASD and TD diagnosis groups.

ASD risk genes

ASD risk genes were extracted from the SFARI database[42] on Dec. 7, 2016. We also included the reported risk genes from a recent meta-analysis of two large-scale genetic studies, containing genes mutated in individuals with ASD but not present in Exome Aggregation Consortium database (ExAC)[14]. Together, these two resources provided 965 likely rASD genes that were used for the construction of the XP-ASD networks (Table 4). Previously published genes with likely gene damaging and synonymous mutations in siblings of subjects with ASD, who developed normally were retrieved from Iossifov et al.[13].

ASD high confidence risk genes were extracted from the SFARI database (genes with confidence levels of 1 and 2), Kosmicki et al.[14] (recurrent gene mutations in individuals with ASD, but not present in the ExAC database), Sanders et al.[15], and Chang et al.[7]. Strong evidence genes with de novo protein truncating variants in subjects with ASD were extracted from Kosmicki et al.[14] and included rASD genes that were not in the ExAC database and have a probability of loss-of-function intolerance (pLI) score of above 0.9. Gene names in these datasets were converted to Entrez IDs using DAVID tools[64].

To assess the overlap of DE-ASD networks with rASD genes, we considered our list of all rASD genes (965 genes), different lists of high confidence rASD genes (varying in size and composition) and their combinations, including all SFARI rASD genes, SFARI gene levels 1-to-3, SFARI gene levels 1 and 2, strong evidence rASD genes from Kosmicki et al.[14], and strong evidence rASD genes from Sanders et al.[15].

Construction of Context Specific Networks

We first regressed out the interfering co-variate (i.e., batch group) from the quantile normalized expression values of the primary dataset (see the Data processing section). The Context Likelihood of Relatedness (CLR) algorithm[65] was next applied on the batch corrected transcriptome data from ASD and TD diagnosis groups separately to construct two co-expression networks (technical replicates were randomly removed from the dataset prior to construction of the networks). The CLR algorithm employs a two-step procedure to infer significantly co-expressed gene pairs. First, it estimates the distribution of similarity scores for each gene based on the similarity that the gene shows with all other genes in the dataset using a mutual information metric. Second, it estimates the significance of the observed similarity score for each gene pair by testing how likely it is to have such a similarity score given the co-expression similarity score distributions of the two genes from the first step. The separate application of the CLR algorithm on ASD and TD samples provided global (i.e., all expressed genes) gene-gene co-expression similarity matrices for each diagnosis group. DE and expanded DE-and-rASD (XP) networks were next constructed from CLR-derived ASD and TD similarity matrices as detailed below.

To ensure the robustness of the results, we constructed three variants of the DE networks for each diagnosis group (i.e., ASD and TD; total of six networks). These networks varied in the number of nodes and edges, providing a tradeoff between sensitivity (number of false negative interactions) and specificity (number of false positive interactions) in our downstream analysis. Unless otherwise noted, we reported results that were reproducible in all three networks. The three networks include the high confidence network (HC; including strong evidence physical and regulatory interactions), the functional network (including interactions between previously known functionally related genes), and the full co-expression network. The full co-expression network is solely based on co-expression patterns of DE genes (i.e., all significantly co-expressed DE gene pairs with FDR <0.05 as judged by the CLR algorithm). To construct the HC and functional networks, we first retrieved the static HC and functional networks of the detected protein-coding DE genes from databases. The static HC network was obtained from the Pathway Commons database[66] and was updated to include interactions from the most recent Reactome[67] and BioGrid[68] databases. The static functional network was extracted from the GeneMania webserver[69] and included interactions supported by co-expression, protein-protein interactions, genetic interactions, co-localization, shared protein domains, and other predictions[69]. The backbone, static network of all DE-ASD and DE-TD networks composed of at least 96% DE genes. Static HC and functional networks were made context specific by retaining those database-derived interactions that were significantly co-expressed in the diagnosis group (The static backbone networks were shared between the DE-ASD and DE-TD networks). All figures in the main text are based on HC DE-ASD and DE-TD networks, and the results of functional and full co-expression networks are represented in the supplementary files.

By design, the HC network is smaller, more accurate, but potentially more biased as it includes genes that are more actively studied than those in the functional network. Both networks are smaller than the full co-expression network. Therefore, on average, the functional DE-ASD and DE-TD networks had 15× more interactions and 2.3× more genes than their HC counterparts. Similarly, the full DE-ASD and DE-TD networks had 6.4× more interactions and 1.05× more genes than their functional counterparts.

The XP-ASD networks were constructed using a similar approach, but from the union of protein-coding DE genes and 965 rASD genes. Our list of 965 rASD genes included genes that are ranked either as high confidence (supported with multiple studies or direct experimentation) or low confidence (some even have been found in healthy siblings of individuals with ASD). To assess the relevance of XP-ASD networks to the pathobiology of ASD, we also examined the association of XP-ASD networks with genes mutated in siblings of subjects with ASD, who developed normally. For this, we constructed two other variants of the XP-ASD networks by adding genes with likely gene damaging mutations (Siblings-LGD) and Synonymous (Siblings-Syn) mutations in our list of DE and rASD genes, separately. We next tested if these two variants of XP-ASD networks preferentially incorporated mutated genes in siblings of individuals with ASD, who developed normally. As the sole purpose of these two network variants were to test the relevance of the main XP-ASD network, they were not needed for follow up analyses. Similar to DE networks, the main figures represent results based on the HC XP-ASD network and the results for the functional and full XP-ASD networks are included in the supplement.

Network and Module Overlap Analysis

Unless otherwise noted, we used permutation tests to assess the significance of overlap between pairs of networks or modules. The background gene list for DE and XP networks were all protein coding genes that were expressed in our microarray experiments (see the gene expression preprocessing section for more details). DE genes did not show bias in terms of gene mutation rates and length.

Empirical permutation tests were conducted by 10,000 random draws from background gene lists and measuring the overlaps. The actual overlap was then compared to the overlap distribution of random draws and an empirical p-value was estimated. In cases where the estimated empirical p-value was zero based on 10,000 permutation tests, we performed 90,000 additional random draws to obtain a more accurate estimation. If the estimated empirical p-value was still zero, a theoretical, hypergeometric-based p-value (non-zero) was considered. Multiple testing was corrected by the Benjamini-Hochberg procedure and FDR <0.1 was considered as significant, unless otherwise noted. By design, our functional and full DE and XP networks are highly sensitive and therefore include more than 90% of queried genes. Since we required replicable significant overlap of gene sets across our networks, this feature renders the overlap analysis robust to potential biases due to the network topology.

Hub Analysis

The hub analysis of DE-ASD and XP-ASD networks were conducted by an integrated analysis of high-confidence (HC) and functional networks. By design, HC and functional networks each have their own advantages. Interactions in HC networks are presumably more accurate but potentially biased towards specific genes that are better studied. In contrast, hubs in functional networks are less susceptible to bias in knowledge on the interactome, but more prone to false positive interactions. Thus, we aimed to combine the information provided by the two networks to get a more accurate picture of hub genes. We first counted the number of interactions that each gene has in either of HC or functional networks. For the genes that were present in only one of the two networks, the interaction count of zero was considered for the other network. Then the p-value of hubness for each gene in a network (with the null hypothesis that the gene is not a hub) was determined by calculating the empirical probability of identifying a gene with the same number of interactions or higher in the network. Next, the hubness p-value score of each gene in HC and functional networks were combined together using Fisher's method:

$$X_2^2 = -2 \times (\ln(p_{HC}) + \ln(p_{functional}))$$

where ρ refers to the empirical p-value of hubness for a gene in the HC and functional networks. X2/2 is the chi-squared score with two degrees of freedom. The top 5% and 7% genes with highest X2/2 scores were considered as hub in DE-ASD and XP-ASD networks, respectively.

Functional Characterization of De-ASD Networks

We set two criteria to identify biological processes that are differentially expressed between ASD and TD diagnosis groups and are enriched in the DE-ASD networks. First, we required the biological process to significantly change between ASD and TD transcriptome samples based on GSEA[70,71]. Second, we required the biological process to be significantly enriched in the DE-ASD networks.

GSEA identified multiple gene sets that were significantly upregulated in subjects with ASD (FDR<0.12; Table S13), using the R version of the GSEA package and the msigdb.v5.1 database (downloaded on Oct. 20, 2016)[70,71]. Significantly enriched processes in the DE-ASD networks were identified by examining the overlap of GSEA-identified significantly altered gene sets with the DE-ASD networks based on empirical permutation tests, and p-values were corrected for multiple testing using the Benjamini-Hochberg procedure. We excluded gene sets annotated as associated with specific reference datasets in MSigDB since their generalizability to our dataset has not been established (Table S13).

Biological Enrichment Analysis of XP-ASD Networks

Significantly enriched Gene Ontology biological processes (GO-BP) were identified by Fisher's exact test on terms with the 10-2000 annotated genes. The terms with Benjamini-Hochberg estimated FDR <0.1 were deemed as significant. The enriched terms were next clustered based on the GO-BP tree, extracted from the Amigo database using RamiGO package in R[72]. The general terms with more than 1000 annotated genes that spanned two or more clusters were removed. The list of enriched GO-BP terms and their clustering are provided in Table S8.

For biological process enrichment analysis of DE-ASD networks, to ensure robustness of enrichment results, we set two criteria to consider a term as significantly enriched in the DE-ASD networks: 1) the term, in overall, is significantly up-regulated based on gene set enrichment analysis (GSEA) (FDR<0.1). There was no significantly down-regulated term (FDR<0.1) in ASD samples based on GSEA analysis. After the GSEA analysis, we excluded significant gene sets that were derived from specific datasets (e.g., gene groups that are up or down regulated in a specific dataset) as their generalizability to our dataset needs further experimental verifications; 2) the term significantly overlaps with all three DE-ASD networks (FDR<0.05), based on an empirical permutation test.

The R version of the GSEA package and msigdb.v5.1 database (downloaded on Oct. 20, 2016) was used for identification of biological processes with differential expression between ASD and TD samples[72,73].

Protein domains were downloaded from Interpro database[74] and enrichment analysis was based on the hypergeometric test. Multiple testing was corrected based on Benjamini-Hochberg procedure.

Deciphering Potential Regulators of DE-ASD Networks

To identify genes that potentially regulate DE-ASD networks, we examined the overlap of DE-ASD networks with identified targets of human transcription factors as part of ENCODE[40] and the curated Chea2016 database[41]. Overall, targets of 285 unique human transcription factors are assayed in the ENCODE and Chea2016 resources, and from these, 20 are currently annotated as high-confidence or suggestive evidence rASD genes by the SFARI database (SFARI levels 1 to 3). We performed overlap analysis between targets of transcription factors and each of the three DE-ASD networks separately using the hypergeometric test through the EnrichR portal[73]. Some of the transcription factors were assayed multiple times, providing partially different sets of target genes for these transcription factors. For such transcription factors, we had multiple p-values from the overlap analysis. Therefore, we used Fisher's method to combine the enrichment p-values across assays related to a given transcription factor during the analysis of each DE-ASD network. Next, p-values were corrected using the Benjamini-Hochberg procedure. Only transcription factors whose targets were significantly enriched in all three DE-ASD networks were considered as significantly overlapping (FDR<0.1) with the DE-ASD networks. This resulted in the identification of 97 unique transcription factors whose targets are significantly enriched in all three DE-ASD networks. From these 97, 11 transcription factors are currently annotated as high confidence or suggestive evidence rASD genes. We assessed whether rASD genes are significantly enriched among the 97 transcription factors using a Fisher's exact test.

Processing of Encode Data

ENCODE data[38] were downloaded through the annotationHub package in R. For each experiment, a gene was considered as a regulatory target if there was a binding peak at 1000 nt proximity of its transcription start sites using hg19 genome annotation. Narrow peak files were used and called peaks with confidence level FDR<0.01 were only considered. For data files with missing q-value information on called peaks, Benjamini-Hochberg FDRs were estimated based on the provided p-values. We only considered experiments with called peaks in transcription proximity of less than 3000 genes.

Fisher's exact test was used for the overlap analysis with DE-ASD networks. To assess enrichment of rASD genes among the potential regulators of DE-ASD networks, only experiments in which targets significantly overlapped (FDR<0.1) with all three context specific DE-ASD networks were considered as significant. Each experiment was annotated by asking if the cognate regulator is an rASD gene. This indicated enrichment of rASD genes among the regulators with the p-value <0.009. We confirmed the significant enrichment by considering the higher confidence rASD genes (p-value <0.018; SFARI confidence levels of 1-to-3).

Brain Developmental Gene Expression Data

Normalized RNA-Seq transcriptome data during human neurodevelopmental time periods were downloaded from the BrainSpan database on Dec. 20, 2016[34,35]. To calculate correlations, normalized RPKM gene expression values were log 2 (x+1) transformed.

Neural Progenitor Differentiation Data

Microarray transcriptome data from the differentiation of primary human neural progenitor cells to neural cells[43] were downloaded from the NCBI GEO database (GSE57595). The data were already quantile normalized and ComBat batch-corrected[74]. For genes with multiple probes, we retained the probe with the highest mean expression value.

To observe the transcriptome response of XP-ASD networks during neuron differentiation, we correlated the gene expression patterns with the developmental time points, considering the differentiation time as an ordinal variable.

ASD Induced Pluripotent Stem Cells (IPSC) Data

We obtained hiPSC data[28] from subjects with ASD and TD controls from GEO (GSE67528). Gene expression counts were normalized with the TMM method[75] and filtered to exclude low-expressed genes (genes with count per million greater than 1 were retained). To calculate the correlations, normalized RNA-Seq gene expression values were log 2 (x+1) transformed.

The subjects from this iPSC study come from our center. However, none of the iPSC subjects overlap with those included in the transcriptome datasets in this study. Moreover, the iPSC cohort includes only 8 subjects with ASD and macrocephaly, while our primary (i.e., discovery) leukocyte transcriptome is from 119 toddlers with ASD selected from general pediatric community and were not filtered based on their brain size. Moreover, the subjects participating in the two studies did not have the same age range and iPSC cohort is composed of subjects with mean and median age of 167 and 193 months, respectively (toddlers in our dataset are between 12 to 48 months old). On the sample collection, our transcriptome data are from leukocytes of subjects with ASD, while the hiPSC transcriptome is based on the reprogrammed fibroblast cells.

Regulatory Effect of Gene Mutations on Signaling Pathways

Data were extracted from a genome-wide mutational study that monitored the impact of gene mutations on phosphorylation status of 10 core signaling proteins[47]. Genes whose mutations affected the phosphorylation status of the core signaling proteins with FDR <0.1 were considered as the regulators of the cognate signaling protein. We performed additional analyses to ascertain the specificity of observed enrichment for RAS/ERK, PI3K/AKT, and WNT/β-catenin signaling pathways.

Measuring the Co-Expression Activity of DE-ASD Networks

We measured the co-expression strength of interacting genes in DE-ASD networks based on an unsigned Pearson's correlation coefficient metric. To estimate the significance of the network activity in a set of samples, we compared the co-expression distribution of gene pairs in the network to a background distribution of co-expression values using the Wilcoxon-Mann-Whitney test in the R coin package. The network activity level was defined as z-transformed p-values of this comparison. Significant scores imply that at least some interacting gene pairs are co-expressed significantly higher than chance and hence parts of the network is potentially active. The background distribution was obtained by selecting genes with mean expression values closest to those involved in the relevant network. The unsigned correlations among these genes constituted the background distribution.

Sample-Based Analysis of Co-Expression Activity

We first transformed the normalized gene expression data using a gaussian kernel estimator. Alternatively, gene expression data could be normalized to have mean zero and standard division of one. Next, the contribution of each sample to the correlation strength of interactions in a network was computed in three ways, as detailed below. It is expected that 1-2% of population to have ASD. However, in our dataset, toddlers with ASD constitute ~50% of samples in the dataset. To ensure that this skewness is not affecting the results, we transformed the data using the statistics based on TD samples.

Permutation: iterating 100,000 times, we randomly selected 20 samples from the dataset and measured the co-expression magnitude of interactions in the network. We next rank summed each individual sample based on the measured co-expression activities in which the sample was involved in.

Analytical approach based on Pearson's correlation coefficient: The Pearson's correlation coefficient is defined as:

$$r_{xy} = \frac{\sum (x_i - \bar{x})(y_i - \bar{y})}{\sqrt{(x_i - \bar{x})^2} \sqrt{(y_i - \bar{y})^2}}$$

Therefore, the influence of one sample to the above formula can be approximated as:

$$|r_{x_i y_i}| - \text{sign}(r_{x'y'}) * ((x_i - \bar{x}')(y_i - \bar{y}') - (r_{x'y'}/2) * ((x_i - x')^2 + (y_i - \bar{y}')^2)$$

Where $|\gamma_{x_i y_i}|$ represents the change in the correlation magnitude in interaction between gene x and y due to the addition of sample i and $r_{x'y'}$ is the correlation based on a set of samples (excluding the sample i). The value of $r_{x'y'}$ can be calculated by using all samples in the dataset, excluding sample i. Alternatively, $r_{x'y'}$ can be calculated by random sampling of a subset of samples in the dataset. Furthermore, the correlation values from similar external datasets can be used to calculate $r_{x'y'}$.

Analytical approach based on joint distribution: The change in the activity (i.e., co-expression magnitude) of each interaction can be measured by calculating the joint probability distribution of the genes involved in the interaction. The joint probability on the transformed data could be defined as:

$$\frac{\sqrt{z_{x_i}^2 + z_{y_i}^2}}{2}$$

Or alternatively:

$$\frac{z_{x_i}^2 + z_{y_i}^2}{2}$$

Or alternatively:

$$\begin{cases} \sqrt{z_{x_i} \times z_{y_i}} & \text{if } z_{x_i} \times z_{y_i} > 0 \\ 0 & \text{if } z_{x_i} \times z_{y_i} < 0 \end{cases}$$

Where $Z_{x_i}$ represents the transformed gene expression value of gene x in sample i. The calculated joint probabilities can be next compared to those from random interactions of the same genes in other samples (that are expected to be enriched for TD samples) or from random interactions of other genes in the same sample (i.e., sample i).

To ensure that confounding elements do not influence the measured network activities, we also measured network activity on a set of random interactions, as well as interactions that are more strongly co-expressed in TD samples. The activity of network can be measured and expressed by various techniques including z-value, p-value, and effect size. These measures of network activity can be also together or independently and/or with measures of gene expression and up- and down-regulation patterns be used for the classification or prognosis of ASD symptom severity.

To measure the co-expression activity of the DE-networks during the typical brain neurodevelopmental period from BrainSpan transcriptome data, we grouped samples from every 5 consequent time periods together, starting from 8 post conception weeks and ending with 11 years old. The defined groups did not overlap in their timespan.

To measure the co-expression activity of the DE-ASD networks in iPSC-derived neurons of ASD and TD cases, we analyzed transcriptome data from Marchetto et al. study 29, the largest available dataset. This dataset encompasses transcriptome data from iPSC to neuron differentiation from 8 ASD and 6 TD donors and each donor is represented with 1 to 3 different cell lines at each differentiation time point in the dataset. To measure the DE-ASD network activity at neural progenitor and neuronal stages, we randomly selected 10 samples (5 neural progenitor samples and 5 neuron samples) from each diagnosis group (i.e., ASD and TD), iterating 100 times. As the cell lines derived from the same donor tend to be highly correlated at each differentiation time point, the sample selection was done such that each donor contributed a maximum of one sample in each differentiation time point.

To map the co-expression activity of the DE-ASD networks on toddlers' ADOS communication and socialization (CoSo) deficit scores, we only considered ASD samples as DE-ASD networks were constructed among DE genes between ASD and TD. ASD toddlers were grouped based on a moving window on ADOS CoSo scores with the width of 4 and a step size of 1. The number of toddlers with scores of 5 and 6 were relatively few compared to other categories. Therefore, the first window was from ADOS CoSo score 5 to 10 (window size of 6). Moreover, to avoid potential biases due to number of samples in each window, the network activities were measured based on randomly selected sets of 20 samples from each window, iterating 1000 times. The correlation of ADOS CoSo scores with the observed network activity was measured by considering the windows as ordinal values. To assess the statistical significance of observed pattern, we randomly shuffled the ADOS CoSo scores of toddlers 10,000 times and re-calculated the network activity for each permutation using the same procedure (with no internal iterations).

There are some objective differences for measuring network activity during normal brain development versus the correlation of the blood network activity with ADOS CoSo scores. While in brain transcriptome data we wanted to know if the DE-ASD networks show co-expression levels higher than background, we already knew that these networks are significantly co-expressed in ASD toddlers and were most interested to see if their change in co-expression activity is dependent on ADOS CoSo scores. Hence to map the relative activity of the DE-ASD networks in leukocytes of ASD toddlers, as a secondary analysis, we devised a more stringent test by basing the background co-expression on the same network in the TD toddlers (instead of random genes from the same samples). The distribution of co-expression scores in each ADOS CoSo score window were compared to the co-expression distribution (Wilcoxon-Mann-Whitney test) of the same network after randomly selecting the same number of samples among the TD toddlers (20 ASD samples and 20 TD samples at each iteration). Because of numerous possible combinations for selected samples, we repeated the same procedure 1000 times each with a distinct ASD and TD sample combination for all three context-specific DE-ASD networks to get the range of the network activity at each window. To assess the significance of observed distribution, we performed 10,000 times random shuffling of CoSo scores of ASD toddlers (with no internal iterations).

Ranking Genes Based on their Perceived Importance in Classification Accuracy

Our analyses illustrated the interactions in the DE-ASD network show stronger co-expression in ASD samples compared to that of TD. To identify the interactions and genes that are central to this increase in co-expression, we sorted the interactions in each of three DE-ASD networks based on their change in magnitude between ASD and TD samples. We next retained those interactions where $\text{abs}(\text{cor}_{ASD}) - \text{abs}(\text{cor}_{RD}) \geq 0.1$. To identify the genes that are the main drivers of the observed increase in the co-expression magnitude, we next sorted the DE genes based on their number of connections among the retained interactions.

Statistics and Reproducibility

Almost all statistical analyses were conducted in the R programing environment (version 3.5.0; see supplementary software). For microarray data, raw Illumina probe intensities were converted to expression values using the lumi package[54]. We filtered out probes that were not expressed from the dataset. Through quality control assessments, we identified and removed 22 outlier samples from the microarray dataset. Data were next quantile normalized and differentially expression genes were identified using limma package[56] with the experimental batch included as a covariate in the regression model. Genes with Benjamini-Hochberg corrected p-value <0.05 were deemed as differentially expressed. Surrogate variable analysis did not support presence of other co-variates in the data[63]. Cibersort was used to examine potential impact of cell types on the differential expression patterns[76]. Technical replicates were used to assess the quality of samples and then were excluded from differential expression analysis and the follow up analyses (e.g., co-expression network construction). RNA-Seq data were mapped and quantified using STAR[60] and HTSeq[62], respectively. Quality of RNA-Seq samples were examined using FastQC[58]. Surrogate variable analysis was performed to identify and remove a covariate from RNA-Seq data[63]. Pearson's correlation coefficient was used for the comparison of fold changes across datasets. We regressed out the covariate (i.e., the experimental batch) before calculating the co-expression. Significantly co-expressed genes were identified using the CLR package in MATLAB[65], and interactions with co-expression FDR <0.05 were considered as significant. For network co-expression activity, we used unsigned Pearson's correlation coefficient to measure the co-expression magnitude of interactions. The co-expression magnitudes of interactions of two networks were compared using two-sided Wilcoxon-Mann-Whitney test. When comparing co-expression magnitudes in two different datasets, to ascertain that the number of samples do not influence the measurements, a balanced number of samples were selected randomly. In most cases we used permutation tests to empirically examine the significance of an observed overlap between two gene sets. In cases that required a large number of tests, to increase speed, we used either hypergeometric or fisher's exact tests. Fisher's exact test was used to examine the overlap of the constructed networks with Gene Ontology-biological process (GO-BP) terms. We used the RamiGO package[72] to cluster significantly enriched GO-BP terms that are similar and overlapping in their gene content. If appropriate, all p-values were corrected for multiple testing. The EnrichR portal[73] was used to systematically examine the enrichment of the DE-ASD networks for the regulatory targets of human transcription factors. Fisher's method was used to combine p-values from multiple assays on the same transcription factor. When applicable, we specified the sample sizes (n) within the figure legend or table description. Non-parametric tests (e.g., Wilcoxon-Mann-Whitney and permutation tests) were used to avoid strong assumptions about the distribution of data in our statistical analyses. No statistical tests were used to predetermine sample sizes, but our sample sizes were larger than those reported in previous publications[18,19,25]. No randomization was performed in our cohort assignment. Data collection and analysis were not performed blind to the conditions of the experiments.

Downstream Processes of PI3K/AKT Pathway Support its Over-Activity in ASD Toddlers The role of the PI3K/AKT pathway on cell proliferation and functioning of blood and neuron cells has been studied 3.40.78-82. These effects are associated with the role of the PI3K/AKT signaling pathway in activating the mTOR and β-catenin pathways and suppressing the FOXO1 transcriptional repressor. This is of particular interest since GSEA revealed that, in addition to over-expression of PI3K/AKT pathway, the mTOR pathway and FOXO1 targets show consistent results with over-activity of PI3K/AKT signaling in ASD toddlers. Specifically, we observed the upregulation of mTOR pathway (FDR <0.044; GSEA) and its significant enrichment in DE-ASD networks (FDR<0.037 in all three DE-ASD networks; hypergeometric test). We also found an upregulation of genes in ASD toddler leukocytes that are potentially regulated by FOXO1 as well as genes that are upregulated in knock-out of FOXO1 transcriptional repressor in T regulatory cells (FDR <0.086; GSEA). The potential binding targets of FOXO1 and genes responsive to its knock-out were extracted from TRANSFAC v7.4[83] and Ouyang et al. study[84] through msigdb.v5.1 database 72, respectively.

ADDITIONAL EXAMPLES

We developed a single-sample based method to measure the network dysregulation in each sample. We show that at the molecular level, distinct subtypes of ASD exist and we can classify subclasses of ASD. Our results provide evidence on high penetrance rate of the signature in ASD.

Parsing the Heterogeneity of Autism Based on Blood Signatures

Methods and results are based measurement of the magnitude of co-expression patterns. Our results indicate that the extent of dysregulation of coexpression in our DE-ASD network is correlated with the ASD severity level in male toddlers at the group level. To calculate the co-expression (e.g., correlation), one need to have multiple samples. Therefore, it is not possible to apply that metric to measure network-based dysregulations in each individual sample, separately. However, ideally, one wants to know if a given sample shows a dysregulation in the network of interest. Here we expand the approach to allow measuring the network activity in each individual sample. This new metric is conceptually based on the same concept that we used to measure network coexpression in a set of samples. This new metric allows diagnosis of individuals. Our individual-sample based analysis of the data demonstrated the strong dysregulation of the DE-ASD network in about 50% of ASD toddlers.

This sample based analysis reveals two clear subgroups of ASD, one subgroup that exhibits strong dysregulation of the DE-ASD network as per our submitted paper, and a second ASD subgroup that does not show such dysregulation. Thus our approach allows the identification of sub-groups in ASD.

We performed differential gene expression analysis between the two subtypes that we identified in slide 11 and TD normal controls. We found: 2834 differentially expressed genes in the ASD subgroup that exhibited the network dysregulation at FDR <0.05, covering 94% of genes that were detected as differentially expressed in the combined dataset and adding 2061 newly identified differentially expressed genes. In contrast, differential gene expression analysis of ASD toddlers who do not show the network over-activity, identified only 11 genes (FDR<0.1) as differentially expressed.

These observations may be due to a strong genetic-based origin of ASD for this subgroup. Meanwhile, nongenetic etiologies likely underlie ASD among the subgroup that did not have DE-ASD dysregulation. (further work underway to solidify our current evidence). Thus, our approach allows us to identify subgroups of ASD subjects with likely different etiologies.

FIGS. 9a-9i illustrate robustness analysis of observed DE patterns. FIG. 9a MA-plot of the primary dataset (n=119 ASD and 107 TD subjects). The line indicates the regression line between mean and fold change of all genes expressed in the dataset. As demonstrated, the mean expression and the fold changes are not correlated in overall. However, compared to all expressed genes, differentially expressed genes exhibit an up-regulation pattern (p-value <2.6x10-63; two-sided Wilcoxon-Mann-Whitney test). FIG. 9b To observe the effect of the data processing approach on fold change patterns, the covariates of the linear regression model were changed in the limma package. As shown, similar fold change patterns were observed with or without inclusion of age as a covariate with a Pearson's correlation coefficient of 0.94 (n=119 ASD and 107 TD subjects). FIG. 9c Our primary transcriptome dataset was composed of 226 subjects analyzed in two different batches including one batch of 128 samples (n=84 ASD and 24 TD subjects) that was reported by Pramparo et al. previously and a second batch of 98 samples (n=35 ASD and 63 TD subjects) that included new samples (samples non-overlapping between the batches; technical replicates were randomly removed). To assess whether the batch effect could be effectively handled, we compared the fold change patterns of DE genes between these two batches. For a more conservative analysis, we took the fold change of DE genes from the previously published batch from Pramparo et all study. These fold changes were calculated using a different analysis pipeline compared to current study. We next compared those fold changes with our limma-based analysis of 98 new non-overlapping samples presented in this study. As illustrated, similar fold change patterns were observed with a Pearson's correlation coefficient of 0.74. Further analysis corroborated the effectiveness of our analysis on removal of batch effects. FIG. 9d To ensure that the observed fold changes are not due to presence of some outliers in our samples, we performed jack-knife resampling. Repeating 100 times, we sampled from 20% to 90% of the quantile normalized transcriptome data from n=226 samples, while preserving the proportion of ASD-to-TD samples. The sampled datasets were then processed independently and fold change patterns were observed. As shown, we found that the jack-knife fold change patterns correlate well with those of total 226 samples as measured by Pearson's correlation coefficient. This result demonstrates that the fold change patterns are shared in a large fraction of samples. We reached to similar conclusions based on the resampling of the network activity as presented in FIGS. 6a-6d. FIG. 9e To estimate the signal-to-noise ratio of observed fold changes on n=226 samples, we repeated the jack-knife resampling procedure, but this time counted the number of DE genes that were also identified as differentially expressed in the sampled datasets (limma analysis; FDR <0.05). As illustrated, we found that a large sample size is required to identify our DE list as significant. FIGS. 9f-9i To assess the reproducibility of fold change patterns of differentially expressed genes, we performed another transcriptome experiment using a different microarray chip platform. The primary dataset was analyzed on Illumina BeadChip HumanHT-12, while this dataset was analyzed on Illumina BeadChip HumanWG-6. This second dataset was composed of 56 male toddlers (n=35 ASD and 21 TD) that were shared with the primary dataset (technical replicate dataset). In a third dataset, we included an additional n=48 samples including 24 independent ASD male toddlers, while 21 out of 24 TD samples overlapped with the primary dataset. These two groups of samples were processed separately to assess the reproducibility of results at both technical and biological levels. The latter would potentially hint on the penetrance level of the dysregulation signal in ASD population. As illustrated, we observed good reproducibility at technical (panels 9f and 9g) and biological (panels 9h and 9i) levels with Pearson's correlation coefficients of 0.83 and 0.73, respectively. To assess if the overlapping TD samples in the partially overlapping dataset are driving the signal, we excluded the 21 overlapping TD subjects from the primary dataset (panels 9h and 9i). We further performed the transcriptomics analysis of an entirely independent cohort of ASD and TD male toddlers using RNA-Seq platform and reached to a similar conclusion (FIGS. 12a-12c).

Figures 10A, 10B, 10C, 10D, 10E:
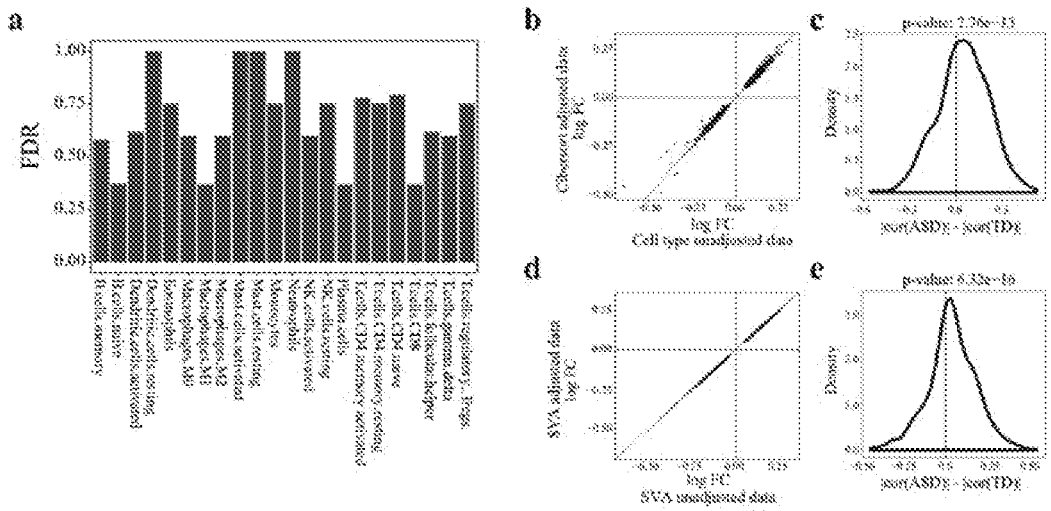

FIGS. 10a-10e illustrate the presence of confounding factors in the gene expression data. FIG. 10a Cell type compositions have not significantly changed between n=119 ASD and 107 TD toddlers. The cell type compositions were estimated in each sample using Cibersort algorithm. The relative frequency of each cell type was next compared between ASD and TD samples using t-test. p-values were adjusted using Benjamini-Hochberg procedure. FIG. 10b To assess the potential confounding effect of cell type composition on the gene expression patterns, we included the cell types with nominal p-value <0.1 (four cell types) in the regression model. As illustrated, the fold change patterns remain robust to changes in the cell type composition. FIG. 10c To assess the potential effect of cell type composition on the network activity, we regressed out the effect of the cell types that nominally changed between n=119 ASD and 107 TD (p-value <0.1) from the gene expression data. As illustrated, the DE network remains transcriptionally over-active. For an unbiased analysis, as is done in all comparisons of network activity between leukocyte ASD and TD samples, a merged network composed of union of interactions between DE-ASD and DE-TD networks were considered. The signal becomes stronger if the analysis was based on only DE-ASD network. Paired one-sided Wilcoxon-Mann-Whitney test used for the comparison of Pearson's correlation coefficients. FIG. 10d To examine potential effect of hidden confounding effects on the gene expression patterns, we performed SVA analysis on the batch corrected gene expression data on n=226 samples. This analysis identified no significant surrogate variable (SV) in the dataset. We next re-calculated fold change patterns by including the first SV in the regression model. As illustrated, the fold change patterns remain highly similar. FIG. 10e To assess the effect of hidden surrogate variables on the network activity, we considered the first SV from above as an additional covariate and regressed out its effect from gene expression data from n=119 ASD and 107 TD samples. As illustrated, the DE network remains transcriptionally over active (paired one-sided Wilcoxon-Mann-Whitney test)

Figures 11A, 11B, 11C, 11D:
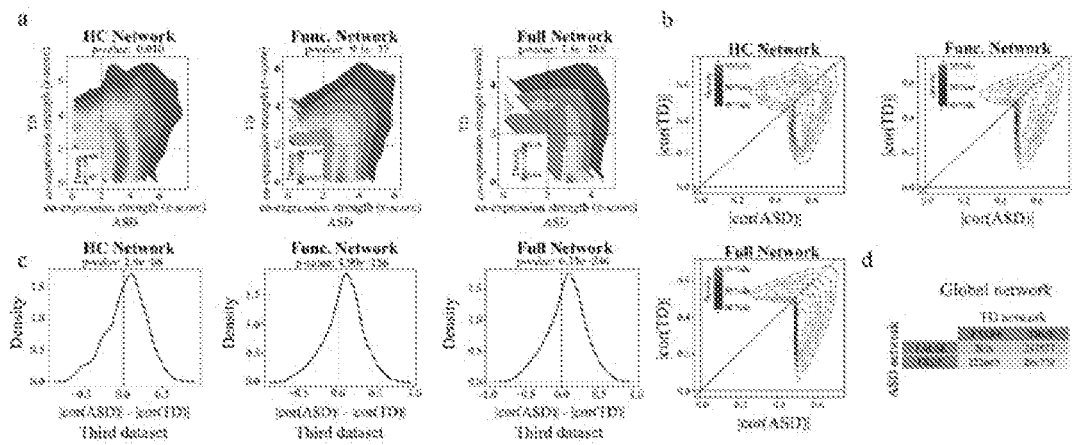

FIGS. 11a-11d illustrate robustness analysis related to transcriptional over-activity of DE network in ASD samples. FIG. 11a The over-activity of the DE-ASD network is independent of the backbone static network. Here, the co-expression strength of context specific DE-ASD and DE-TD networks were compared using three different backbone networks of high confidence (HC), functional, and full co-expression across n=119 ASD and 107 TD samples (see methods for details). The three networks varied in number of genes and interactions. For each backbone, only those interactions that were significantly co-expressed (FDR<0.05) in at least one of diagnosis groups were included in the analysis. Red and blue colors represent regions with high and low density of interactions, respectively. The interaction strengths were compared by paired two-sided Wilcoxon-Mann-Whitney test. FIG. 11b The over-activity of the DE-ASD network was uncovered using a mutual information-based method. To assess whether the elevated co-expression strength of the networks are supported with other metrics, we calculated the Pearson's correlation coefficient for each interaction present in the static networks or all possible pairs of DE genes in the case of full co-expression network (n=119 ASD and 107 TD subjects). We next only retained interactions that had an absolute correlation of above 0.5 in either ASD or TD diagnosis groups. As illustrated, interactions tend to have higher correlations in ASD than TD, indicating the robustness of observed over-activity across different similarity metrics. FIG. 11c The over-activity of the DE network was examined in another dataset that included n=24 independent male ASD toddlers. This dataset also contained n=24 TD male toddlers, including 21 subjects that overlapped with the primary dataset. As shown, we observed replicable over-activity of the DE networks in ASD group, as measured based on the co-expression strength. The correlation strengths of interactions in ASD and TD samples were compared using paired two-sided Wilcoxon-Mann-Whitney test. We further performed the transcriptomics analysis of an entirely independent cohort of ASD and TD male toddlers using RNA-Seq platform and reached to a similar conclusion (FIGS. 12a-12c). FIG. 11d To assess whether network over-activity of ASD samples is a general characteristic in our dataset or is specific to the DE networks, we generated a global ASD network using the same approach as employed for the DE networks, but not limiting the network to the DE genes (n=119 ASD and 107 TD subjects). Thus, the backbone static network included all functional interactions present in GeneMania database. As shown, we found that in contrast to the DE networks, the global network showed slightly but significantly higher co-expression levels in TD samples (p-value 1.0; paired two-sided Wilcoxon-Mann-Whitney test). The table indicates the number of interactions in the global network that were deemed as significant in either ASD or TD diagnosis groups (FDR<0.05).

FIGS. 12a-12c illustrate reproducibility of the signature in an independent cohort as measured by RNA-Seq. To assess the generalizability and reproducibility of the observed signature, we performed transcriptomics analysis of an independent cohort of n=12 TD and 23 ASD toddlers (56 samples including technical replicates). Our primary dataset was analyzed by microarray platform. To ensure the results are not dependent on the transcriptomics platform, we analyzed this dataset using RNA-Seq platform. Moreover, we included in the dataset 7 and 14 technical replicated of TD and ASD samples. Technical replicates were modeled as random effects in the differential expression analysis of this RNA-Seq dataset. FIG. 12a Fold change comparison of the 1236 DE genes between the two datasets demonstrated moderate conservation of the fold change patterns between the two datasets (Pearson's correlation coefficient: 0.46). We also observed 73% of DE genes preserved their directionality in both datasets (e.g., up or down in both datasets). FIG. 12b Genes involved in the DE-ASD network exhibit highly preserved fold change patterns between the two datasets. The figure compares the fold change pattern of genes involved in HC DE-ASD network. We observed a boost in the Pearson's correlation coefficient of the fold change patterns between the RNA-Seq (n=56 samples) and microarray (n=226 samples) datasets, suggesting the network construction procedure has removed some of the false positives among the 1236 DE genes. We also observed 82% of genes involved in the HC DE-ASD network have preserved their directionality between the two datasets. FIG. 12c DE networks are transcriptionally over-active in the independent RNA-Seq dataset. Y-axis demonstrates the z-transformed p-value comparing the activity of DE network between ASD and TD samples in the RNA-Seq dataset. To ensure robustness of the results, iterating 100 times, we randomly selected n=12 TD and 12 ASD samples (unique subjects) from the dataset and compared the activity of DE network according to the selected ASD and TD samples using two-sided Wilcoxon-Mann-Whitney test. Y-axis demonstrates the z-transformed p-values. In cases that z-score could not be estimated (e.g., p-value=0), we used the z-score form lowest non-zero p-value. Summary statistics related to the HC DE-ASD boxplot: min: −3.6; 25% ile: 4.2; median: 7.93; mean: 6.90; 75% ile: 10.53; max: 13.92. Summary statistics related to the Func DE-ASD boxplot: min: −7.51; 25% ile: 28.70; median: 35.92; mean: 27.61; 75% ile: 37.37; max: 37.37. Summary statistics related to the Full DE-ASD boxplot: min: −1.97; 25% ile: 30.56; median: 32.36; mean: 26.92; 75% ile: 32.36; max: 32.36.

Figures 13A, 13B, 13C, 13D, 13E, 13F:
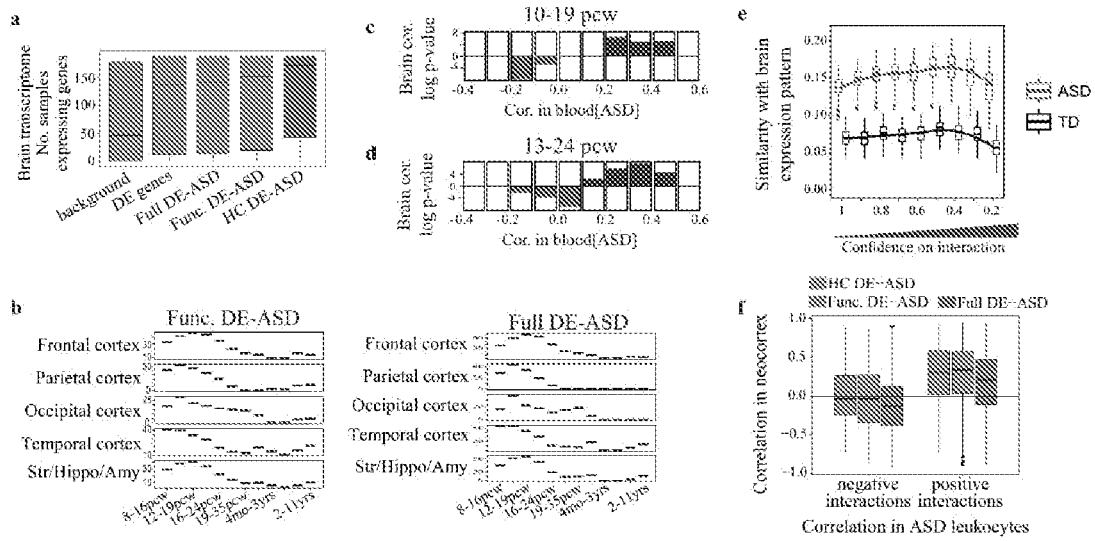

FIGS. 13a-13f illustrate DE genes that are involved in networks that are preserved between blood and brain tissues. FIG. 13a Genes involved in the DE-ASD networks are highly expressed during normal brain development process in prenatal (≥8 post conception weeks) and early postnatal (<1 year old) ages. BrainSpan RNA-Seq transcriptome data were used for this analysis (n=187 samples). Genes with RPKM>5 were considered as expressed in each sample. Groups were compared using two-sided Wilcoxon-Mann-Whitney test.

Summary statistics for the boxplots (min;25% ile;median; mean;75% ile;max): background: 0.00;0.00;46.00;79.91; 177.00;187.00. DEgenes: 0.00;12.00;136.00; 106.43; 187.00;187.00. Full DE-ASD: 0.00; 14.00; 141.00;108.64; 187.00;187.00. DE-ASD: Func 0.00; 19.25;151.00; 111.66; 187.00;187.00. HC DE-ASD: 0.00;42.75;171.00; 124.88; 187.00;187.00. FIG. 13b Network activity patterns of functional and full DE-ASD networks based on BrainSpan transcriptome data at prenatal and early postnatal ages. At each time window, the activity was measured based on the distribution of co-expression strength of interacting gene pairs in DE-ASD network using Pearson's correlation coefficient metric (n=121 frontal, 73 temporal, 42 parietal, 27 occipital cortices, and 72 striatum, hippocampus, and amygdala samples across time points). The y-axis indicates the z-transformed p-value of co-expression strength as measured by a two-sided Wilcoxon-Mann-Whitney test. FIG. 13c The conservation of interactions between blood and brain for a previously reported co-expression network around high confidence rASD genes in brain at 10-19 post conception weeks from Willsey et al. The interactions were partitioned based on their correlation value in the n=119 blood samples from subjects with ASD (window size of 0.1). The bar-graphs in each bin represents significant enrichment for positive (blue with positive enrichment values) or negative (red with negative enrichment values) interactions based on the corresponding brain transcriptome data (log 10 transformed p-values; hypergeometric test). Only statistically significant (p<0.05) comparisons are represented in bar graphs. FIG. 13d Similar to FIG. 13c, but for a co-expression network of high confidence ASD risk genes from 13 to 24 weeks post conception were extracted from Willsey et al. FIG. 13e brain derived co-expression network of rASD genes (the same network as panel FIG. 13d were compared to the co-expression pattern of the same interactions in leukocyte transcriptome of ASD and TD toddlers. Boxplots represent the observed similarity based on 100 random sub-sampling of n=75 ASD and 75 of TD samples (~70% of samples in each diagnosis group). The x-axis represents the top percentile of positive and negative interactions based on the brain transcriptome interaction weights. For example, 20% ile illustrates the results when only top 20% of positively and top 20% of negatively interacting genes in the brain co-expression network were considered for the analysis (selected based on the interaction weights). As illustrated, ASD samples have significantly higher similarity in co-expression patterns with the developing brain than TD samples. FIG. 13f Positive and negative interactions in DE-ASD networks were preserved between blood (n=119) and brain at prenatal and early postnatal ages (n=187).

Summary statistics on the boxplots (min;25% ile;median; mean;75% ile;max): HC DE-ASD positive interactions: −0.75;0.02;0.32;0.28;0.59;0.94. HC DE-ASD negative interactions: −0.72;−0.24;−0.04;−0.01;0.26;0.89. Func. DE-ASD positive interactions: −0.89; 0.04; 0.34; 0.28;0.58;0.95. Func. DE-ASD negative interactions: −0.86;−0.34;−0.04;−0.02;0.27;0.89. Full DE-ASD positive interactions: −0.91;−0.11;0.21;0.17;0.48;0.95. Full DE-ASD negative interactions: −0.92;−0.38;−0.13;−0.11;0.13;0.91

FIGS. 14a-14b illustrate DE-ASD network that is transcriptionally active at prenatal brain. FIG. 14a DE-ASD network is significantly better preserved than DE-TD network in prenatal and early postnatal brain. Correlations of interactions of DE-ASD and DE-TD with brain gene expression were estimated using BrainSpan RNA-Seq data. Briefly, to examine the preservation of interactions in each of the two networks, iterating 100 times, we calculated the correlations of interactions in DE-ASD and DE-TD networks based on a randomly selected subset of n=70 ASD and 70 TD samples, respectively. Next, the similarity of estimated correlations of interactions between brain and blood samples were calculated using Pearson's correlation coefficient. As illustrated, the DE-ASD network is significantly better preserved in prenatal and early postnatal brain transcriptome data. Boxplots summary statistics (min;25% ile; median;mean;75% ile;max): HC DE-ASD: 0.30;0.32;0.33; 0.33;0.34;0.36. HC DE-ASD: 0.23;0.24;0.25;0.25;0.26; 0.28. Func DE-ASD: 0.23;0.29;0.29;0.29;0.30;0.31. Func DE-TD: 0.20;0.22;0.22;0.22;0.23;0.24. Full DE-ASD: 0.30; 0.34;0.35;0.34;0.35;0.36. Full DE-TD: 0.25;0.26;0.26;0.26; 0.26;0.28. FIG. 14b Transcriptional over-activity of DE-ASD networks at prenatal brain development period. The transcriptional activity of genes involved in DE-ASD network were estimated in each sample using GSVA analysis. Opposed to our network transcriptional activity measure that is based on the co-expression magnitude of interactions, GSVA employs a sample based metric based on the concept of GSEA in which the overall expression pattern of the genes in each sample is examined, disregarding the network structure. As illustrated, similar to the co-expression-based analysis of network activity, GSVA supports up-regulation of DE-ASD networks at prenatal brain transcriptome, suggesting the robustness of the results to methodological variations. Reported p-values are based on the comparison of the DE-ASD network expression pattern between prenatal (n=157 samples) and early postnatal (n=90 samples; 4 month-old to 8 year-old) periods using a two-sided Wilcoxon-Mann-Whitney test.

Figures 15A, 15B, 15C, 15D, 15E, 15F, 15G:
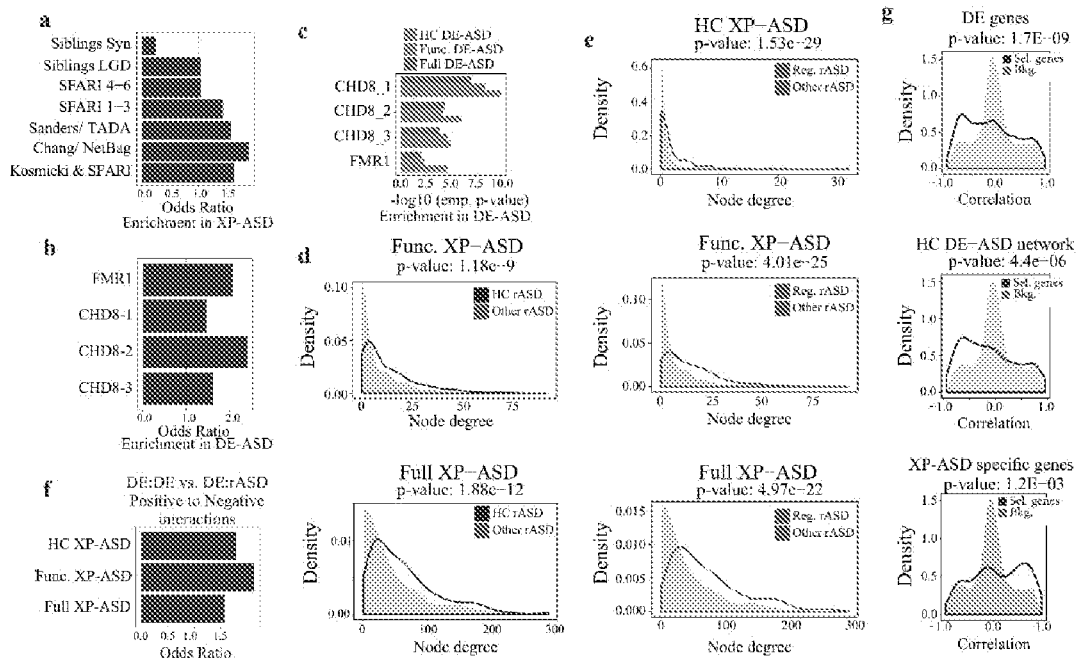

FIGS. 15a-15g illustrate robustness analysis of observed association of rASD genes with DE-ASD networks. FIG. 15a High confidence rASD genes are enriched in the XP-ASD networks. Genes with likely gene damaging (LGD) and synonymous (Syn) mutations in siblings of ASD subjects were extracted from Iossifov et al. study. Figures. 15b-15c The regulatory targets of well-known rASD genes (CHD8 and FMR1) are enriched in HC DE-ASD (FIG. 15b) as well as Functional and Full co-expression DE-ASD networks (FIG. 15c). The regulatory targets of CHD8 were extracted from Sugathan et al. (CHD8-1), Gompers et al. (CHD8-2), and Cotney et al. (CHD8-3). The regulatory targets of FMR1 gene were retrieved from Darnell et al. P-values were calculated empirically by permutation tests. FIG. 15d High confidence rASD genes are more strongly associated with the XP-ASD network than the lower confidence ones, as judged with the number of interactions. The node degree distribution of high confidence and lower confidence rASD genes were compared using a two-sided Wilcoxon-Mann-Whitney test. FIG. 15e rASD genes with potentially gene expression regulatory roles are enriched in the XP-ASD networks. The node degree of DNA binding rASD genes with those from the rest of rASD genes were compared using a two-sided Wilcoxon-Mann-Whitney test. FIG. 15f Cross interactions between DE and rASD genes are significantly enriched for interactions with negative Pearson's correlation coefficient, related to FIG. 4. We compared the ratio of positive to negative interactions between DE and rASD genes to those within DE genes. The x-axis shows the estimated odds ratio. All p-values <3.1×10-4, two-sided Fisher's exact test. FIG. 15g Each plot shows the distribution of Pearson's correlation coefficients of gene expressions with the time points during the in vitro differentiation process of primary human neural progenitor cells, related to FIGS. 4a-4c (n=77 samples; 3 fetal brain donors). As shown, DE genes are down-regulated during the differentiation process (negative correlations), while rASD genes show an up-regulation pattern (positive correlations).

FIGS. 16a-16c illustrate biological process enrichment analysis of the DE-ASD and XP-ASD networks. FIG. 16a Genes up-regulated in background knock-down of CHD8 are significantly enriched (permutation tests) in DE-ASD networks. Up and down regulated genes were extracted from Sugathan et al. (CHD8_1), Gompers et al. (CHD8_2), and Cotney et al. (CHD8_3). FIG. 16b Biological processes that are enriched in the DE-ASD networks (Benjamini-Hochberg corrected FDR <0.1; hypergeometric test). The represented terms are also significantly changed between n=119 ASD and 107 TD samples as judged by GSEA. See methods for more details. FIG. 16c Integrated hub analysis of DE-ASD and XP-ASD networks. For each network, the hub analysis was based on an integrated analysis of context specific high confidence (HC) and functional ASD networks. P-values are calculated empirically based on the degree distribution of genes involved in the DE-ASD and XP-ASD networks (see methods).

FIG. 17 illustrates a network of hub genes in the DE-ASD and XP-ASD networks. Network of hub genes in HC XP-ASD network. Green greyscales represents genes that are hub in both DE-ASD and XP-ASD networks. Purple greyscales shows genes that are hub only in the HC XP-ASD network.

FIGS. 18a-18c illustrate elevated co-expression of the DE-ASD networks in ASD neuron models. FIG. 18a RNA-Seq transcriptome data from hiPSC-to-neuron differentiation of ASD and TD cases were TMM normalized and log 2 (x+1) transformed (n=83 samples from 14 donors). As shown, genes involved in the DE-ASD networks are highly expressed at neural progenitor and neuron stages. Boxplot summary statistics (min;25% ile;median;mean;75% ile; max): background: 0.00;7.06; 10.01;8.87; 11.41;17.44. HC DE-ASD: 0.00;9.92; 11.22; 10.61;12.23;15.90. Func DE-ASD: 0.00;9.56;10.79;10.27;11.89;15.90. Full DE-ASD: 0.00;9.43;10.73;10.14;11.85;15.90. FIG. 18b DE-ASD networks are highly over-active in the ASD neural progenitor and neurons of ASD individuals, compared to the TD cases. To ensure the robustness of estimated network co-expression activity levels, we measured the co-expression strength (i.e., unsigned Pearson's correlation coefficient) in 100 sub-sampled transcriptomic data from n=5 neural progenitor and 5 neurons of each ASD and TD diagnosis groups. The y-axis indicates the z-transformed p-value of co-expression strength as measured by two-sided Wilcoxon-Mann-Whitney test. Boxplot summary statistics (min;25% ile;median; mean;75% ile;max): HC DE-ASD in ASD: 1 0.24;3.89;6.91; 6.17;8.41;10.11. HC DE-ASD in TD: 3.81;5.01;5.71;5.65;

6.24;7.27. Func DE-ASD in ASD: 2.64;16.72;34.86;30.38; 41.98;53.57. Func DE-ASD in TD: 18.79;21.40;23.00; 23.34;24.96;29.45. Full DE-ASD in ASD: 3.64; 18.74; 50.81;45.00;68.25;88.31. Full DE-ASD in TD: 19.69;25.72; 28.93;28.92;32.41;41.25 FIG. 18c The density plots represent the distribution of co-expression strength (i.e., Pearson's correlation coefficient) of interactions in the DE-ASD networks at neural progenitor and neurons stages. The background distribution is based on the correlation structure of the background genes FIGS. 19a-19c illustrate DE-ASD network transcriptional activity is correlated with ADOS-SA deficit scores. FIG. 19a Male toddlers with ASD were categorized based their ADOS social affect (ADOS-SA) deficit scores to the three groups of mild (ADOS-SA between 5 to 11; n=29), medium severity (ADOS-SA between 12 to 15; n=51), and high severity (ADOS-SA between 16 to 21; n=39). As shown, individuals at different severity levels show similar dysregulation patterns of DE genes. FIG. 19b Male toddlers with ASD were sorted and grouped based on the ADOS-SA severity scores. Activity level of the DE-ASD networks in each group were measured based on the observed co-expression strength of interactions in the DE-ASD networks in randomly selected n=20 samples from each diagnosis group. The distribution of co-expression strengths (i.e., unsigned Pearson's correlation coefficient) were next compared with what would be expected from a randomly selected set of genes within the same samples. The inset boxplots on top left demonstrate the distribution of observed and expected by chance Pearson's correlation coefficient of ADOS-SA scores with network activity levels. The expected random distribution was generated by 10000 times random permutation of ADOS-SA scores of ASD individuals in the dataset. Note that the defined ASD severity levels are not independent and overlap with each other. FIG. 19c Network over-activity was measured by comparing the activity of DE-ASD networks in ASD versus randomly sampled TD cases (activity is measured based on n=20 selected samples from each diagnosis group). The inset boxplots demonstrate the distribution of observed and expected random Pearson's correlation of ADOS-SA severity levels with the DE-ASD network activity levels. We used empirical methods to estimate the p-value of observed correlations with those of random in FIGS. 19b and 19c. Iterating 106 times, we sampled 100 data points from each of observed and random groups and assessed if the mean correlation in the samples from the random group is equal or higher than those of the observation group in absolute value. This analysis demonstrated a two-sided empirical p-value <10-6 for observed correlations.

FIGS. 20a-20c illustrate isolating the effect of ADOS-SA scores on the co-transcriptional activity of DE-ASD networks. FIG. 20a In our ASD cohort, ADOS social affect (ADOS-SA) scores are correlated with Mullen ELC scores (n=119 subjects with ASD; Pearson's correlation coefficient: −0.41). FIG. 20b To isolate the effect of ADOS-SA scores, we selected subjects with ASD who have Mullen ELC scores above 55 and below 80 (n=47 subjects). In this subset, ADOS-SA scores were no longer correlated with Mullen ELC scores (Pearson's correlation coefficient:-0.0029). We next divided the 47 ASD samples into two groups based on their median ADOS-SA scores. Iterating 100 times, we sampled n=15 from each ASD subgroup and compared the activity of the network. FIG. 20c represents the z-transformed p-value of the comparisons of DE-ASD network over-activity between high and low ADOS-SA groups as measured by a one-sided Wilcoxon-Mann-Whitney test. In cases that z-score could not be estimated (e.g., p-value=0), we used the z-score form lowest none-zero p-value. As illustrated, the DE-ASD network exhibits over-activity in subjects with high ADOS-SA scores in this selected subset. Boxplot summary statistics (min;25% ile;median;mean;75% ile;max): HC DE-ASD: −5.48; 1.95; 5.37; 4.42; 7.54;11.14. Func DE-ASD: −7.87;17.85;32.32;26.61;37.00;37.00. Full DE-ASD: −4.43;35.54;35.87;31.81;36.96;36.96.

Figures 21A, 21B, 21C, 21D:
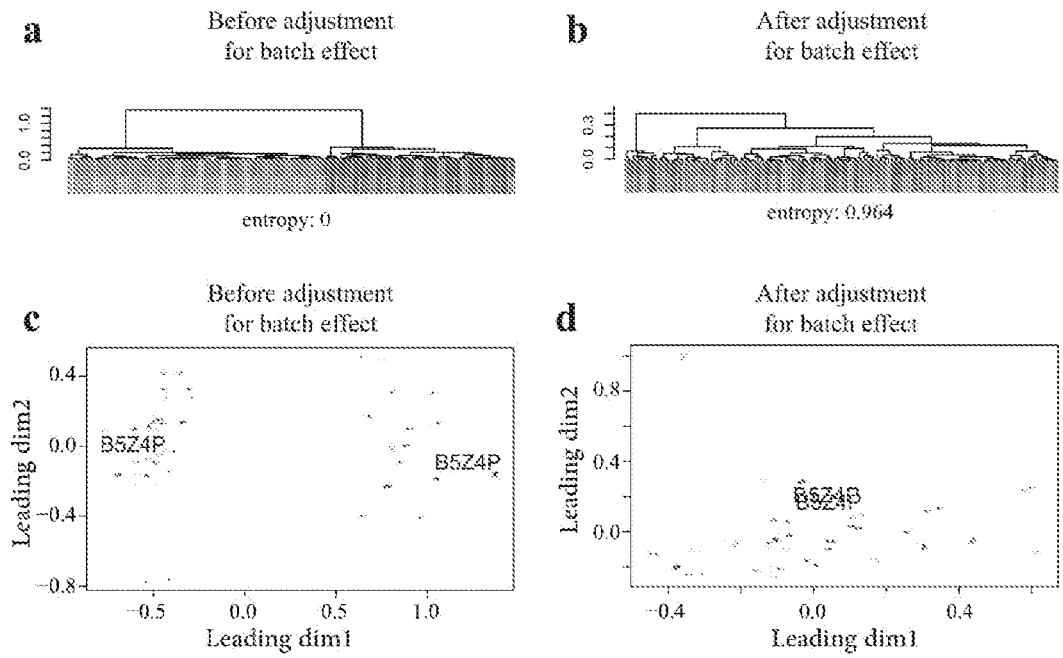

FIGS. 21a-21d illustrate batch effects could be effectively handled by linear regression models. The top plots FIGS. 21a-21b illustrate a hierarchical clustering of n=226 subjects based on 1000 most variable genes in the primary microarray dataset. Samples are color coded based on the batch number. To estimate batch effects, we clustered the samples to 8 clusters and measured the uncertainty (heterogeneity) level of batch co-variate within each cluster using an entropy metric. The overall entropy score is sum of cluster entropy scores weighted by the cluster size. Entropy of zero implies that samples of the same batch are clustered with each other, and increasing entropy levels indicate a more random distribution of samples in terms of the batch co-variate. The bottom plots FIGS. 21c-21d demonstrate principle coordinate plot of samples that have technical replicates (57 samples). The distance of every two samples on the plot approximate their Euclidian distance based on 1000 most variable genes in the dataset. Samples are color-coded with technical replicates in the same color. B5Z4P is a sample with technical replicates in two different batches as obvious in FIG. 21c. Principal component figures are generated by limma package in R.

FIGS. 22a-22p illustrate reproducibility of results under a different analysis setting. To assess the robustness of results, we assessed their reproducibility under a more stringent criterion for the expressed genes. The main results are based on the selection of 14,854 protein coding genes as expressed in the dataset. By comparison with the results of GTEx whole blood transcriptome data, we showed that number of expressed protein coding genes are in the same range in both studies (14,555 Expressed protein coding genes in GTEx; see methods for more details). Here, we employed a more stringent analysis by setting the p-value detection cut-off threshold at 0.01 instead of 0.05 (see methods for more details). This resulted in the selection of 13,032 protein coding genes as expressed in our leukocyte transcriptome dataset (n=119 ASD and 107 TD). We reanalyzed the new filtered dataset from DE analysis onward (constructed HC DE and XP networks). As shown, FIG. 22a MA-plot shows a similar pattern with mean expression being, in overall, uncorrelated with the fold change patterns. FIG. 22b the DE network showed transcriptional over-activity in ASD subjects (paired Wilcoxon-Mann-Whitney test). FIG. 22c The DE-ASD network significantly overlaps with the same modules and networks of rASD genes as the main results (permutation test). FIG. 22d The DE-ASD network is preferentially expressed at prenatal brain (n=187 BrainSpan neocortex samples). FIG. 22e Transcriptional activity of the DE-ASD network shows a peak at 10-19pcw in prenatal brain (z-transformed p-values of a two-sided Wilcoxon-Mann-Whitney test). FIGS. 22f-22g The DE-ASD network is significantly enriched for targets of high confidence rASD gens (permutation test). CHD8-1: Sugathan et al., CHD8-2: Cotney et al., CHD8-3: Gompers et al., FMR1: Darnell et al. FIGS. 22h-22i The XP-ASD network is preferentially associated with high confidence rASD genes (hypergeometric test). FIG. 22j The XP-ASD network is enriched for rASD genes with regulatory roles (two-sided Wilcoxon-Mann-Whitney test). FIG. 22k The high confidence rASD genes identified by truncating protein mutations in their sequence and pLI score >0.9 through large-scale genetics studies are enriched in the XP-ASD network (hypergeometric test). FIG. 22l The DE and rASD genes show anti-correlated expression patterns in in vitro neural differentiation data (n=77 samples from 3 fetal brain donors). FIG. 22m The XP-ASD network preferentially incorporates rASD genes with regulatory roles on RAS/ERK, PI3K/AKT, and WNT/β-catenin proteins. Results for RAS/ERK pathway is only shown due to space limitations; similar patterns were observed for PI3K/AKT and WNT/β-catenin pathways. FIG. 22n The DE-ASD network is preferentially expressed in hiPS-derived ASD neurons and neural progenitor cells (two-sided Wilcoxon-Mann-Whitney test; n=83 samples from 14 donors). FIG. 22O The DE-ASD network is significantly over-active at transcriptional level in ASD neural progenitor and neuron models (two-sided Wilcoxon-Mann-Whitney test; n=5 progenitor and 5 neuron samples from each of ASD and TD groups). FIG. 22p Co-transcriptional activity of the DE-ASD network correlates with ADOS social affect scores of ASD subjects (permutation test; n=20 subjects at each ASD symptom severity level).

REFERENCES

1 Stoner, R. et al. Patches of disorganization in the neocortex of children with autism. *N Engl J Med* 370, 1209-1219, doi: 10.1056/NEJMoa1307491 (2014).
2 Courchesne, E. et al. Neuron number and size in prefrontal cortex of children with autism. *JAMA* 306, 2001-2010, doi: 10.1001/jama.2011.1638 (2011).
3 Courchesne, E. et al. The ASD Living Biology: from cell proliferation to clinical phenotype. *Mol Psychiatry*, doi: 10.1038/s41380-018-0056-y (2018).
4 Sandin, S. et al. The Heritability of Autism Spectrum Disorder. *JAMA* 318, 1182-1184, doi: 10.1001/jama.2017.12141 (2017).
5 Gaugler, T. et al. Most genetic risk for autism resides with common variation. *Nat Genet* 46, 881-885, doi: 10.1038/ng.3039 (2014).
6 Krishnan, A. et al. Genome-wide prediction and functional characterization of the genetic basis of autism spectrum disorder. *Nat Neurosci* 19, 1454-1462, doi: 10.1038/nn.4353 (2016).
7 Chang, J., Gilman, S. R., Chiang, A. H., Sanders, S. J. & Vitkup, D. Genotype to phenotype relationships in autism spectrum disorders. *Nat Neurosci* 18, 191-198, doi: 10.1038/nn.3907 (2015).
8 de la Torre-Ubieta, L., Won, H., Stein, J. L. & Geschwind, D. H. Advancing the understanding of autism disease mechanisms through genetics. *Nat Med* 22, 345-361, doi: 10.1038/nm.4071 (2016).
9 Willsey, A. J. et al. Coexpression networks implicate human midfetal deep cortical projection neurons in the pathogenesis of autism. *Cell* 155, 997-1007, doi: 10.1016/j.cell.2013.10.020 (2013).
10 Sahin, M. & Sur, M. Genes, circuits, and precision therapies for autism and related neurodevelopmental disorders. *Science* 350, doi: 10.1126/science.aab3897 (2015).
11 Parikshak, N. N. et al. Integrative functional genomic analyses implicate specific molecular pathways and circuits in autism. *Cell* 155, 1008-1021, doi: 10.1016/j.cell.2013.10.031 (2013).
12 Krumm, N. et al. Excess of rare, inherited truncating mutations in autism. *Nat Genet* 47, 582-588, doi: 10.1038/ng.3303 (2015).
13 Iossifov, I. et al. The contribution of de novo coding mutations to autism spectrum disorder. *Nature* 515, 216-221, doi: 10.1038/nature 13908 (2014).
14 Kosmicki, J. A. et al. Refining the role of de novo protein-truncating variants in neurodevelopmental disorders by using population reference samples. *Nat Genet* 49, 504-510, doi: 10.1038/ng.3789 (2017).
15 Sanders, S. J. et al. Insights into Autism Spectrum Disorder Genomic Architecture and Biology from 71 Risk Loci. *Neuron* 87, 1215-1233, doi: 10.1016/j.neuron.2015.09.016 (2015).
16 Pierce, K. et al. Evaluation of the Diagnostic Stability of the Early Autism Spectrum Disorder Phenotype in the General Population Starting at 12 Months. *JAMA Pediatr*, doi: 10.1001/jamapediatrics.2019.0624 (2019).
17 Wright, F. A. et al. Heritability and genomics of gene expression in peripheral blood. *Nat Genet* 46, 430-437, doi: 10.1038/ng.2951 (2014).
18 Pramparo, T. et al. Cell cycle networks link gene expression dysregulation, mutation, and brain maldevelopment in autistic toddlers. *Mol Syst Biol* 11, 841, doi: 10.15252/msb.20156108 (2015).
19 Pramparo, T. et al. Prediction of autism by translation and immune/inflammation coexpressed genes in toddlers from pediatric community practices. *JAMA Psychiatry* 72, 386-394, doi: 10.1001/jamapsychiatry.2014.3008 (2015).
20 Lombardo, M. V. et al. Large-scale associations between the leukocyte transcriptome and BOLD responses to speech differ in autism early language outcome subtypes. *Nat Neurosci* 21, 1680-1688, doi: 10.1038/s41593-018-0281-3 (2018).
21 Boyle, E. A., Li, Y. I. & Pritchard, J. K. An Expanded View of Complex Traits: From Polygenic to Omnigenic. *Cell* 169, 1177-1186, doi: 10.1016/j.cell.2017.05.038 (2017).
22 Nishimura, Y. et al. Genome-wide expression profiling of lymphoblastoid cell lines distinguishes different forms of autism and reveals shared pathways. *Hum Mol Genet* 16, 1682-1698, doi: 10.1093/hmg/ddm116 (2007).
23 Achuta, V. S. et al. Functional changes of AMPA responses in human induced pluripotent stem cell-derived neural progenitors in fragile X syndrome. *Sci Signal* 11, doi: 10.1126/scisignal.aan8784 (2018).
24 Hu, V. W. et al. Gene expression profiling of lymphoblasts from autistic and nonaffected sib pairs: altered pathways in neuronal development and steroid biosynthesis. *PLoS One* 4, e5775, doi: 10.1371/journal.pone.0005775 (2009).
25 Hu, V. W., Frank, B. C., Heine, S., Lee, N. H. & Quackenbush, J. Gene expression profiling of lymphoblastoid cell lines from monozygotic twins discordant in severity of autism reveals differential regulation of neurologically relevant genes. *BMC Genomics* 7, 118, doi: 10.1186/1471-2164-7-118 (2006).
26 Kong, S. W. et al. Characteristics and predictive value of blood transcriptome signature in males with autism spectrum disorders. *PLoS One* 7, e49475, doi: 10.1371/journal.pone.0049475 (2012).
27 Diaz-Beltran, L. et al. Cross-disorder comparative analysis of comorbid conditions reveals novel autism candidate genes. *BMC Genomics* 18, 315, doi: 10.1186/s12864-017-3667-9 (2017).
28 Marchetto, M. C. et al. Altered proliferation and networks in neural cells derived from idiopathic autistic individuals. *Mol Psychiatry*, doi: 10.1038/mp.2016.95 (2016).

29 Mariani, J. et al. FOXG1-Dependent Dysregulation of GABA/Glutamate Neuron Differentiation in Autism Spectrum Disorders. *Cell* 162, 375-390, doi: 10.1016/j.cell.2015.06.034 (2015).

30 Califano, A. & Alvarez, M. J. The recurrent architecture of tumour initiation, progression and drug sensitivity. *Nat Rev Cancer* 17, 116-130, doi: 10.1038/nrc.2016.124 (2017).

31 Ideker, T. & Krogan, N. J. Differential network biology. *Mol Syst Biol* 8, 565, doi: 10.1038/msb.2011.99 (2012).

32 Yang, B. et al. Dynamic network biomarker indicates pulmonary metastasis at the tipping point of hepatocellular carcinoma. *Nat Commun* 9, 678, doi: 10.1038/s41467-018-03024-2 (2018).

33 Chen, L., Liu, R., Liu, Z. P., Li, M. & Aihara, K. Detecting early-warning signals for sudden deterioration of complex diseases by dynamical network biomarkers. *Sci Rep* 2, 342, doi: 10.1038/srep00342 (2012).

34 BrainSpan. BrainSpan: Atlas of the Developing Human Brain. (2016).

35 Kang, H. J. et al. Spatio-temporal transcriptome of the human brain. *Nature* 478, 483-489, doi: 10.1038/nature10523 (2011).

36 Sugathan, A. et al. CHD8 regulates neurodevelopmental pathways associated with autism spectrum disorder in neural progenitors. *Proc Natl Acad Sci USA* 111, E4468-4477, doi: 10.1073/pnas. 1405266111 (2014).

37 Cotney, J. et al. The autism-associated chromatin modifier CHD8 regulates other autism risk genes during human neurodevelopment. *Nat Commun* 6, 6404, doi: 10.1038/ncomms7404 (2015).

38 Gompers, A. L. et al. Germline Chd8 haploinsufficiency alters brain development in mouse. *Nat Neurosci* 20, 1062-1073, doi: 10.1038/nn.4592 (2017).

39 Darnell, J. C. et al. FMRP stalls ribosomal translocation on mRNAs linked to synaptic function and autism. *Cell* 146, 247-261, doi: 10.1016/j.cell.2011.06.013 (2011).

40 Consortium, E. P. An integrated encyclopedia of DNA elements in the human genome. *Nature* 489, 57-74, doi: 10.1038/nature11247 (2012).

41 Lachmann, A. et al. ChEA: transcription factor regulation inferred from integrating genome-wide ChIP-X experiments. *Bioinformatics* 26, 2438-2444, doi: 10.1093/bioinformatics/btq466 (2010).

42 Abrahams, B. S. et al. SFARI Gene 2.0: a community-driven knowledgebase for the autism spectrum disorders (ASDs). *Mol Autism* 4, 36, doi: 10.1186/2040-2392-4-36 (2013).

43 Stein, J. L. et al. A quantitative framework to evaluate modeling of cortical development by neural stem cells. *Neuron* 83, 69-86, doi: 10.1016/j.neuron.2014.05.035 (2014).

44 Mellios, N. et al. MeCP2-regulated miRNAs control early human neurogenesis through differential effects on ERK and AKT signaling. *Mol Psychiatry*, doi: 10.1038/mp.2017.86 (2017).

45 Clipperton-Allen, A. E. & Page, D. T. Pten haploinsufficient mice show broad brain overgrowth but selective impairments in autism-relevant behavioral tests. *Hum Mol Genet* 23, 3490-3505, doi: 10.1093/hmg/ddu057 (2014).

46 Cupolillo, D. et al. Autistic-Like Traits and Cerebellar Dysfunction in Purkinje Cell PTEN Knock-Out Mice. *Neuropsychopharmacology* 41, 1457-1466, doi: 10.1038/npp.2015.339 (2016).

47 Brockmann, M. et al. Genetic wiring maps of single-cell protein states reveal an off-switch for GPCR signalling. *Nature* 546, 307-311, doi: 10.1038/nature22376 (2017).

48 Schafer, S. T. et al. Pathological priming causes developmental gene network heterochronicity in autistic subject-derived neurons. *Nat Neurosci* 22, 243-255, doi: 10.1038/s41593-018-0295-x (2019).

49 Robinson, E. B. et al. Genetic risk for autism spectrum disorders and neuropsychiatric variation in the general population. *Nat Genet* 48, 552-555, doi: 10.1038/ng.3529 (2016).

50 Wang, Y. et al. Heritable aspects of biological motion perception and its covariation with autistic traits. *Proc Natl Acad Sci USA* 115, 1937-1942, doi: 10.1073/pnas. 1714655115 (2018).

51 Betancur, C. Etiological heterogeneity in autism spectrum disorders: more than 100 genetic and genomic disorders and still counting. *Brain Res* 1380, 42-77, doi: 10.1016/j.brainres.2010.11.078 (2011).

52 Pierce, K. et al. Detecting, studying, and treating autism early: the one-year well-baby check-up approach. *J Pediatr* 159, 458-465 e451-456, doi: 10.1016/j.jpeds.2011.02.036 (2011).

53 Wetherby, A. M., Allen, L., Cleary, J., Kublin, K. & Goldstein, H. Validity and reliability of the communication and symbolic behavior scales developmental profile with very young children. *J Speech Lang Hear Res* 45, 1202-1218, doi: 10.1044/1092-4388 (2002/097) (2002).

54 Du, P., Kibbe, W. A. & Lin, S. M. lumi: a pipeline for processing Illumina microarray. *Bioinformatics* 24, 1547-1548, doi: 10.1093/bioinformatics/btn224 (2008).

55 Consortium, G. T. Human genomics. The Genotype-Tissue Expression (GTEx) pilot analysis: multitissue gene regulation in humans. *Science* 348, 648-660, doi: 10.1126/science.1262110 (2015).

56 Ritchie, M. E. et al. limma powers differential expression analyses for RNA-sequencing and microarray studies. *Nucleic Acids Res* 43, e47, doi: 10.1093/nar/gkv007 (2015).

57 Phipson, B., Lee, S., Majewski, I. J., Alexander, W. S. & Smyth, G. K. Robust Hyperparameter Estimation Protects against Hypervariable Genes and Improves Power to Detect Differential Expression. *Ann Appl Stat* 10, 946-963, doi: 10.1214/16-AOAS920 (2016).

58 Andrews, S. FastQC: a quality control tool for high throughput sequence data. (2010).

59 Bolger, A. M., Lohse, M. & Usadel, B. Trimmomatic: a flexible trimmer for Illumina sequence data. *Bioinformatics* 30, 2114-2120, doi: 10.1093/bioinformatics/btu170 (2014).

60 Dobin, A. et al. STAR: ultrafast universal RNA-seq aligner. *Bioinformatics* 29, 15-21, doi: 10.1093/bioinformatics/bts635 (2013).

61 Li, H. et al. The Sequence Alignment/Map format and SAMtools. *Bioinformatics* 25, 2078-2079, doi: 10.1093/bioinformatics/btp352 (2009).

62 Anders, S., Pyl, P. T. & Huber, W. HTSeq-a Python framework to work with high-throughput sequencing data. *Bioinformatics* 31, 166-169, doi: 10.1093/bioinformatics/btu638 (2015).

63 Leek, J. T. & Storey, J. D. Capturing heterogeneity in gene expression studies by surrogate variable analysis. *PLoS Genet* 3, 1724-1735, doi: 10.1371/journal.pgen.0030161 (2007).

64 Huang da, W., Sherman, B. T. & Lempicki, R. A. Systematic and integrative analysis of large gene lists using DAVID bioinformatics resources. *Nat Protoc* 4, 44-57, doi: 10.1038/nprot.2008.211 (2009).

65 Faith, J. J. et al. Large-scale mapping and validation of *Escherichia coli* transcriptional regulation from a com- 66. Cerami, E. G. et al. Pathway Commons, a web resource for biological pathway data. *Nucleic Acids Res* 39, D685-690, doi: 10.1093/nar/gkq 1039 (2011).
67. Fabregat, A. et al. The Reactome pathway Knowledgebase. *Nucleic Acids Res* 44, D481-487, doi: 10.1093/nar/gkv1351 (2016).
68. Chatr-Aryamontri, A. et al. The BioGRID interaction database: 2017 update. *Nucleic Acids Res* 45, D369-D379, doi: 10.1093/nar/gkw1102 (2017).
69. Warde-Farley, D. et al. The GeneMANIA prediction server: biological network integration for gene prioritization and predicting gene function. *Nucleic Acids Res* 38, W214-220, doi: 10.1093/nar/gkq537 (2010).
70. Liberzon, A. et al. The Molecular Signatures Database (MSigDB) hallmark gene set collection. *Cell Syst* 1, 417-425, doi: 10.1016/j.cels.2015.12.004 (2015).
71. Subramanian, A. et al. Gene set enrichment analysis: a knowledge-based approach for interpreting genome-wide expression profiles. *Proc Natl Acad Sci USA* 102, 15545-15550, doi: 10.1073/pnas.0506580102 (2005).
72. Schroder, M. S., Gusenleitner, D., Quackenbush, J., Culhane, A. C. & Haibe-Kains, B. RamiGO: an R/Bioconductor package providing an AmiGO visualize interface. *Bioinformatics* 29, 666-668, doi: 10.1093/bioinformatics/bts708 (2013).
73. Kuleshov, M. V. et al. Enrichr: a comprehensive gene set enrichment analysis web server 2016 update. *Nucleic Acids Res* 44, W90-97, doi: 10.1093/nar/gkw377 (2016).
74. Johnson, W. E., Li, C. & Rabinovic, A. Adjusting batch effects in microarray expression data using empirical Bayes methods. *Biostatistics* 8, 118-127, doi: 10.1093/biostatistics/kxj037 (2007).
75. Robinson, M. D. & Oshlack, A. A scaling normalization method for differential expression analysis of RNA-seq data. *Genome Biol* 11, R25, doi: 10.1186/gb-2010-11-3-r25 (2010).
76. Newman, A. M. et al. Robust enumeration of cell subsets from tissue expression profiles. *Nat Methods* 12, 453-457, doi: 10.1038/nmeth.3337 (2015).

SUPPLEMENTAL REFERENCES

1. Pramparo, T. et al. Cell cycle networks link gene expression dysregulation, mutation, and brain maldevelopment in autistic toddlers. *Mol Syst Biol* 11, 841 (2015).
2. Zhao, S., Fung-Leung, W. P., Bittner, A., Ngo, K. & Liu, X. Comparison of RNA-Seq and microarray in transcriptome profiling of activated T cells. *PLoS One* 9, e78644 (2014).
3. Newman, A. M. et al. Robust enumeration of cell subsets from tissue expression profiles. *Nat Methods* 12, 453-7 (2015).
4. McGregor, K. et al. An evaluation of methods correcting for cell-type heterogeneity in DNA methylation studies. *Genome Biol* 17, 84 (2016).
5. Leek, J. T. & Storey, J. D. Capturing heterogeneity in gene expression studies by surrogate variable analysis. *PLoS Genet* 3, 1724-35 (2007).
6. Leek, J. T., Johnson, W. E., Parker, H. S., Jaffe, A. E. & Storey, J. D. The sva package for removing batch effects and other unwanted variation in high-throughput experiments. *Bioinformatics* 28, 882-3 (2012).
7. He, X. et al. Integrated model of de novo and inherited genetic variants yields greater power to identify risk genes. *PLoS Genet* 9, e1003671 (2013).
8. Marchetto, M. C. et al. Altered proliferation and networks in neural cells derived from idiopathic autistic individuals. *Mol Psychiatry* 22, 820-835 (2017).
9. Zhang, J. et al. PTEN maintains haematopoietic stem cells and acts in lineage choice and leukaemia prevention. *Nature* 441, 518-22 (2006).
10. Juntilla, M. M. et al. AKT1 and AKT2 maintain hematopoietic stem cell function by regulating reactive oxygen species. *Blood* 115, 4030-8 (2010).
11. Igarashi, J., Bernier, S. G. & Michel, T. Sphingosine 1-phosphate and activation of endothelial nitric-oxide synthase. differential regulation of Akt and MAP kinase pathways by EDG and bradykinin receptors in vascular endothelial cells. *J Biol Chem* 276, 12420-6 (2001).
12. Olivera, A. & Spiegel, S. Sphingosine-1-phosphate as second messenger in cell proliferation induced by PDGF and FCS mitogens. *Nature* 365, 557-60 (1993).
13. Le Cam, L. et al. E4F1 is an atypical ubiquitin ligase that modulates p53 effector functions independently of degradation. *Cell* 127, 775-88 (2006).
14. Courchesne, E. et al. The ASD Living Biology: from cell proliferation to clinical phenotype. *Mol Psychiatry* (2018).
15. Hur, E. M. & Zhou, F. Q. GSK3 signalling in neural development. *Nat Rev Neurosci* 11, 539-51 (2010).
16. Matys, V. et al. TRANSFAC and its module TRANSCompel: transcriptional gene regulation in eukaryotes. *Nucleic Acids Res* 34, D108-10 (2006).
17. Ouyang, W. et al. Novel Foxo1-dependent transcriptional programs control T (reg) cell function. *Nature* 491, 554-9 (2012).
18. Liberzon, A. et al. The Molecular Signatures Database (MSigDB) hallmark gene set collection. *Cell Syst* 1, 417-425 (2015).
19. Brockmann, M. et al. Genetic wiring maps of single-cell protein states reveal an off-switch for GPCR signalling. *Nature* 546, 307-311 (2017).

TABLE 1

| Entrez.ID | HGNC.symbol (entrezID if NA) | log.FC | Ave.. Expression | t.score | P.value | adj.P.value | Protein. coding |
|---|---|---|---|---|---|---|---|
| 10643 | IGF2BP3 | −0.283485646 | 7.412368937 | −6.707544524 | 1.56E−10 | 3.45E−06 | Yes |
| 23523 | CABIN1 | 0.192918802 | 7.714660422 | 6.400344088 | 8.79E−10 | 9.71E−06 | Yes |
| 26505 | CNNM3 | 0.168164237 | 7.757377842 | 6.230512256 | 2.24E−09 | 1.24E−05 | Yes |
| 58190 | CTDSP1 | 0.131695108 | 9.702633362 | 6.078199508 | 5.10E−09 | 2.25E−05 | Yes |
| 1455 | CSNK1G2 | 0.115855235 | 10.87844514 | 6.007094291 | 7.45E−09 | 2.35E−05 | Yes |
| 83931 | STK40 | 0.240146856 | 10.22932607 | 5.945029414 | 1.04E−08 | 2.86E−05 | Yes |
| 112495 | GTF3C6 | −0.181295023 | 8.158285714 | −5.882015045 | 1.44E−08 | 3.13E−05 | Yes |
| 23099 | ZBTB43 | 0.156163896 | 6.982552391 | 5.881276758 | 1.45E−08 | 3.13E−05 | Yes |
| 23492 | CBX7 | 0.204443799 | 8.407858282 | 5.867246501 | 1.56E−08 | 3.13E−05 | Yes |
| 53635 | PTOV1 | 0.169596059 | 8.922587584 | 5.787351778 | 2.36E−08 | 4.15E−05 | Yes |
| 7528 | YY1 | 0.175330382 | 10.2915839 | 5.775904359 | 2.51E−08 | 4.15E−05 | Yes |

TABLE 1-continued

| Entrez.ID | HGNC.symbol (entrezID if NA) | log.FC | Ave. Expression | t.score | P.value | adj.P.value | Protein. coding |
|---|---|---|---|---|---|---|---|
| 4782 | NFIC | 0.15703749 | 6.653199929 | 5.766451242 | 2.63E-08 | 4.15E-05 | Yes |
| 84440 | RAB11FIP4 | 0.168867022 | 6.602686648 | 5.749252688 | 2.88E-08 | 4.24E-05 | Yes |
| 389286 | 389286 | -0.234349502 | 7.117974225 | -5.693013875 | 3.85E-08 | 5.21E-05 | No |
| 23031 | MAST3 | 0.217638916 | 8.74356398 | 5.684939829 | 4.01E-08 | 5.21E-05 | Yes |
| 7707 | ZNF148 | 0.228777486 | 9.202528617 | 5.662346668 | 4.50E-08 | 5.52E-05 | Yes |
| 400652 | 400652 | -0.278038556 | 7.385872931 | -5.53690309 | 8.49E-08 | 8.98E-05 | No |
| 653324 | 653324 | -0.17061969 | 6.72081181 | -5.535729688 | 8.53E-08 | 8.98E-05 | No |
| 641455 | POTEM | -0.231784937 | 8.197503181 | -5.507520166 | 9.84E-08 | 9.88E-05 | Yes |
| 63940 | GPSM3 | 0.137461713 | 10.86707881 | 5.485392515 | 1.10E-07 | 0.000101116 | Yes |
| 646949 | 646949 | -0.309200465 | 8.062082232 | -5.485559455 | 1.10E-07 | 0.000101116 | No |
| 389015 | SLC9A4 | -0.18297064 | 6.558736012 | -5.454132097 | 1.28E-07 | 0.000108461 | Yes |
| 54819 | ZCCHC10 | -0.136918971 | 6.446932668 | -5.452805907 | 1.29E-07 | 0.000108461 | Yes |
| 100132510 | 100132510 | -0.21278063 | 7.690324675 | -5.447833576 | 1.33E-07 | 0.000108461 | No |
| 648740 | 648740 | -0.228334909 | 7.177696597 | -5.379426569 | 1.86E-07 | 0.000146699 | No |
| 10277 | UBE4B | 0.118553976 | 7.778591006 | 5.319676504 | 2.49E-07 | 0.00017746 | Yes |
| 147807 | ZNF524 | 0.124691091 | 7.832694026 | 5.2306965 | 3.84E-07 | 0.000242127 | Yes |
| 64174 | DPEP2 | 0.233348494 | 9.718637145 | 5.220632261 | 4.03E-07 | 0.000247317 | Yes |
| 7805 | LAPTM5 | 0.155319694 | 10.92527271 | 5.198312032 | 4.48E-07 | 0.000256546 | Yes |
| 124599 | CD300LB | 0.174386315 | 6.667133429 | 5.196296231 | 4.53E-07 | 0.000256546 | Yes |
| 10126 | DNALA | 0.097902764 | 7.957877274 | 5.182491598 | 4.84E-07 | 0.00026715 | Yes |
| 115992 | RNF166 | 0.13250132 | 7.26424087 | 5.127627447 | 6.29E-07 | 0.000321266 | Yes |
| 100127922 | 100127922 | -0.205711633 | 7.710135074 | -5.106553587 | 6.95E-07 | 0.000327511 | No |
| 10134 | BCAP31 | 0.115882062 | 9.529247294 | 5.105950308 | 6.97E-07 | 0.000327511 | Yes |
| 3654 | IRAK1 | 0.130556739 | 8.804710713 | 5.100178975 | 7.16E-07 | 0.000329583 | Yes |
| 2026 | ENO2 | 0.141679188 | 6.391033291 | 5.080169588 | 7.87E-07 | 0.000354919 | Yes |
| 94120 | SYTL3 | 0.153057355 | 7.506657921 | 5.074502797 | 8.08E-07 | 0.000357256 | Yes |
| 343990 | KIAA1211L | 0.201771803 | 6.725016339 | 5.057405897 | 8.77E-07 | 0.000376962 | Yes |
| 127262 | TPRG1L | 0.154554012 | 9.132683608 | 5.052464154 | 8.97E-07 | 0.000376962 | Yes |
| 79934 | COQ8B | 0.137110939 | 6.866724937 | 5.050747951 | 9.04E-07 | 0.000376962 | Yes |
| 23130 | ATG2A | 0.181535801 | 7.529724505 | 5.009299885 | 1.10E-06 | 0.000440257 | Yes |
| 9986 | RCE1 | 0.087711556 | 7.270624071 | 5.002123015 | 1.14E-06 | 0.000440257 | Yes |
| 23558 | WBP2 | 0.152946377 | 11.75509271 | 4.977872631 | 1.27E-06 | 0.000470609 | Yes |
| 4698 | NDUFA5 | -0.161317661 | 6.866055193 | -4.976855919 | 1.28E-06 | 0.000470609 | Yes |
| 2771 | GNAI2 | 0.126216033 | 10.99404874 | 4.930494871 | 1.58E-06 | 0.000553206 | Yes |
| 5684 | PSMA3 | -0.164591872 | 9.509681694 | -4.928112934 | 1.60E-06 | 0.000553206 | Yes |
| 100133803 | 100133803 | -0.187254014 | 7.882831065 | -4.920238026 | 1.66E-06 | 0.000558176 | No |
| 3300 | DNAJB2 | 0.12920204 | 8.751357971 | 4.919441634 | 1.67E-06 | 0.000558176 | Yes |
| 2664 | GDI1 | 0.140591856 | 8.295121051 | 4.878630326 | 2.01E-06 | 0.000618892 | Yes |
| 326624 | RAB37 | 0.1638867 | 9.006023152 | 4.869044852 | 2.10E-06 | 0.000626678 | Yes |
| 3755 | KCNG1 | 0.182224736 | 6.546194633 | 4.866588146 | 2.13E-06 | 0.000626678 | Yes |
| 84557 | MAPILC3A | 0.259229175 | 8.423797074 | 4.85580202 | 2.23E-06 | 0.000639365 | Yes |
| 9619 | ABCG1 | 0.19838206 | 7.835241562 | 4.853184455 | 2.26E-06 | 0.000639365 | Yes |
| 23396 | PIP5K1C | 0.140342979 | 7.065309904 | 4.847943986 | 2.31E-06 | 0.000639365 | Yes |
| 5589 | PRKCSH | 0.099219863 | 8.29299671 | 4.819951995 | 2.63E-06 | 0.000683593 | Yes |
| 58476 | TP53INP2 | 0.180510331 | 6.633894023 | 4.806878189 | 2.79E-06 | 0.000717417 | Yes |
| 22933 | SIRT2 | 0.09509358 | 7.187195623 | 4.793070003 | 2.97E-06 | 0.000745918 | Yes |
| 6404 | SELPLG | 0.222304993 | 7.462391154 | 4.787943718 | 3.04E-06 | 0.000755309 | Yes |
| 23399 | CTDNEP1 | 0.125507272 | 7.608771028 | 4.750399772 | 3.60E-06 | 0.000864955 | Yes |
| 83696 | TRAPPC9 | 0.11324514 | 6.710648659 | 4.741390718 | 3.75E-06 | 0.000891003 | Yes |
| 5986 | RFNG | 0.112466186 | 8.14723204 | 4.734095144 | 3.88E-06 | 0.000910863 | Yes |
| 10004 | NAALADL1 | 0.103580529 | 6.990894601 | 4.692929988 | 4.66E-06 | 0.001072093 | Yes |
| 4650 | MYO9B | 0.150430251 | 8.515992445 | 4.683110416 | 4.87E-06 | 0.001091727 | Yes |
| 124460 | SNX20 | -0.157790113 | 7.007017034 | -4.667632064 | 5.21E-06 | 0.001143939 | Yes |
| 57414 | RHBDD2 | 0.142458938 | 8.447173936 | 4.661244372 | 5.36E-06 | 0.001161624 | Yes |
| 642741 | 642741 | 0.161155923 | 12.5201831 | 4.65861967 | 5.43E-06 | 0.001164237 | No |
| 402221 | 402221 | -0.238815312 | 9.709347526 | -4.653789303 | 5.55E-06 | 0.001178199 | No |
| 3613 | IMPA2 | 0.239646614 | 8.67748782 | 4.631783632 | 6.11E-06 | 0.001238981 | Yes |
| 11284 | PNKP | 0.107249303 | 8.035520679 | 4.616533473 | 6.53E-06 | 0.001312346 | Yes |
| 84271 | POLDIP3 | 0.093096587 | 8.59472203 | 4.607584476 | 6.80E-06 | 0.001352731 | Yes |
| 207 | AKT1 | 0.122656992 | 9.700005542 | 4.589579867 | 7.35E-06 | 0.00143804 | Yes |
| 11322 | TMC6 | 0.15719223 | 8.707220075 | 4.556356642 | 8.51E-06 | 0.001576166 | Yes |
| 5330 | PLCB2 | 0.167096593 | 8.961287218 | 4.55495189 | 8.56E-06 | 0.001576166 | Yes |
| 5586 | PKN2 | 0.179566403 | 7.735377296 | 4.543367922 | 9.00E-06 | 0.001611932 | Yes |
| 25796 | PGLS | 0.11660716 | 8.891918267 | 4.542146525 | 9.05E-06 | 0.001611932 | Yes |
| 6601 | SMARCC2 | 0.137702216 | 8.019113268 | 4.537535449 | 9.23E-06 | 0.001620242 | Yes |
| 7518 | XRCC4 | -0.107901986 | 6.403483851 | -4.528034719 | 9.62E-06 | 0.001647381 | Yes |
| 125950 | RAVER1 | 0.116667977 | 7.134785327 | 4.523340676 | 9.82E-06 | 0.001655586 | Yes |
| 1725 | DHPS | 0.096453164 | 9.195526391 | 4.505422908 | 1.06E-05 | 0.001736067 | Yes |
| 23097 | CDK19 | 0.155558751 | 8.656985342 | 4.496265207 | 1.10E-05 | 0.001780661 | Yes |
| 100129067 | 100129067 | -0.186713952 | 7.164656316 | -4.489667939 | 1.14E-05 | 0.001805619 | No |
| 161882 | ZFPM1 | 0.105994292 | 7.347208763 | 4.481642008 | 1.18E-05 | 0.001835184 | Yes |
| 8904 | CPNE1 | 0.154811501 | 8.49309154 | 4.479268883 | 1.19E-05 | 0.001835184 | Yes |
| 6256 | RXRA | 0.20230831 | 9.743597854 | 4.470658666 | 1.23E-05 | 0.001891467 | Yes |
| 25909 | AHCTF1 | 0.139180105 | 8.00303527 | 4.459267807 | 1.29E-05 | 0.001971596 | Yes |
| 53615 | MBD3 | 0.123255655 | 6.744243501 | 4.447237637 | 1.36E-05 | 0.002061632 | Yes |
| 51706 | CYB5R1 | 0.111815817 | 8.043051034 | 4.433800752 | 1.44E-05 | 0.00216393 | Yes |
| 100128689 | 100128689 | -0.160647518 | 7.89904555 | -4.425650538 | 1.49E-05 | 0.002198828 | No |

TABLE 1-continued

| Entrez.ID | HGNC.symbol (entrezID if NA) | log.FC | Ave.. Expression | t.score | P.value | adj.P.value | Protein. coding |
|---|---|---|---|---|---|---|---|
| 731096 | 731096 | 0.165104513 | 12.43982134 | 4.422921334 | 1.51E−05 | 0.002198828 | No |
| 100130932 | 100130932 | −0.15218825 | 8.37499611 | −4.414539424 | 1.57E−05 | 0.002203269 | No |
| 649801 | 649801 | −0.163546538 | 7.617130756 | −4.407845496 | 1.61E−05 | 0.002240389 | No |
| 81788 | NUAK2 | 0.160771933 | 8.128898043 | 4.396351773 | 1.69E−05 | 0.002300274 | Yes |
| 9638 | FEZ1 | 0.158033984 | 6.218568846 | 4.385000611 | 1.78E−05 | 0.002356947 | Yes |
| 654121 | 654121 | −0.150912037 | 9.223350463 | −4.378626398 | 1.82E−05 | 0.002371373 | No |
| 147804 | TPM3P9 | −0.16076694 | 8.320856214 | −4.367885361 | 1.91E−05 | 0.002438775 | No |
| 23162 | MAPK8IP3 | 0.18107745 | 8.098739813 | 4.3636466 | 1.94E−05 | 0.002446566 | Yes |
| 55343 | SLC35C1 | 0.096719349 | 7.291756548 | 4.348946633 | 2.07E−05 | 0.002510922 | Yes |
| 100130332 | 100130332 | −0.195720693 | 6.772070957 | −4.348019036 | 2.08E−05 | 0.002510922 | No |
| 401505 | TOMM5 | −0.14911938 | 8.787718391 | −4.329066521 | 2.25E−05 | 0.002651201 | Yes |
| 26523 | AGO1 | 0.079887384 | 7.031870647 | 4.323237717 | 2.30E−05 | 0.002677937 | Yes |
| 81532 | MOB2 | 0.095648443 | 7.380536072 | 4.300466583 | 2.53E−05 | 0.002890542 | Yes |
| 79176 | FBXL15 | 0.093109864 | 7.247221457 | 4.281623708 | 2.74E−05 | 0.003041668 | Yes |
| 10422 | UBACI | 0.085798422 | 8.883679357 | 4.275774786 | 2.81E−05 | 0.00307684 | Yes |
| 162466 | PHOSPHO1 | 0.174807999 | 6.705712899 | 4.272860557 | 2.84E−05 | 0.00307684 | Yes |
| 730746 | 730746 | −0.166436482 | 7.505593268 | −4.273087985 | 2.84E−05 | 0.00307684 | No |
| 729687 | 729687 | −0.185934406 | 7.70032681 | −4.271802168 | 2.85E−05 | 0.00307684 | No |
| 84919 | PPP1R15B | −0.142591255 | 7.087764629 | −4.264488295 | 2.94E−05 | 0.003140301 | Yes |
| 3959 | LGALS3BP | −0.217100548 | 6.679256708 | −4.262661135 | 2.97E−05 | 0.003149601 | Yes |
| 55967 | NDUFA12 | −0.166935498 | 10.0391536 | −4.253121611 | 3.08E−05 | 0.003224804 | Yes |
| 644380 | 644380 | −0.195567772 | 7.567907062 | −4.232611355 | 3.36E−05 | 0.003423314 | No |
| 284 | ANGPT1 | 0.140263471 | 6.477822961 | 4.230256193 | 3.39E−05 | 0.003423314 | Yes |
| 3939 | LDHA | −0.149121463 | 11.23850585 | −4.228871115 | 3.41E−05 | 0.003423314 | Yes |
| 3059 | HCLS1 | 0.138580341 | 11.48554164 | 4.227738571 | 3.42E−05 | 0.003423314 | Yes |
| 54973 | INTS11 | 0.082102251 | 7.084124742 | 4.226152241 | 3.45E−05 | 0.003429788 | Yes |
| 79842 | ZBTB3 | 0.101071018 | 6.655192552 | 4.219454179 | 3.54E−05 | 0.003478593 | Yes |
| 2782 | GNB1 | 0.082950771 | 10.80263094 | 4.194414385 | 3.93E−05 | 0.00377105 | Yes |
| 100129243 | 100129243 | −0.187216003 | 7.443927245 | −4.190280676 | 3.99E−05 | 0.003803744 | No |
| 84936 | ZFYVE19 | 0.095636115 | 7.459690852 | 4.184339948 | 4.09E−05 | 0.003862449 | Yes |
| 692084 | SNORD13 | 0.249066566 | 8.796868372 | 4.179960812 | 4.17E−05 | 0.00390028 | No |
| 5590 | PRKCZ | 0.113671792 | 7.130532117 | 4.166508539 | 4.40E−05 | 0.004018479 | Yes |
| 8623 | ASMTL | 0.098836032 | 7.498081288 | 4.159035852 | 4.53E−05 | 0.004073134 | Yes |
| 389322 | 389322 | −0.191489142 | 9.325748509 | −4.150061223 | 4.71E−05 | 0.004167677 | No |
| 100132199 | 100132199 | −0.195130691 | 8.584503609 | −4.149507115 | 4.72E−05 | 0.004167677 | No |
| 27101 | CACYBP | −0.164362078 | 7.939255749 | −4.1448546 | 4.81E−05 | 0.004230161 | Yes |
| 652113 | 652113 | −0.270859003 | 6.802997062 | −4.138344028 | 4.93E−05 | 0.004291955 | No |
| 23163 | GGA3 | 0.075318631 | 7.257131002 | 4.129065883 | 5.12E−05 | 0.004402549 | Yes |
| 644877 | 644877 | −0.173076475 | 8.217828928 | −4.123468563 | 5.24E−05 | 0.004453809 | No |
| 22924 | MAPRE3 | 0.10409649 | 6.189454079 | 4.115545822 | 5.41E−05 | 0.004522292 | Yes |
| 387522 | TMEM189-UBE2V1 | −0.16129197 | 8.698112596 | −4.110152656 | 5.53E−05 | 0.004585425 | Yes |
| 100132417 | 100132417 | −0.350138591 | 7.249974964 | −4.101808354 | 5.72E−05 | 0.004684975 | No |
| 57187 | THOC2 | 0.184533662 | 8.477219448 | 4.099711241 | 5.77E−05 | 0.004684975 | Yes |
| 26030 | PLEKHG3 | 0.215318036 | 8.405873714 | 4.094202522 | 5.90E−05 | 0.004771419 | Yes |
| 81490 | PTDSS2 | 0.086280135 | 6.668690568 | 4.079044946 | 6.26E−05 | 0.004997856 | Yes |
| 643997 | 643997 | −0.191651233 | 9.007981226 | −4.073536743 | 6.40E−05 | 0.005090329 | No |
| 83719 | YPEL3 | 0.163635464 | 10.5149995 | 4.058784474 | 6.79E−05 | 0.005322803 | Yes |
| 54552 | GNL3L | 0.189681665 | 8.112021404 | 4.051740176 | 6.99E−05 | 0.005455085 | Yes |
| 8736 | MYOM1 | 0.100793982 | 6.702248374 | 4.046096169 | 7.14E−05 | 0.005518717 | Yes |
| 10438 | C1D | −0.145376239 | 6.909027413 | −4.044156228 | 7.20E−05 | 0.005539005 | Yes |
| 10444 | ZER1 | 0.09976927 | 6.424712351 | 4.041753059 | 7.27E−05 | 0.005556631 | Yes |
| 642076 | 642076 | −0.171362455 | 8.308962061 | −4.028935344 | 7.65E−05 | 0.005705646 | No |
| 1979 | EIF4EBP2 | 0.086429448 | 8.276640027 | 4.025626956 | 7.75E−05 | 0.005705646 | Yes |
| 2275 | FHL3 | 0.189208414 | 7.660601883 | 4.025044281 | 7.77E−05 | 0.005705646 | Yes |
| 29888 | STRN4 | 0.108079775 | 7.024472205 | 4.003509886 | 8.46E−05 | 0.006057026 | Yes |
| 8664 | EIF3D | 0.14815401 | 9.925297795 | 3.995769316 | 8.72E−05 | 0.006176976 | Yes |
| 654074 | 654074 | −0.156852334 | 7.648309642 | −3.993736209 | 8.79E−05 | 0.00620678 | No |
| 156 | GRK2 | 0.085715694 | 11.04047762 | 3.99243301 | 8.84E−05 | 0.006216877 | Yes |
| 89941 | RHOT2 | 0.118643066 | 7.760234907 | 3.975404263 | 9.45E−05 | 0.006502595 | Yes |
| 5863 | RGL2 | 0.148317168 | 7.642545596 | 3.974098904 | 9.50E−05 | 0.006517758 | Yes |
| 84148 | KAT8 | 0.10481313 | 7.787716784 | 3.963812465 | 9.89E−05 | 0.006700715 | Yes |
| 396 | ARHGDIA | 0.142157964 | 9.285993952 | 3.962271973 | 9.95E−05 | 0.006722479 | Yes |
| 441168 | CALHM6 | −0.263348391 | 8.999878681 | −3.960029496 | 0.000100372 | 0.006761366 | Yes |
| 5479 | PPIB | −0.21044945 | 7.597866929 | −3.953415609 | 0.000103004 | 0.006884591 | Yes |
| 5914 | RARA | 0.152246519 | 9.53427442 | 3.952060891 | 0.000103551 | 0.006891412 | Yes |
| 23030 | KDM4B | 0.114825964 | 6.936404355 | 3.950378295 | 0.000104202 | 0.006913921 | Yes |
| 4893 | NRAS | −0.095843667 | 7.001304116 | −3.947930432 | 0.000105203 | 0.006922613 | Yes |
| 100132425 | 100132425 | −0.174085786 | 8.220413639 | −3.942894653 | 0.000107325 | 0.007020825 | No |
| 343477 | 343477 | −0.189660166 | 7.649969206 | −3.941498623 | 0.000107911 | 0.007020825 | No |
| 2210 | FCGR1B | −0.430988472 | 7.993169987 | −3.940417191 | 0.000108448 | 0.007020825 | Yes |
| 2635 | GBP3 | −0.195120734 | 7.189161738 | −3.93969442 | 0.000108673 | 0.007020825 | Yes |
| 8986 | RPS6KA4 | 0.139479462 | 8.135205367 | 3.936047645 | 0.000110221 | 0.007038527 | Yes |
| 54915 | YTHDF1 | 0.073389103 | 8.475733129 | 3.929831414 | 0.000112895 | 0.007126921 | Yes |
| 9757 | KMT2B | 0.111851258 | 7.515806723 | 3.929058812 | 0.000113235 | 0.007128017 | Yes |
| 55312 | RFK | −0.08427961 | 6.607068498 | −3.926029393 | 0.000114578 | 0.007171658 | Yes |
| 100132037 | 100132037 | −0.153685471 | 10.44240805 | −3.92088595 | 0.000116927 | 0.007247756 | No |

TABLE 1-continued

| Entrez.ID | HGNC.symbol (entrezID if NA) | log.FC | Ave. Expression | t.score | P.value | adj.P.value | Protein. coding |
|---|---|---|---|---|---|---|---|
| 10908 | PNPLA6 | 0.154562587 | 8.8638645 | 3.9179501 | 0.000118268 | 0.00727889 | Yes |
| 5730 | PTGDS | 0.223967382 | 6.936808122 | 3.914934855 | 0.00011966 | 0.007325004 | Yes |
| 83642 | SELENOO | 0.089520123 | 7.00469538 | 3.914815176 | 0.00011968 | 0.007325004 | Yes |
| 5298 | PI4KB | 0.076294345 | 7.759964214 | 3.909155375 | 0.000122336 | 0.007447922 | Yes |
| 10454 | TAB1 | 0.084343395 | 7.21179938 | 3.905980892 | 0.00012385 | 0.007476697 | Yes |
| 3727 | JUND | 0.092584395 | 12.16414801 | 3.905124054 | 0.000124262 | 0.007481114 | Yes |
| 8714 | ABCC3 | 0.181604056 | 7.285405574 | 3.892445277 | 0.000130547 | 0.007756294 | Yes |
| 57210 | SLC45A4 | 0.212566458 | 7.488375259 | 3.892363107 | 0.000130588 | 0.007756294 | Yes |
| 57799 | RAB40C | 0.107793217 | 8.405402935 | 3.886832907 | 0.000133368 | 0.007879032 | Yes |
| 401845 | 401845 | −0.293948493 | 7.340784467 | −3.885746466 | 0.000133967 | 0.00789332 | No |
| 10797 | MTHFD2 | −0.165737873 | 7.836657291 | −3.884436866 | 0.000134645 | 0.007912198 | Yes |
| 25832 | NBPF14 | −0.190487721 | 7.322673364 | −3.877466923 | 0.000138312 | 0.008063305 | Yes |
| 5245 | PHB | 0.088889511 | 7.509750081 | 3.874174517 | 0.000140036 | 0.008142353 | Yes |
| 9039 | UBA3 | −0.194472511 | 8.506966424 | −3.870949138 | 0.000141825 | 0.008224757 | Yes |
| 27065 | NSG1 | 0.199935282 | 7.000962562 | 3.867715372 | 0.0001436 | 0.008275268 | Yes |
| 54820 | NDE1 | 0.155685071 | 9.106959227 | 3.861731008 | 0.00014694 | 0.008410976 | Yes |
| 3223 | HOXC6 | −0.1617712 | 7.397371196 | −3.855442433 | 0.000150529 | 0.008528033 | Yes |
| 91289 | LMF2 | 0.120451334 | 7.689397685 | 3.850756103 | 0.000153214 | 0.008613926 | Yes |
| 285237 | C3orf38 | −0.122138087 | 7.851231788 | −3.849731913 | 0.000153822 | 0.008617092 | Yes |
| 3428 | IFI16 | −0.208886346 | 10.23343915 | −3.842642859 | 0.000158092 | 0.008754471 | Yes |
| 8019 | BRD3 | 0.124067889 | 7.938094867 | 3.840489554 | 0.000159363 | 0.008780868 | Yes |
| 56905 | C15orf39 | 0.19304932 | 8.742981261 | 3.839318361 | 0.000160114 | 0.008800298 | Yes |
| 1639 | DCTN1 | 0.091256576 | 8.640771339 | 3.837094826 | 0.000161436 | 0.008829013 | Yes |
| 648343 | 648343 | −0.232272628 | 9.138670143 | −3.833899019 | 0.000163463 | 0.008905933 | No |
| 7086 | TKT | 0.167605437 | 10.80607933 | 3.83156656 | 0.000164925 | 0.008918069 | Yes |
| 84771 | DDX11L1 | 0.207884902 | 6.773789988 | 3.831317771 | 0.000165082 | 0.008918069 | No |
| 6907 | TBL1X | 0.148884778 | 8.714011953 | 3.8306777 | 0.000165486 | 0.008918069 | Yes |
| 79571 | GCC1 | 0.082796891 | 8.202012141 | 3.827695104 | 0.000167333 | 0.008934264 | Yes |
| 8644 | AKR1C3 | 0.232368063 | 7.564561574 | 3.822705249 | 0.000170593 | 0.00903898 | Yes |
| 51160 | VPS28 | 0.103862538 | 8.956166419 | 3.81887915 | 0.00017305 | 0.009096693 | Yes |
| 23152 | CIC | 0.122443797 | 6.964157578 | 3.811310473 | 0.000178113 | 0.009186741 | Yes |
| 100130289 | 100130289 | −0.160146122 | 7.488018392 | −3.810987697 | 0.000178371 | 0.009186741 | No |
| 115004 | CGAS | −0.157038679 | 6.597573926 | −3.81037273 | 0.000178789 | 0.009186821 | Yes |
| 8266 | UBL4A | 0.092310547 | 7.491282361 | 3.802225109 | 0.000184357 | 0.009352969 | Yes |
| 22796 | COG2 | 0.089980566 | 7.696986975 | 3.792724072 | 0.000191117 | 0.009532099 | Yes |
| 28977 | MRPL42 | −0.116295838 | 7.778180495 | −3.790781743 | 0.000192527 | 0.009580824 | Yes |
| 83442 | SH3BGRL3 | 0.092002432 | 10.77181012 | 3.789712738 | 0.000193308 | 0.009598048 | Yes |
| 114294 | LACTB | −0.157376946 | 8.926366977 | −3.78766795 | 0.00019486 | 0.009653453 | Yes |
| 3104 | ZBTB48 | 0.10167636 | 8.094656106 | 3.785136459 | 0.000196683 | 0.00970024 | Yes |
| 8878 | SQSTM1 | 0.112471079 | 10.56904108 | 3.774553043 | 0.000204703 | 0.009832442 | Yes |
| 56255 | TMX4 | 0.148942457 | 8.588977503 | 3.765431598 | 0.000211918 | 0.010113027 | Yes |
| 29924 | EPN1 | 0.092773406 | 9.758823577 | 3.756849727 | 0.000218815 | 0.010330605 | Yes |
| 54785 | BORCS6 | 0.078360649 | 6.723387843 | 3.751599966 | 0.000223174 | 0.010513905 | Yes |
| 55262 | C7orf43 | 0.104936688 | 7.793148919 | 3.747296788 | 0.000226807 | 0.010594725 | Yes |
| 527 | ATP6V0C | 0.099823914 | 11.40639804 | 3.731288168 | 0.000240821 | 0.011109195 | Yes |
| 1819 | DRG2 | 0.075458427 | 7.108768312 | 3.723645236 | 0.000247797 | 0.011359073 | Yes |
| 6195 | RPS6KA1 | 0.12895842 | 8.819695317 | 3.715796383 | 0.0002552 | 0.011589032 | Yes |
| 55108 | BSDC1 | 0.117575294 | 8.515707966 | 3.715512428 | 0.000255436 | 0.011589032 | Yes |
| 6120 | RPE | −0.08918208 | 7.461464332 | −3.711601893 | 0.000259177 | 0.011602645 | Yes |
| 8666 | EIF3G | 0.102366852 | 10.18868523 | 3.709512957 | 0.0002612 | 0.011659038 | Yes |
| 9181 | ARHGEF2 | 0.086242667 | 10.8385885 | 3.692518286 | 0.000278225 | 0.012294763 | Yes |
| 23351 | KHNYN | 0.084025627 | 7.27069273 | 3.690169602 | 0.000280659 | 0.012330484 | Yes |
| 56926 | NCLN | 0.097369001 | 7.578923992 | 3.689357909 | 0.000281504 | 0.012330484 | Yes |
| 9612 | NCOR2 | 0.145723945 | 8.513711637 | 3.685161257 | 0.000285983 | 0.012438591 | Yes |
| 100130154 | 100130154 | −0.202357461 | 9.939399911 | −3.681544475 | 0.000289838 | 0.012581461 | No |
| 9739 | SETD1A | 0.089144194 | 7.280676157 | 3.679576492 | 0.000291886 | 0.012645528 | Yes |
| 1175 | AP2S1 | 0.098391082 | 11.35420289 | 3.669381779 | 0.00030309 | 0.013028738 | Yes |
| 3340 | NDST1 | 0.105601535 | 6.230986734 | 3.666523272 | 0.000306303 | 0.013034696 | Yes |
| 653994 | 653994 | −0.173208008 | 7.974723659 | −3.66613844 | 0.000306811 | 0.013034696 | No |
| 2205 | FCER1A | 0.312436459 | 9.716903755 | 3.662756294 | 0.000310668 | 0.013099635 | Yes |
| 391 | RHOG | 0.128051243 | 11.05190298 | 3.656303004 | 0.000318113 | 0.013287223 | Yes |
| 100134331 | 100134331 | −0.43177465 | 7.409370866 | −3.656466265 | 0.000318124 | 0.013287223 | No |
| 6446 | SGK1 | 0.227802131 | 10.18793788 | 3.654930206 | 0.000319743 | 0.013290955 | Yes |
| 2932 | GSK3B | 0.130004598 | 7.661489724 | 3.654175636 | 0.000320619 | 0.013290955 | Yes |
| 51501 | HIKESHI | −0.07591001 | 7.785003997 | −3.64452348 | 0.000332132 | 0.013638848 | Yes |
| 57104 | PNPLA2 | 0.121135449 | 7.736148074 | 3.637136669 | 0.000341291 | 0.013912954 | Yes |
| 100132761 | 100132761 | −0.256863728 | 6.862089067 | −3.630565074 | 0.000349649 | 0.014149241 | No |
| 142678 | MIB2 | 0.102897586 | 7.429934157 | 3.626593702 | 0.000354686 | 0.014248695 | Yes |
| 26205 | GMEB2 | 0.075127014 | 7.887950159 | 3.619908294 | 0.000363458 | 0.014440781 | Yes |
| 728877 | 728877 | −0.159411781 | 8.853854051 | −3.619530147 | 0.000364042 | 0.014440781 | No |
| 64411 | ARAP3 | 0.203248133 | 8.611118511 | 3.617401401 | 0.000366882 | 0.014505895 | Yes |
| 54849 | DEF8 | 0.16325671 | 9.582390549 | 3.615439862 | 0.000369518 | 0.014531245 | Yes |
| 56666 | PANX2 | 0.252539018 | 7.834092438 | 3.615370648 | 0.000369611 | 0.014531245 | Yes |
| 1209 | CLPTM1 | 0.124825198 | 7.934392434 | 3.608720018 | 0.000378654 | 0.01478155 | Yes |
| 649839 | 649839 | −0.225384507 | 8.681378609 | −3.606249331 | 0.000382105 | 0.01484659 | No |
| 440068 | CARD17 | −0.170838711 | 6.440725018 | −3.605612156 | 0.000382992 | 0.01484659 | Yes |
| 55201 | MAPIS | 0.113023946 | 7.467112068 | 3.602019736 | 0.000387947 | 0.014959336 | Yes |

TABLE 1-continued

| Entrez.ID | HGNC.symbol (entrezID if NA) | log.FC | Ave. Expression | t.score | P.value | adj.P.value | Protein. coding |
|---|---|---|---|---|---|---|---|
| 597 | BCL2A1 | −0.251289888 | 8.075656972 | −3.593918068 | 0.000399628 | 0.015276447 | Yes |
| 9600 | PITPNM1 | 0.122630378 | 8.923994819 | 3.592292193 | 0.000401961 | 0.015325048 | Yes |
| 23135 | KDM6B | 0.126600014 | 6.785097913 | 3.587043326 | 0.000409703 | 0.015552425 | Yes |
| 509 | ATP5F1C | −0.145707387 | 10.03265782 | −3.586609927 | 0.000410367 | 0.015552425 | Yes |
| 57704 | GBA2 | 0.068793622 | 7.033054525 | 3.584823071 | 0.000412944 | 0.015596592 | Yes |
| 3597 | IL13RA1 | 0.201736114 | 9.428509723 | 3.581776083 | 0.000417619 | 0.015692665 | Yes |
| 79668 | PARP8 | −0.156930362 | 8.535049512 | −3.573398492 | 0.000430473 | 0.016093557 | Yes |
| 55700 | MAP7D1 | 0.092290614 | 10.34259764 | 3.571530119 | 0.000433297 | 0.016171781 | Yes |
| 5869 | RAB5B | 0.083298764 | 9.885208031 | 3.569320469 | 0.00043677 | 0.01627392 | Yes |
| 23515 | MORC3 | −0.171699997 | 7.949059053 | −3.568670614 | 0.00043789 | 0.016288175 | Yes |
| 55794 | DDX28 | 0.071869901 | 7.572364353 | 3.566517847 | 0.000441213 | 0.016384201 | Yes |
| 4669 | NAGLU | 0.079319357 | 6.951017811 | 3.558448737 | 0.000454243 | 0.016776702 | Yes |
| 80223 | RAB11FIP1 | 0.154471644 | 10.68882352 | 3.557831774 | 0.00045535 | 0.016776702 | Yes |
| 51157 | ZNF580 | 0.090370479 | 6.980573587 | 3.556715417 | 0.000457088 | 0.01678157 | Yes |
| 83590 | TMUB1 | 0.089669476 | 8.041831327 | 3.556045671 | 0.000458193 | 0.01678157 | Yes |
| 3385 | ICAM3 | 0.178395509 | 11.63136794 | 3.555176577 | 0.000459726 | 0.016789483 | Yes |
| 23710 | GABARAPL1 | 0.203736397 | 7.718494067 | 3.545471944 | 0.000476057 | 0.017159031 | Yes |
| 1452 | CSNK1A1 | −0.11748972 | 7.789174604 | −3.54468281 | 0.000477351 | 0.017177626 | Yes |
| 65057 | ACD | 0.078686448 | 7.274072918 | 3.533787472 | 0.000496341 | 0.01762058 | Yes |
| 8175 | SF3A2 | 0.109759193 | 9.123344511 | 3.531722762 | 0.000500027 | 0.01762058 | Yes |
| 23053 | ZSWIM8 | 0.098392778 | 8.430874253 | 3.528790869 | 0.000505306 | 0.017693701 | Yes |
| 114769 | CARD16 | −0.217507204 | 8.355325475 | −3.527064904 | 0.000508541 | 0.017723559 | Yes |
| 5293 | PIK3CD | 0.133143254 | 8.884290957 | 3.52705192 | 0.000508565 | 0.017723559 | Yes |
| 1611 | DAP | 0.076202482 | 7.394219991 | 3.521640843 | 0.000518398 | 0.018009424 | Yes |
| 440915 | 440915 | −0.192006316 | 12.16617952 | −3.516403888 | 0.000528295 | 0.018324442 | No |
| 404093 | CUEDC1 | 0.146205009 | 7.479141718 | 3.512011662 | 0.00053664 | 0.018497768 | Yes |
| 8408 | ULK1 | 0.139350387 | 9.115540069 | 3.508858709 | 0.000542707 | 0.018616644 | Yes |
| 6844 | VAMP2 | 0.128211128 | 8.290651873 | 3.508032977 | 0.000544302 | 0.018616644 | Yes |
| 645693 | 645693 | −0.16136658 | 8.367016173 | −3.50441442 | 0.000551369 | 0.018771173 | No |
| 8079 | MLF2 | 0.098957245 | 8.122280419 | 3.503872611 | 0.000552323 | 0.018771473 | Yes |
| 79901 | CYBRD1 | 0.193005429 | 8.036696982 | 3.503545752 | 0.000553077 | 0.018771473 | Yes |
| 25829 | TMEM184B | 0.097789819 | 7.023037353 | 3.493608814 | 0.000572858 | 0.019290005 | Yes |
| 2539 | G6PD | 0.119129353 | 9.420237064 | 3.491450459 | 0.000577336 | 0.019327649 | Yes |
| 4814 | NINJ1 | 0.188545995 | 10.32767439 | 3.490158732 | 0.000580033 | 0.019388563 | Yes |
| 318 | NUDT2 | 0.160814536 | 8.101100927 | 3.481169374 | 0.000598821 | 0.019806804 | Yes |
| 25980 | AAR2 | 0.092016126 | 7.742238984 | 3.475429951 | 0.000610994 | 0.020119096 | Yes |
| 91300 | R3HDM4 | 0.167604826 | 11.12361056 | 3.474091895 | 0.000614012 | 0.020128475 | Yes |
| 1875 | E2F5 | −0.150439599 | 8.130309782 | −3.47226525 | 0.000617991 | 0.020168995 | Yes |
| 55113 | XKR8 | 0.155850906 | 8.088212792 | 3.47183769 | 0.000618926 | 0.020168995 | Yes |
| 55924 | INKA2 | 0.190973213 | 6.907992723 | 3.471636045 | 0.000619367 | 0.020168995 | Yes |
| 64319 | FBRS | 0.117625988 | 8.278670047 | 3.470079314 | 0.000622733 | 0.020234256 | Yes |
| 56834 | GPR137 | 0.082680154 | 8.099078032 | 3.463680861 | 0.000636893 | 0.020603454 | Yes |
| 1477 | CSTF1 | −0.07035012 | 6.171038932 | −3.461356862 | 0.000642137 | 0.020704216 | Yes |
| 26973 | CHORDC1 | −0.107488628 | 7.993795466 | −3.455905726 | 0.000654594 | 0.020840427 | Yes |
| 4849 | CNOT3 | 0.09499188 | 6.59981572 | 3.449909849 | 0.000668558 | 0.021159373 | Yes |
| 10678 | B3GNT2 | −0.127472354 | 7.154788314 | −3.449891527 | 0.000668727 | 0.021159373 | Yes |
| 55049 | REX1BD | 0.108292793 | 8.92406639 | 3.446148239 | 0.000677465 | 0.021353179 | Yes |
| 79637 | ARMC7 | 0.090320379 | 7.044664065 | 3.444232282 | 0.000682036 | 0.021417646 | Yes |
| 1173 | AP2M1 | 0.088741456 | 8.134679555 | 3.442447253 | 0.000686326 | 0.021489889 | Yes |
| 646909 | 646909 | −0.191914291 | 8.777543434 | −3.441957001 | 0.000687638 | 0.021489889 | No |
| 2217 | FCGRT | 0.151885498 | 9.740441171 | 3.439853224 | 0.000692735 | 0.021588119 | Yes |
| 5211 | PFKL | 0.09236158 | 7.403406195 | 3.430607649 | 0.000715426 | 0.02201578 | Yes |
| 2643 | GCH1 | −0.172469465 | 7.995981673 | −3.427802762 | 0.00072262 | 0.022125672 | Yes |
| 79657 | RPAP3 | −0.082955659 | 8.319360418 | −3.426414114 | 0.000726006 | 0.022125672 | Yes |
| 80325 | ABTB1 | 0.180707377 | 10.2574338 | 3.425992101 | 0.000727213 | 0.022131922 | Yes |
| 1107 | CHD3 | 0.093750583 | 6.427821926 | 3.424501392 | 0.000730881 | 0.022195719 | Yes |
| 5359 | PLSCR1 | −0.295354486 | 7.426246671 | −3.424388509 | 0.000731319 | 0.022195719 | Yes |
| 1831 | TSC22D3 | 0.157455627 | 11.88865104 | 3.422852777 | 0.000735242 | 0.022223209 | Yes |
| 1176 | AP3S1 | −0.107054305 | 8.343585192 | −3.418699114 | 0.000745857 | 0.022482537 | Yes |
| 23149 | FCHO1 | 0.096304196 | 6.994424574 | 3.408163916 | 0.000773781 | 0.023010338 | Yes |
| 8073 | PTP4A2 | 0.086737513 | 11.62225643 | 3.403033382 | 0.000787731 | 0.023362296 | Yes |
| 8498 | RANBP3 | 0.055224697 | 7.964328186 | 3.399782884 | 0.00079669 | 0.023460215 | Yes |
| 8445 | DYRK2 | 0.187385478 | 9.010659281 | 3.397421082 | 0.000803403 | 0.02351152 | Yes |
| 8402 | SLC25A11 | 0.072274494 | 6.983587568 | 3.39383967 | 0.000813318 | 0.023676247 | Yes |
| 729342 | 729342 | −0.178908191 | 8.429354799 | −3.393212988 | 0.000815236 | 0.02370083 | No |
| 26000 | TBC1D10B | 0.106610107 | 7.142999657 | 3.391650078 | 0.000819532 | 0.023750011 | Yes |
| 54662 | TBC1D13 | 0.059159098 | 6.859753394 | 3.391430096 | 0.000820152 | 0.023750011 | Yes |
| 81857 | MED25 | 0.142765328 | 8.036685628 | 3.387461961 | 0.00083167 | 0.023989216 | Yes |
| 10539 | GLRX3 | −0.103793954 | 8.498522083 | −3.386922265 | 0.00083308 | 0.023998579 | Yes |
| 7045 | TGFBI | 0.162824146 | 10.34504591 | 3.385183055 | 0.000838267 | 0.024039648 | Yes |
| 80851 | SH3BP5L | 0.115254443 | 7.105037171 | 3.384585441 | 0.000839946 | 0.024039648 | Yes |
| 3336 | HSPE1 | −0.140721489 | 9.629184631 | −3.379223377 | 0.000855752 | 0.024334402 | Yes |
| 55854 | ZC3H15 | −0.090863954 | 8.807534797 | −3.373417178 | 0.000872961 | 0.024602127 | Yes |
| 2209 | FCGR1A | −0.340551958 | 7.49831644 | −3.368862503 | 0.000887342 | 0.024880477 | Yes |
| 9261 | MAPKAPK2 | 0.090520617 | 7.836843572 | 3.365464038 | 0.000897273 | 0.025096268 | Yes |
| 25994 | HIGD1A | −0.113617972 | 9.554917173 | −3.362659928 | 0.000906081 | 0.025245727 | Yes |
| 730382 | 730382 | −0.150171694 | 8.569665339 | −3.358285408 | 0.000919916 | 0.025517972 | No |

TABLE 1-continued

| Entrez.ID | HGNC.symbol (entrezID if NA) | log.FC | Ave. Expression | t.score | P.value | adj.P.value | Protein. coding |
|---|---|---|---|---|---|---|---|
| 56949 | XAB2 | 0.092244735 | 8.711921177 | 3.357555971 | 0.000922072 | 0.025530302 | Yes |
| 55914 | ERBIN | -0.093364852 | 6.743449498 | -3.34726863 | 0.00095529 | 0.026122684 | Yes |
| 83955 | 83955 | -0.174445921 | 9.283664994 | -3.346093176 | 0.000959318 | 0.026200407 | No |
| 7461 | CLIP2 | 0.072532644 | 6.61212035 | 3.345277103 | 0.000961848 | 0.026211169 | Yes |
| 3429 | IFI27 | -0.64368017 | 6.804671407 | -3.343275343 | 0.00096905 | 0.026297468 | Yes |
| 3676 | ITGA4 | -0.167018385 | 8.389949492 | -3.341793829 | 0.000973584 | 0.026297468 | Yes |
| 55690 | PACS1 | 0.139507196 | 7.517920569 | 3.334893316 | 0.000996894 | 0.026666317 | Yes |
| 28957 | MRPS28 | -0.078926523 | 7.951443381 | -3.333961416 | 0.000999915 | 0.026714775 | Yes |
| 8654 | PDE5A | 0.168474039 | 7.48525252 | 3.330519117 | 0.001011939 | 0.027003372 | Yes |
| 57584 | ARHGAP21 | 0.093778017 | 8.340737096 | 3.329509715 | 0.001015272 | 0.02705963 | Yes |
| 5925 | RB1 | -0.113265984 | 7.066687951 | -3.327745753 | 0.00102152 | 0.027134968 | Yes |
| 151987 | PPP4R2 | -0.079718016 | 6.54717276 | -3.326939234 | 0.001024239 | 0.027134968 | Yes |
| 1977 | EIF4E | -0.09900385 | 7.381923141 | -3.31923137 | 0.001051573 | .027754808 | Yes |
| 79643 | CHMP6 | 0.076667984 | 7.375409556 | 3.315545805 | 0.001064881 | 0.027877421 | Yes |
| 23510 | KCTD2 | 0.076984321 | 6.742179947 | 3.313562465 | 0.001072107 | 0.027983773 | Yes |
| 1854 | DUT | -0.097490169 | 7.364412854 | -3.31274187 | 0.001075111 | 0.027983773 | Yes |
| 648863 | 648863 | -0.156829301 | 7.083988523 | -3.312744624 | 0.001075276 | 0.027983773 | No |
| 652694 | 652694 | -0.39494524 | 10.79123813 | -3.311558064 | 0.001080068 | 0.028075424 | No |
| 1601 | DAB2 | 0.136812496 | 7.25040535 | 3.30916118 | 0.001088484 | 0.028149428 | Yes |
| 100133329 | 100133329 | -0.180264675 | 8.489960227 | -3.307916434 | 0.001093107 | 0.028149428 | No |
| 6449 | SGTA | 0.087956631 | 6.464092457 | 3.304776571 | 0.001104672 | 0.028348118 | Yes |
| 8273 | SLC10A3 | 0.070660143 | 7.218714851 | 3.300336653 | 0.001121477 | 0.028642499 | Yes |
| 6888 | TALDO1 | 0.142750212 | 11.84188106 | 3.293722137 | 0.001147137 | 0.029166785 | Yes |
| 100151683 | RNU4ATAC | 0.158165586 | 6.832692297 | 3.293383746 | 0.001148455 | 0.029166785 | No |
| 9770 | RASSF2 | 0.141153177 | 11.02089143 | 3.285295435 | 0.001180377 | 0.029806204 | Yes |
| 646966 | 646966 | -0.174717979 | 9.489455854 | -3.281809861 | 0.001194386 | 0.03006088 | No |
| 91662 | NLRP12 | 0.177902016 | 8.693631767 | 3.281573878 | 0.00119534 | 0.03006088 | Yes |
| 9577 | BABAM2 | 0.060642126 | 7.523353758 | 3.281387781 | 0.001195905 | 0.03006088 | Yes |
| 6775 | STAT4 | 0.14737117 | 9.244680282 | 3.279377749 | 0.001204253 | 0.030167771 | Yes |
| 168417 | ZNF679 | -0.176734414 | 8.705598937 | -3.276720309 | 0.001215121 | 0.030307285 | Yes |
| 535 | ATP6V0A1 | 0.114843383 | 8.649450417 | 3.276161505 | 0.001217368 | 0.030307285 | Yes |
| 51569 | UFM1 | -0.126150002 | 8.827191531 | -3.276007186 | 0.001218052 | 0.030307285 | Yes |
| 26519 | TIMM10 | -0.221777077 | 7.739600835 | -3.271903551 | 0.001235051 | 0.030636441 | Yes |
| 64180 | DPEP3 | 0.146655225 | 6.68526032 | 3.271810113 | 0.001235441 | 0.030636441 | Yes |
| 64748 | PLPPR2 | 0.155713763 | 7.206936684 | 3.267717836 | 0.001252617 | 0.030923553 | Yes |
| 83706 | FERMT3 | 0.077629941 | 9.752325062 | 3.261000382 | 0.001281096 | 0.031483482 | Yes |
| 643752 | 643752 | -0.172237713 | 9.579644382 | -3.260738842 | 0.001282423 | 0.031483482 | No |
| 55745 | AP5M1 | -0.066354519 | 8.301618926 | -3.256397971 | 0.001301093 | 0.031765357 | Yes |
| 9643 | MORF4L2 | -0.108184715 | 8.309078912 | -3.249037524 | 0.001333769 | 0.032493287 | Yes |
| 8427 | ZNF282 | 0.067091446 | 6.588301978 | 3.247161007 | 0.001342103 | 0.032586566 | Yes |
| 27161 | AGO2 | 0.135018315 | 7.458141195 | 3.246525326 | 0.001345174 | 0.032625261 | Yes |
| 23295 | MGRN1 | 0.118629874 | 7.360281854 | 3.246120887 | 0.001346991 | 0.032627146 | Yes |
| 4245 | MGAT1 | 0.103477675 | 9.343190312 | 3.242306599 | 0.001364164 | 0.032833553 | Yes |
| 8417 | STX7 | -0.118129833 | 9.177564074 | -3.238929781 | 0.001379855 | 0.032996776 | Yes |
| 6880 | TAF9 | -0.127939977 | 7.78018729 | -3.238920851 | 0.001379906 | 0.032996776 | Yes |
| 644063 | 644063 | -0.226283805 | 9.457028027 | -3.233969413 | 0.001402966 | 0.033293298 | No |
| 79414 | LRFN3 | 0.082584915 | 6.883945283 | 3.230764322 | 0.001417872 | 0.033469962 | Yes |
| 5698 | PSMB9 | -0.185628865 | 9.233286086 | -3.227304904 | 0.00143457 | 0.033791929 | Yes |
| 643870 | 643870 | -0.161246902 | 8.242469732 | -3.224832273 | 0.001446463 | 0.033934684 | No |
| 2206 | MS4A2 | 0.139264255 | 6.598496219 | 3.222215668 | 0.001459147 | 0.034044204 | Yes |
| 7462 | LAT2 | 0.143449886 | 9.507837822 | 3.220308058 | 0.00146846 | 0.034153286 | Yes |
| 64062 | RBM26 | -0.096358732 | 8.175338369 | -3.216224215 | 0.001488363 | 0.034401721 | Yes |
| 1743 | DLST | 0.093435704 | 6.86452532 | 3.216137432 | 0.001488794 | 0.034401721 | Yes |
| 3705 | ITPK1 | 0.162606414 | 7.940270207 | 3.210422247 | 0.00151761 | 0.034783803 | Yes |
| 2022 | ENG | 0.082937941 | 6.425093381 | 3.209143299 | 0.001523857 | 0.034854668 | Yes |
| 51471 | NAT8B | 0.156958294 | 7.042269309 | 3.208065381 | 0.00152955 | 0.034901665 | No |
| 51545 | ZNF581 | 0.097883433 | 8.656051787 | 3.205429013 | 0.001542787 | 0.035033783 | Yes |
| 25920 | NELFB | 0.078479238 | 7.819308002 | 3.204696565 | 0.001546545 | 0.035083078 | Yes |
| 3609 | ILF3 | 0.110929059 | 8.076012846 | 3.20389325 | 0.001550826 | 0.035104939 | Yes |
| 5704 | PSMC4 | -0.115200038 | 8.048616234 | -3.203650055 | 0.001552134 | 0.035104939 | Yes |
| 7341 | SUMO1 | -0.13940082 | 8.021168064 | -3.199774695 | 0.00157225 | 0.035520309 | Yes |
| 10975 | UQCR11 | 0.064058487 | 6.675179856 | 3.197001423 | 0.00158655 | 0.03580676 | Yes |
| 10217 | CTDSPL | 0.144432511 | 7.202427996 | 3.19225366 | 0.001611939 | 0.036158154 | Yes |
| 55317 | AP5S1 | 0.06347515 | 6.885621184 | 3.190287517 | 0.001622234 | 0.036304885 | Yes |
| 647506 | 647506 | -0.348278368 | 11.08633167 | -3.190004342 | 0.00162456 | 0.036304885 | No |
| 728755 | | -0.182564528 | 7.90433759 | -3.18922707 | 0.00162817 | 0.036304885 | No |
| 55652 | SLC48A1 | 0.080338953 | 6.563328365 | 3.188277527 | 0.001633061 | 0.036336847 | Yes |
| 29966 | STRN3 | -0.09924561 | 7.695376285 | -3.187626284 | 0.001636584 | 0.036378586 | Yes |
| 26100 | WIPI2 | 0.080768482 | 7.284885407 | 3.184078037 | 0.001655898 | 0.036697167 | Yes |
| 28996 | HIPK2 | 0.119863592 | 7.057635124 | 3.173501442 | 0.001714972 | 0.037703782 | Yes |
| 22794 | CASC3 | 0.120667011 | 7.883420679 | 3.166986043 | 0.001752175 | 0.038289504 | Yes |
| 10312 | TCIRG1 | 0.149757363 | 9.186191846 | 3.166563043 | 0.001754616 | 0.038289504 | Yes |
| 1497 | CTNS | 0.072205074 | 7.896093362 | 3.163249379 | 0.001773601 | 0.038537941 | Yes |
| 8189 | SYMPK | 0.08735582 | 6.349774956 | 3.161511021 | 0.001783767 | 0.038639537 | Yes |
| 916 | CD3E | 0.147873457 | 8.223245518 | 3.156058229 | 0.001816254 | 0.039110415 | Yes |
| 3661 | IRF3 | 0.106632736 | 7.9005227 | 3.15517171 | 0.001821435 | 0.039110415 | Yes |
| 25855 | BRMS1 | 0.066464707 | 9.418879109 | 3.154767931 | 0.001823711 | 0.039121263 | Yes |

TABLE 1-continued

| Entrez.ID | HGNC.symbol (entrezID if NA) | log.FC | Ave.. Expression | t.score | P.value | adj.P.value | Protein. coding |
|---|---|---|---|---|---|---|---|
| 276 | AMY1A | −0.197897176 | 9.35154347 | −3.154193496 | 0.001827402 | 0.039124473 | Yes |
| 100129237 | 100129237 | −0.158636488 | 9.368403285 | −3.153470526 | 0.001831742 | 0.039179415 | No |
| 9784 | SNX17 | 0.078290672 | 9.206040545 | 3.146588826 | 0.001873272 | 0.039798034 | Yes |
| 10247 | RIDA | −0.081258104 | 7.110327633 | −3.145371386 | 0.001880755 | 0.039803912 | Yes |
| 94240 | EPSTI1 | −0.373072335 | 10.10302201 | −3.142871198 | 0.0018971 | 0.040073054 | Yes |
| 6603 | SMARCD2 | 0.099404177 | 7.331088377 | 3.141612328 | 0.001904063 | 0.040143393 | Yes |
| 84304 | NUDT22 | 0.064033291 | 7.526635471 | 3.135692635 | 0.001941233 | 0.04054022 | Yes |
| 11336 | EXOC3 | 0.085814804 | 7.457498267 | 3.133729472 | 0.001953718 | 0.040723952 | Yes |
| 4542 | MYO1F | 0.18660311 | 8.512518877 | 3.130943421 | 0.001971825 | 0.040985395 | Yes |
| 645968 | 645968 | −0.199283657 | 9.22842767 | −3.129200663 | 0.001983065 | 0.041141611 | No |
| 23122 | CLASP2 | −0.089642733 | 6.960297081 | −3.12861092 | 0.001986617 | 0.041176648 | Yes |
| 58528 | RRAGD | 0.14791543 | 8.129491969 | 3.120443295 | 0.002040445 | 0.041902741 | Yes |
| 6741 | SSB | −0.093646229 | 9.365932862 | −3.115711887 | 0.00207181 | 0.042248061 | Yes |
| 80256 | FAM214B | 0.145948707 | 8.146345095 | 3.113638832 | 0.002086085 | 0.042481143 | Yes |
| 931 | MS4A1 | −0.214237406 | 8.818986525 | −3.109195454 | 0.002116394 | 0.042896448 | Yes |
| 6881 | TAF10 | 0.055306868 | 9.563847263 | 3.109027053 | 0.002117275 | 0.042896448 | Yes |
| 643779 | 643779 | −0.162817383 | 7.694827843 | −3.106285243 | 0.002136465 | 0.043149179 | No |
| 7090 | TLE3 | 0.127093252 | 6.569223953 | 3.101905537 | 0.002167003 | 0.04356681 | Yes |
| 7112 | TMPO | −0.09140247 | 6.616857055 | −3.096218506 | 0.002206973 | 0.04410817 | Yes |
| 60673 | ATG101 | 0.071717523 | 7.620803537 | 3.096088169 | 0.002207904 | 0.04410817 | Yes |
| 23659 | PLA2G15 | 0.067428786 | 6.594371788 | 3.095310217 | 0.002213465 | 0.044153468 | Yes |
| 2137 | EXTL3 | 0.107476895 | 7.086641013 | 3.092530663 | 0.002233641 | 0.044421502 | Yes |
| 2171 | FABP5 | −0.139389186 | 7.148785036 | −3.091165191 | 0.002243602 | 0.044539436 | Yes |
| 5294 | PIK3CG | 0.113743696 | 8.128248968 | 3.090191479 | 0.002250665 | 0.044639541 | Yes |
| 83699 | SH3BGRL2 | 0.172652045 | 7.770248388 | 3.088866034 | 0.002260321 | 0.044704167 | Yes |
| 22994 | CEP131 | 0.065898949 | 6.704269597 | 3.086690646 | 0.002275957 | 0.044859287 | Yes |
| 10587 | TXNRD2 | 0.059616726 | 7.096514562 | 3.086331891 | 0.002278592 | 0.044871213 | Yes |
| 10346 | TRIM22 | −0.241945869 | 9.461637974 | −3.085760614 | 0.002283085 | 0.04487968 | Yes |
| 643031 | 643031 | 0.150003866 | 11.33858385 | 3.082968979 | 0.002303729 | 0.045124902 | No |
| 7988 | ZNF212 | 0.063750849 | 7.210215023 | 3.08157766 | 0.00231379 | 0.045241762 | Yes |
| 56181 | MTFR1L | 0.060110278 | 6.883762746 | 3.080382596 | 0.002322716 | 0.045376137 | Yes |
| 7257 | TSNAX | −0.139587173 | 8.496806271 | −3.076620459 | 0.002351318 | 0.045813384 | Yes |
| 60489 | APOBEC3G | −0.158231478 | 8.562055151 | −3.076137531 | 0.002354975 | 0.045844209 | Yes |
| 11152 | WDR45 | 0.079652704 | 7.195257112 | 3.073700592 | 0.002373212 | 0.046036984 | Yes |
| 399804 | 399804 | −0.174807445 | 10.21669045 | −3.072213732 | 0.002384883 | 0.046104194 | No |
| 23325 | WASHC4 | −0.139279677 | 8.260699897 | −3.071804182 | 0.002388024 | 0.046104194 | Yes |
| 6793 | STK10 | 0.080848553 | 8.230877374 | 3.070852777 | 0.002395039 | 0.046104194 | Yes |
| 84065 | TMEM222 | 0.071056545 | 6.920945378 | 3.069352076 | 0.002406616 | 0.046238409 | Yes |
| 22839 | DLGAP4 | 0.079804387 | 6.870173247 | 3.067487937 | 0.002421067 | 0.046435313 | Yes |
| 8899 | PRPF4B | −0.104567282 | 8.056729407 | −3.061997722 | 0.002464285 | 0.046820403 | Yes |
| 81 | ACTN4 | 0.091642316 | 8.210718958 | 3.061516637 | 0.002467899 | 0.046820403 | Yes |
| 3728 | JUP | −0.198785575 | 7.510306959 | −3.060317758 | 0.002477707 | 0.046870664 | Yes |
| 129531 | MITD1 | −0.088167312 | 9.115720807 | −3.058677129 | 0.002490461 | 0.046991233 | Yes |
| 80301 | PLEKHO2 | 0.145577987 | 8.362904052 | 3.056901883 | 0.002504969 | 0.047126673 | Yes |
| 84106 | PRAM1 | 0.137727542 | 8.152802032 | 3.056752165 | 0.002506171 | 0.047126673 | Yes |
| 51639 | SF3B6 | −0.102424555 | 9.957386093 | −3.056062257 | 0.002511562 | 0.047187888 | Yes |
| 9364 | RAB28 | −0.084205978 | 6.855089978 | −3.051664638 | 0.002546995 | 0.047570463 | Yes |
| 4900 | NRGN | 0.226593117 | 9.766620678 | 3.046361179 | 0.002590847 | 0.048105351 | Yes |
| 79720 | VPS37B | 0.087224845 | 8.283749828 | 3.041380168 | 0.002632047 | 0.048359776 | Yes |
| 11068 | CYB561D2 | 0.059238511 | 7.834947429 | 3.041263065 | 0.002633031 | 0.048359776 | Yes |
| 389386 | 389386 | −0.178889991 | 7.156482475 | −3.040662097 | 0.002638399 | 0.048365117 | No |
| 648695 | 648695 | −0.168601181 | 8.843455451 | −3.040373635 | 0.002640828 | 0.048365117 | No |
| 7170 | TPM3 | −0.154253472 | 8.825236087 | −3.039212654 | 0.002650621 | 0.048456133 | Yes |
| 84259 | DCUN1D5 | −0.075873098 | 8.067402099 | −3.035336013 | 0.002683244 | 0.048813988 | Yes |
| 6464 | SHC1 | 0.063561473 | 8.81466668 | 3.033182252 | 0.002701707 | 0.049050303 | Yes |
| 9170 | LPAR2 | 0.14788388 | 8.792406099 | 3.032031148 | 0.002711946 | 0.049167445 | Yes |
| 2944 | GSTM1 | 0.283891004 | 8.824930213 | 3.0315046 | 0.002716908 | 0.049167445 | Yes |
| 6397 | SEC14L1 | 0.191135389 | 8.633559599 | 3.030166123 | 0.002728084 | 0.049167445 | Yes |
| 9318 | COPS2 | −0.096354414 | 7.722602935 | −3.030121927 | 0.002728187 | 0.049167445 | Yes |
| 3067 | HDC | 0.209937155 | 7.391579369 | 3.025060416 | 0.002772716 | 0.049726598 | Yes |
| 6448 | SGSH | 0.097455072 | 7.620112483 | 3.023965405 | 0.002782109 | 0.049773849 | Yes |

TABLE 2

List of potential sources that can be used to extract the static backbone networks for the construction of the DE-ASD context-specific networks

| Network name | Source |
|---|---|
| STRING | string-db.org/cgi/input.pl |
| ConsensusPathDB | cpdb.molgen.mpg.de/ |
| GIANT | hb.flatironinstitute.org/ |
| HumanNet | www.functionalnet.org/humannet/ |
| GeneMANIA | genemania.org/ |
| InBioMap | www.intomics.com/inbio/map.html#search |
| ReactomeFI | reactome.org/ |
| Reactome | reactome.org/ |
| PathwayCommons | www.pathwaycommons.org/ |
| IRefIndex | irefindex.org/wiki/index.php?title=iRefIndex |

TABLE 2-continued

List of potential sources that can be used to extract the static backbone networks for the construction of the DE-ASD context-specific networks

| Network name | Source |
|---|---|
| MultiNet | journals.plos.org/ploscompbiol/article/comment?id=10.1371/annotation/308acd64-7d86-4423-a65f-5432c7d54002 |
| HINT | hint.yulab.org/ |
| BioGRID | thebiogrid.org/ |
| Mentha | www.mentha.uniroma2.it/ |
| HPRD | hprd.org |
| IntAct | www.ebi.ac.uk/intact/ |
| DIP | dip.doe-mbi.ucla.edu/dip/Main.cgi |
| BioPlex | bioplex.hms.harvard.edu/ |
| HumanInteractome | interactome.baderlab.org |

TABLE 3

Enrichment analysis of DE-ASD networks for transcription factor targets based on ENCODE and Chea2016 resources through EnrichR portal Only genes whose targets were enriched (FDR < 0.1) in all three DE-ASD networks are represented

| Transcription Factor | FDR_HC net | FDR_Func net | FDR_Full net | is an ASD risk gene |
|---|---|---|---|---|
| YY1 | 7.64E−35 | 2.86E−29 | 7.52E−25 | YES |
| TAF1 | 2.00E−14 | 4.88E−17 | 4.32E−15 | YES |
| FOXP1 | 1.83E−06 | 1.27E−07 | 1.07E−07 | YES |
| PAX5 | 3.49E−06 | 9.68E−05 | 0.000821947 | YES |
| FOXP2 | 0.000669291 | 1.34E−05 | 5.93E−05 | YES |
| CHD2 | 0.002668315 | 0.000240147 | 0.000293565 | YES |
| TBL1XR1 | 0.004508563 | 0.000341067 | 0.00199052 | YES |
| CUX1 | 0.005208274 | 0.006115109 | 0.021177671 | YES |
| KDM6A | 0.008838017 | 0.001559492 | 0.002992259 | YES |
| STAG1 | 0.020022558 | 0.000584233 | 0.002392286 | YES |
| CHD7 | 0.022028439 | 0.029649233 | 0.033307899 | YES |
| MYC | 2.48E−26 | 1.86E−20 | 2.00E−17 | NO |
| RELA | 2.70E−26 | 2.52E−12 | 1.52E−10 | NO |
| KDM2B | 5.03E−23 | 2.15E−31 | 1.29E−28 | NO |
| SPI1 | 4.83E−22 | 5.95E−26 | 1.56E−24 | NO |
| GABPA | 1.60E−17 | 7.89E−27 | 2.08E−26 | NO |
| ATF3 | 6.15E−17 | 6.86E−09 | 4.16E−08 | NO |
| NRF1 | 6.15E−17 | 5.31E−20 | 1.35E−18 | NO |
| CREB1 | 2.18E−15 | 2.57E−09 | 4.05E−08 | NO |
| E2F1 | 3.39E−14 | 2.26E−09 | 1.32E−07 | NO |
| USF1 | 3.53E−13 | 1.24E−14 | 4.29E−13 | NO |
| EP300 | 4.37E−11 | 1.48E−09 | 5.16E−08 | NO |
| SRF | 4.37E−11 | 3.53E−08 | 7.57E−07 | NO |
| FOS | 1.23E−10 | 4.07E−06 | 1.38E−05 | NO |
| MAX | 2.50E−10 | 1.94E−11 | 1.74E−09 | NO |
| EGR1 | 2.01E−09 | 8.01E−16 | 3.56E−13 | NO |
| E2F4 | 5.49E−09 | 1.71E−06 | 1.23E−05 | NO |
| BHLHE40 | 1.31E−07 | 2.93E−08 | 2.49E−07 | NO |
| ETS1 | 6.11E−07 | 6.38E−08 | 9.38E−08 | NO |
| ELF1 | 6.19E−07 | 1.02E−11 | 2.32E−10 | NO |
| FLI1 | 6.77E−07 | 1.19E−06 | 1.11E−05 | NO |
| PML | 7.74E−07 | 9.76E−07 | 6.44E−06 | NO |
| PBX3 | 8.43E−07 | 4.22E−08 | 1.07E−07 | NO |
| SP1 | 8.63E−07 | 1.31E−06 | 2.90E−06 | NO |
| JUN | 1.05E−06 | 3.80E−05 | 0.000375583 | NO |
| KAT2A | 1.19E−06 | 0.006151023 | 0.007251946 | NO |
| RUNX1 | 2.58E−06 | 4.36E−07 | 1.86E−06 | NO |
| TBP | 4.62E−06 | 8.17E−09 | 3.13E−07 | NO |
| SIX5 | 9.86E−06 | 0.000115633 | 0.000379815 | NO |
| JUND | 1.24E−05 | 2.19E−07 | 4.47E−06 | NO |
| VDR | 1.52E−05 | 0.001554723 | 0.006619618 | NO |
| THAP1 | 1.62E−05 | 7.46E−05 | 0.000200301 | NO |
| SUPT20H | 2.94E−05 | 0.024899925 | 0.021912758 | NO |
| ARID3A | 3.04E−05 | 0.003429398 | 0.003615754 | NO |
| MXI1 | 3.94E−05 | 1.72E−09 | 6.30E−09 | NO |
| ZNF143 | 6.12E−05 | 0.000285497 | 0.000461335 | NO |
| FOXP3 | 6.71E−05 | 0.022654967 | 0.021912758 | NO |
| HNF4A | 6.71E−05 | 0.001761039 | 0.008988543 | NO |
| IRF1 | 6.71E−05 | 3.91E−06 | 1.01E−05 | NO |
| RFX5 | 0.000194373 | 5.54E−06 | 8.92E−06 | NO |
| DACH1 | 0.000257101 | 0.000464459 | 0.001543571 | NO |
| RUNX3 | 0.000333079 | 0.000194518 | 0.000189703 | NO |
| BRCA1 | 0.000381053 | 0.003986055 | 0.010771904 | NO |
| JUNB | 0.000412124 | 0.004057085 | 0.008988543 | NO |
| BCL3 | 0.000459144 | 0.003784613 | 0.015141322 | NO |
| MAFK | 0.000459144 | 0.004417565 | 0.016202875 | NO |
| POU2F2 | 0.000477663 | 4.11E−05 | 0.000104551 | NO |
| GABP | 0.000496093 | 4.03E−06 | 3.25E−05 | NO |
| ATF2 | 0.000530213 | 0.000830254 | 0.002047741 | NO |
| CHD1 | 0.000700088 | 3.15E−06 | 3.15E−05 | NO |
| MAF | 0.000701864 | 2.26E−09 | 5.03E−09 | NO |
| NR2C2 | 0.000820365 | 0.000836595 | 0.005463132 | NO |
| GTF2F1 | 0.001410098 | 0.004156447 | 0.011082231 | NO |
| ELK1 | 0.001797193 | 0.000277268 | 0.00154479 | NO |
| ELK3 | 0.001909002 | 1.05E−06 | 7.55E−06 | NO |
| MAZ | 0.001986172 | 3.83E−05 | 7.74E−05 | NO |
| UBF1 | 0.00226034 | 2.56E−05 | 0.000166518 | NO |
| RCOR1 | 0.002629003 | 0.005955599 | 0.010419556 | NO |
| SIN3A | 0.002629003 | 0.002055405 | 0.003615754 | NO |
| ELK4 | 0.003365519 | 1.40E−05 | 1.78E−05 | NO |
| MYB | 0.003365519 | 0.004417565 | 0.007538758 | NO |
| XRN2 | 0.004081639 | 0.004085519 | 0.004987461 | NO |
| NR1H3 | 0.004172083 | 0.000293783 | 0.00056301 | NO |
| ATF1 | 0.004468617 | 0.002977392 | 0.006760248 | NO |
| ZC3H11A | 0.004468617 | 0.001554723 | 0.003704296 | NO |
| ESRRA | 0.006846485 | 0.000813468 | 0.002370235 | NO |
| LXR | 0.006944484 | 0.0179222 | 0.032613317 | NO |
| STAT1 | 0.006950937 | 0.006931825 | 0.028433049 | NO |
| TAL1 | 0.007620626 | 0.002018599 | 0.005930738 | NO |
| CLOCK | 0.008472443 | 0.004156447 | 0.009678377 | NO |
| TFAP2C | 0.008582291 | 0.003995646 | 0.009678377 | NO |
| TCF3 | 0.009931953 | 6.18E−05 | 0.000341355 | NO |
| E2A | 0.009977747 | 0.001554723 | 0.002047741 | NO |
| TCF21 | 0.009977747 | 0.002113572 | 0.006760248 | NO |
| ZKSCAN1 | 0.009977747 | 0.006931825 | 0.011323674 | NO |
| HCFC1 | 0.011111383 | 0.002067241 | 0.004695251 | NO |
| SREBF1 | 0.012138661 | 0.0012344 | 0.002588839 | NO |
| ZBTB7A | 0.015060358 | 0.000240147 | 0.000481547 | NO |
| KDM5A | 0.019411743 | 0.014578154 | 0.028433049 | NO |
| CEBPD | 0.026588204 | 0.002411455 | 0.005195651 | NO |
| SP2 | 0.030012289 | 0.001231415 | 0.002336751 | NO |
| HDAC8 | 0.030209369 | 0.001154991 | 0.002047741 | NO |
| WRNIP1 | 0.030209369 | 0.037397766 | 0.032613317 | NO |
| KLF6 | 0.043002626 | 0.000253547 | 0.000711678 | NO |
| ZMIZ1 | 0.043002626 | 0.006931825 | 0.008988543 | NO |
| SMC3 | 0.044135515 | 0.005446501 | 0.015141322 | NO |
| SP4 | 0.047494585 | 0.01874837 | 0.010571897 | NO |

The invention claimed is:

1. A method of treating autism spectrum disorder (ASD) in a subject comprising:
   a. obtaining a prenatal or early postnatal (<1 year old) biological sample of the subject;
   b. measuring leukocyte gene expression patterns of more than two molecular markers in the biological sample, wherein the markers include at least one gene selected from each of RAS/ERK, PI3K/AKT and WNT/β-catenin pathways;
   c. comparing the molecular marker patterns with healthy controls for gene regulatory mechanisms, signaling pathways and protein interactions to identify, in the subject, a first subtype of ASD or a second subtype of ASD based on a co-expression pattern of one or more pairs of interacting genes in a dysregulated network showing elevated gene co-expression activity in the RAS/ERK, PI3K/AKT and WNT/β-catenin pathways;

d. determining, based at least in part on the first subtype of ASD being identified in the subject, an effective disease therapy for the subject; and e. administering the effective disease therapy to the subject.

2. The method of claim 1, wherein the molecular marker is selected from DNA, RNA, protein, metabolites, glycans, and lipids.

3. The method of claim 1, wherein the biological sample is blood.

4. The method of claim 1, wherein the biological sample is a non-neurologic tissue sample.

5. The method of claim 1, further comprising:
determining a change in co-expression strength or a correlation between any two molecular markers in the biological sample; and
diagnosing a disease or disorder using the change or the correlation.

6. The method of claim 1, further comprising:
evaluating co-expression or correlation of molecules or markers in the biological sample, where the molecules are RNA, protein, metabolites, glycans, lipids, or DNA markers, and wherein the markers can be obtained from tissue or fluids.

7. The method of claim 1, further comprising:
building a network from markers that change between two different conditions.

8. The method of claim 1, further comprising:
determining co-expression magnitudes using either correlation and information theory based metrics.

9. The method of claim 1, further comprising:
determining a correlation between the magnitude of co-expression with a disease severity or prognosis.

10. The method of claim 1, further comprising:
determining differences in magnitude of co-expression or correlation or changes in co-expression or correlation associated with another metric; and
determining a distinct subtype of a disorder using the differences.

11. A method of treating autism spectrum disorder (ASD) in a subject comprising:

a. obtaining a prenatal or early postnatal (<1 year old) biological sample of the subject;

b. measuring leukocyte gene expression patterns of more than two molecular markers in the biological sample, wherein the markers include at least one gene selected from each of RAS/ERK, PI3K/AKT and WNT/β-catenin pathways;

c. comparing the molecular marker patterns with healthy controls for gene regulatory mechanisms, signaling pathways and protein interactions to identify, in the subject, a first subtype of ASD or a second subtype of ASD based on a co-expression pattern of one or more pairs of interacting genes in a dysregulated network showing elevated gene co-expression activity in the RAS/ERK, PI3K/AKT and WNT/β-catenin pathways;

d. determining, based at least in part on the first subtype of ASD being identified in the subject, an effective disease therapy for the subject;

e. administering the effective disease therapy to the subject; and f. determining an effect of the therapy on a co-expression/correlation activity of the network.

12. The method of claim 11, wherein the molecular marker is selected from DNA, RNA, protein, metabolites, glycans, and lipids.

13. The method of claim 11, wherein the effective disease therapy is a first treatment is connected to the subject in a first subgroup of the disorder, and a second treatment is connected to other subjects in a second subgroup of the disorder.

14. The method of claim 11, wherein the biological sample is blood.

15. The method of claim 11, wherein the disease is ASD.

16. The method of claim 11, wherein the biological sample is a non-neurologic tissue sample.

17. The method of claim 11, further comprising:
determining a change in co-expression strength or a correlation between any two molecular markers in the biological sample; and
diagnosing a disease or disorder using the change or the correlation.

* * * * *